US011728942B2

United States Patent
Yang et al.

(10) Patent No.: US 11,728,942 B2
(45) Date of Patent: Aug. 15, 2023

(54) DATA PARSING TO SUPPORT RESOURCE UNIT AGGREGATION

(71) Applicant: QUALCOMM Incorporated, San Diego, CA (US)

(72) Inventors: Lin Yang, San Diego, CA (US); Bin Tian, San Diego, CA (US); Sameer Vermani, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 62 days.

(21) Appl. No.: 16/803,627

(22) Filed: Feb. 27, 2020

(65) Prior Publication Data

US 2020/0305164 A1 Sep. 24, 2020

Related U.S. Application Data

(60) Provisional application No. 62/926,338, filed on Oct. 25, 2019, provisional application No. 62/850,417, (Continued)

(51) Int. Cl.
*H04L 5/00* (2006.01)
*H04W 72/044* (2023.01)
(Continued)

(52) U.S. Cl.
CPC .......... *H04L 5/0044* (2013.01); *H04L 1/0013* (2013.01); *H04L 5/0007* (2013.01);
(Continued)

(58) Field of Classification Search
CPC ............. H04W 72/0466; H04W 80/08; H04W 72/0453; H04W 80/02; H04W 4/027;
(Continued)

(56) References Cited

U.S. PATENT DOCUMENTS

2016/0233931 A1\* 8/2016 van Zelst ............... H04B 17/12
2016/0255610 A1\* 9/2016 Li ......................... H04L 1/0061
370/329
(Continued)

FOREIGN PATENT DOCUMENTS

WO WO-2016141551 A1 \* 9/2016

OTHER PUBLICATIONS

62813204,Specification,Mar. 4, 2019 (Year: 2019).\*
62814905,Specification,Mar. 7, 2019 (Year: 2019).\*

*Primary Examiner* — Yu-Wen Chang
(74) *Attorney, Agent, or Firm* — Dang M. Vo

(57) ABSTRACT

This disclosure provides methods, devices and systems for data parsing for resource unit (RU) aggregation. A wireless communication device (such as an access point (AP) or a station (STA)) may allocate a set of RUs for a receiving device in a basic service set (BSS). The set of RUs may be associated with multiple bandwidth segments of a bandwidth allocation and may be non-contiguous or contiguous. The wireless communication device may determine a data parsing and encoding scheme for a set of information bits. The data parsing may be implemented at a medium access control (MAC) layer or physical (PHY) layer and the encoding may correspond to a joint encoding or a separate encoding for each RU of the allocation. The wireless communication device may then distribute the coded bits to the set of RUs for transmission.

17 Claims, 33 Drawing Sheets

Related U.S. Application Data filed on May 20, 2019, provisional application No. 62/822,749, filed on Mar. 22, 2019.

(51) Int. Cl.
| | |
|---|---|
| *H04W 80/08* | (2009.01) |
| *H04W 72/0453* | (2023.01) |
| *H04W 80/02* | (2009.01) |
| *H04L 1/00* | (2006.01) |
| *H04L 27/26* | (2006.01) |

(52) U.S. Cl.
CPC ...... *H04L 27/2602* (2013.01); *H04L 27/2605* (2013.01); *H04W 72/0453* (2013.01); *H04W 72/0466* (2013.01); *H04W 80/02* (2013.01); *H04W 80/08* (2013.01); *H04L 27/2603* (2021.01)

(58) Field of Classification Search
CPC ........... H04W 4/70; H04W 4/80; H04W 4/00; H04L 5/0007; H04L 1/0013; H04L 27/2605; H04L 1/0071; H04L 1/0045; H04L 1/0041; H04L 27/2602; H04L 5/0042; H04L 5/0044

See application file for complete search history.

(56) References Cited

U.S. PATENT DOCUMENTS

| | | | | |
|---|---|---|---|---|
| 2016/0302200 | A1* | 10/2016 | Yang | H04L 5/001 |
| 2016/0345202 | A1* | 11/2016 | Bharadwaj | H04L 27/2602 |
| 2017/0265135 | A1* | 9/2017 | Cariou | H04W 52/0219 |
| 2017/0265240 | A1* | 9/2017 | Chen | H04L 5/0044 |
| 2017/0273083 | A1* | 9/2017 | Chen | H04L 5/001 |
| 2017/0332414 | A1* | 11/2017 | Kneckt | H04L 47/2441 |
| 2018/0184429 | A1* | 6/2018 | Gan | H04W 28/00 |
| 2018/0248591 | A1* | 8/2018 | Geng | H04B 7/0452 |
| 2018/0302256 | A1* | 10/2018 | Huang | H04L 27/26 |
| 2020/0136773 | A1* | 4/2020 | Chen | H04L 5/0007 |
| 2020/0288439 | A1* | 9/2020 | Seok | H04W 74/0816 |
| 2020/0396743 | A1* | 12/2020 | Park | H04L 29/08 |
| 2021/0028917 | A1* | 1/2021 | Park | H04L 27/26 |
| 2021/0126735 | A1* | 4/2021 | Gan | H04L 1/0068 |
| 2021/0143966 | A1* | 5/2021 | Yu | H04L 5/00 |
| 2021/0281363 | A1* | 9/2021 | Wu | H04L 5/0007 |
| 2021/0281382 | A1* | 9/2021 | Hu | H04L 5/0005 |

* cited by examiner

DATA PARSING TO SUPPORT RESOURCE UNIT AGGREGATION

CROSS REFERENCE

The present application for patent claims the benefit of U.S. Provisional Patent Application No. 62/926,338 by YANG et al., entitled "DATA PARSING TO SUPPORT RESOURCE UNIT AGGREGATION," filed Oct. 25, 2019, and U.S. Provisional Patent Application No. 62/850,417 by YANG et al., entitled "DATA PARSING TO SUPPORT RESOURCE UNIT AGGREGATION," filed May 20, 2019, and U.S. Provisional Patent Application No. 62/822,749 by YANG et al., entitled "DATA PARSING TO SUPPORT RESOURCE UNIT AGGREGATION," filed Mar. 22, 2019, each of which is assigned to the assignee hereof, and each of which is expressly incorporated by reference in its entirety herein.

TECHNICAL FIELD

This disclosure relates generally to wireless communications, and more specifically to data parsing to support resource unit (RU) aggregation.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a BSS Identifier (BSSID) that is advertised by the AP. An AP periodically broadcasts beacon frames to enable any STAs within wireless range of the AP to establish or maintain a communication link with the WLAN.

In some examples, a wireless communication system (such as a WLAN) may include APs and STAs configured for high efficiency (HE) WLAN operations (such as defined in IEEE 802.11ax) or extremely high throughput (EHT) operations (such as defined in IEEE 802.11be). For some resource deployments, the wireless communication system may support frequency bands traditionally used by Wi-Fi technology (such as the 2.4 GHz band and 5 GHz band), as well as extended frequency bands (for example, the 6 GHz band) that may support both licensed and unlicensed communications. Each of the frequency bands may include multiple sub-bands or frequency channels for signaling physical (PHY) protocol data units (PPDUs). The PPDUs may be transmitted by a STA or an AP over a wireless channel. In some examples, the PPDUs may be transmitted over a wireless channel having a minimum bandwidth of 20 megahertz (MHz). In other examples, an extended BSS bandwidth may be formed through channel bonding, and PPDUs may be transmitted over wireless channels having bandwidths of 40 MHz, 80 MHz, 160 MHz, or 320 MHz.

In some examples, incumbent technologies (for example, fourth generation (4G) systems such as Long Term Evolution (LTE) systems and fifth generation (5G) systems which may be referred to as New Radio (NR) systems) may occupy resources of the extended BSS bandwidth. As a result, an AP or a STA may have difficulty discovering a contiguous idle channel (for example, a contiguous 80 MHz, 160 MHz, or 320 MHz channel) for EHT operations within the extended BSS bandwidth. The STAs or the APs may experience reduced signaling throughput due to the overlapping data traffic and available frequency resources may be wasted, particularly for single-user transmissions.

SUMMARY

The systems, methods and devices of this disclosure each have several innovative aspects, no single one of which is solely responsible for the desirable attributes disclosed herein.

One innovative aspect of the subject matter described in this disclosure may be implemented in a method for wireless communication at a wireless communication device, such as an access point (AP) or a station (STA). As described herein, an available frequency spectrum (such as an extended BSS bandwidth) of a wireless channel may be divided into multiple data units each including a number of different frequency subcarriers ("tones"). A wireless communication device may aggregate a set of data units for communication (for example, single-user (SU) transmission) at an associated STA. In some examples, a data unit may be a resource unit, an aggregated resource unit, or a bandwidth segment. For example, as described herein, an available frequency spectrum (such as an extended BSS bandwidth) of a wireless channel may be divided into multiple resource units (RUs) each including a number of different frequency subcarriers ("tones"). A wireless communication device may aggregate a set of RUs for communication (for example, single-user (SU) transmission) at an associated STA. The aggregation may be part of a flexible channel configuration and may include one or more bandwidth segments of a noncontiguous bandwidth. The wireless communication device may determine a data parsing and encoding scheme for distributing bits of a data payload across the aggregated set of RUs. In some examples, the data parsing may be performed at the medium access control (MAC) layer and carried via multiple physical (PHY) service data units (PSDUs) to the PHY layer for separate encoding. In other examples, the MAC layer may indicate a single PSDU and the included data payload may be distributed to the set of RUs and encoded at the PHY layer.

Another innovative aspect of the subject matter described in this disclosure may be implemented in a method for wireless communication at a wireless communication device, such as an AP or a STA. In some implementations, the wireless communication device may receive (for example, via PHY layer signaling) a set of encoded bits over multiple RUs of a channel. The multiple RUs may be associated with a flexible channel configuration and include one or more bandwidth segments of a noncontiguous channel. The wireless communication device may decode the set of bits included on the multiple RUs, using binary convolution coding (BCC) or low-density parity check (LDPC) codes for linear error correction. In some examples, the wireless communication device may perform the decoding based on a same coding scheme for the multiple RUs. In other examples, the wireless communication device may perform the decoding based on a distinct coding scheme for each RU within the channel.

A method of wireless communication at an AP is described. The method may include allocating a set of RUs for a STA in a BSS of the AP, the set of RUs associated with two or more available bandwidth segments of a bandwidth allocation, encoding a set of information bits associated with a set of data units by jointly encoding all the information bits associated with the set of data units together or by encoding the information bits of each data unit separately from the encoding of the information bits of the other data units of the set of data units, distributing the set of encoded information bits to the set of RUs, and transmitting the distributed set of encoded information bits on the set of RUs.

An apparatus for wireless communication is described. The apparatus may include a processor, memory in electronic communication with the processor, and instructions stored in the memory. The instructions may be executable by the processor to cause the apparatus to allocate a set of RUs for a STA in a BSS of the apparatus, the set of RUs associated with two or more available bandwidth segments of a bandwidth allocation, encode a set of information bits associated with a set of data units by jointly encoding all the information bits associated with the set of data units together or by encoding the information bits of each data unit separately from the encoding of the information bits of the other data units of the set of data units, distribute the set of encoded information bits to the set of RUs, and transmit the distributed set of encoded information bits on the set of RUs.

Another apparatus for wireless communication is described. The apparatus may include means for allocating a set of RUs for a STA in a BSS of the apparatus, the set of RUs associated with two or more available bandwidth segments of a bandwidth allocation, encoding a set of information bits associated with a set of data units by jointly encoding all the information bits associated with the set of data units together or by encoding the information bits of each data unit separately from the encoding of the information bits of the other data units of the set of data units, distributing the set of encoded information bits to the set of RUs, and transmitting the distributed set of encoded information bits on the set of RUs.

A non-transitory computer-readable medium storing code for wireless communication at an AP is described. The code may include instructions executable by a processor to allocate a set of RUs for a STA in a BSS of the AP, the set of RUs associated with two or more available bandwidth segments of a bandwidth allocation, encode a set of information bits associated with a set of data units by jointly encoding all the information bits associated with the set of data units together or by encoding the information bits of each data unit separately from the encoding of the information bits of the other data units of the set of data units, distribute the set of encoded information bits to the set of RUs, and transmit the distributed set of encoded information bits on the set of RUs.

Some examples of the method, apparatuses, and non-transitory computer-readable medium described herein may further include operations, features, means, or instructions for allocating the set of RUs may be based on the two or more available bandwidth segments.

In some examples of the method, apparatuses, and non-transitory computer-readable medium described herein, distributing the set of encoded information bits to the set of RUs may include operations, features, means, or instructions for distributing the set of encoded information bits to the set of RUs sequentially.

In some examples of the method, apparatuses, and non-transitory computer-readable medium described herein, distributing the set of encoded information bits to the set of RUs sequentially may include operations, features, means, or instructions for determining a RU of the set of RUs that may have a first frequency based on comparing relative frequencies of multiple RUs of the set of RUs, and assigning coded bits of the set of encoded information bits to the RU having the first frequency based on the determining.

In some examples of the method, apparatuses, and non-transitory computer-readable medium described herein, distributing the set of encoded information bits to the set of RUs sequentially further may include operations, features, means, or instructions for assigning remaining coded bits of the set of encoded information bits to one or more additional RUs of the set of RUs. In some examples, each of the one or more additional RUs may have a higher frequency than the first frequency.

In some examples of the method, apparatuses, and non-transitory computer-readable medium described herein, assigning coded bits of the set of encoded information bits to the RU having the first frequency may include operations, features, means, or instructions for filling all bits of a orthogonal frequency division multiplexing (OFDM) symbol associated with the RU having the first frequency with the coded bits of the set of encoded information bits before filling any bits of a second OFDM symbol.

In some examples of the method, apparatuses, and non-transitory computer-readable medium described herein, the first frequency may be a lowest frequency in the set of RUs.

In some examples of the method, apparatuses, and non-transitory computer-readable medium described herein, distributing the set of encoded information bits to the set of RUs includes distributing the set of encoded information bits to the set of RUs in a cyclical process.

Some examples of the method, apparatuses, and non-transitory computer-readable medium described herein may further include operations, features, means, or instructions for determining one or more of one or more modulation coding schemes or a ratio corresponding to the one or more modulation coding schemes. In some examples, distributing the set of encoded information bits to the set of RUs in the cyclical process is based on one or more of the one or more modulation coding schemes or the ratio corresponding to the one or more modulation coding schemes.

Some examples of the method, apparatuses, and non-transitory computer-readable medium described herein may further include operations, features, means, or instructions for determining a ratio corresponding to one or more modulation coding schemes and a ratio corresponding to two or more RUs of the set of RUs. In some examples, distributing the set of encoded information bits to the set of RUs in the cyclical process is based on the ratio corresponding to one or more modulation coding schemes and the ratio corresponding to two or more RUs of the set of RUs.

Some examples of the method, apparatuses, and non-transitory computer-readable medium described herein may further include operations, features, means, or instructions for forwarding two or more data units of the set of data units using a multi-link aggregation scheme. In some examples, the two or more data units of the set of data units includes physical layer convergence procedure (PLCP) protocol data units.

Some examples of the method, apparatuses, and non-transitory computer-readable medium described herein may further include operations, features, means, or instructions for forwarding, from a MAC layer of the access point, two or more data units of the set of data units to a PHY layer of the access point. In some examples, the two or more data units of the set of data units includes PSDUs, and each PSDU corresponds to a separate bandwidth segment.

Some examples of the method, apparatuses, and non-transitory computer-readable medium described herein may further include operations, features, means, or instructions for assigning, at a MAC layer of the AP, information bits of the set of information bits to the set of RUs, generating, at the MAC layer based on the assigning, the set of data units, each of the data units of the set of data units including a PSDU, forwarding the set of data units to a PHY layer of the AP. In some examples, transmitting the distributed set of information bits on the set of RUs includes transmitting the distributed set of information bits on the set of RUs via the PHY layer.

Some examples of the method, apparatuses, and non-transitory computer-readable medium described herein may further include operations, features, means, or instructions for receiving the set of data units at the PHY layer of the AP. In some examples, encoding the information bits of each data unit separately includes encoding the assigned information bits of the set of information bits associated with each data unit of the set of data units separately from the encoding of the information bits associated with the other data units of the set of data units based on the receiving.

In some examples of the method, apparatuses, and non-transitory computer-readable medium described herein, the PHY layer includes a set of encoders for separately encoding the assigned information bits of the set of information bits associated with the set of data units.

In some examples of the method, apparatuses, and non-transitory computer-readable medium described herein, distributing the set of information bits to the set of RUs may include operations, features, means, or instructions for distributing the assigned information bits of the set of information bits to the set of RUs based on the assigning of the information bits of the set of information bits to the set of RUs.

In some examples of the method, apparatuses, and non-transitory computer-readable medium described herein, the set of data units may include operations, features, means, or instructions for forwarding, from a MAC layer to a PHY layer of the AP, the one or more PSDUs, the one or more PSDUs carrying the set of information bits, and receiving, at the PHY layer, the one or more RUs jointly or independently.

Some examples of the method, apparatuses, and non-transitory computer-readable medium described herein may further include operations, features, means, or instructions for assigning, at the PHY layer of the AP, information bits of the set of information bits to the set of RUs.

In some examples of the method, apparatuses, and non-transitory computer-readable medium described herein, distributing the set of information bits to the set of RUs may include operations, features, means, or instructions for distributing the set of assigned information bits to the set of RUs based on the assigning of the information bits of the set of information bits to the set of RUs.

In some examples of the method, apparatuses, and non-transitory computer-readable medium described herein, distributing the set of assigned information bits to the set of RUs may include operations, features, means, or instructions for distributing information bits to the set of RUs sequentially by assigning one or more information bits of the set of assigned coded bits to two or more RUs of the set of RUs before assigning one or more other information bits to one or more other RUs of the set of RUs.

In some examples of the method, apparatuses, and non-transitory computer-readable medium described herein, distributing the set of assigned information bits to the set of RUs may include operations, features, means, or instructions for distributing information bits to the set of RUs sequentially by assigning one or more information bits of the set of assigned information bits to each RU of the set of RUs before assigning one or more other information bits to one or more other RUs of the set of RUs.

In some examples of the method, apparatuses, and non-transitory computer-readable medium described herein, distributing the set of assigned information bits to the set of RUs may include operations, features, means, or instructions for distributing information bits to the set of RUs sequentially by assigning information bits of the set of assigned information bits to a first RU of the set of RUs and assigning remaining information bits of the set of assigned information bits to one or more other RUs of the set of RUs different than the first RU after all the bits of an OFDM symbol of the first RU may be filled.

Some examples of the method, apparatuses, and non-transitory computer-readable medium described herein may further include operations, features, means, or instructions for determining, at the PHY layer of the access point, that a RU size of a RU of the set of RUs satisfies a threshold. In some examples, the threshold includes an available bandwidth segment of the two or more available bandwidth segments of the bandwidth allocation, assigning, at the PHY layer of the access point, the RU of the set of RUs to the available bandwidth segment, and distributing, at the PHY layer of the access point, the set of encoded information bits to the RU of the set of RUs based on assigning the RU of the set of RUs to the available bandwidth segment.

Some examples of the method, apparatuses, and non-transitory computer-readable medium described herein may further include operations, features, means, or instructions for determining, at the PHY layer of the access point, that a first RU size of a first RU of the set of RUs and a second RU size of a second RU of the set of RUs satisfies a threshold. In some examples, the threshold includes an available bandwidth segment of the two or more available bandwidth segments of the bandwidth allocation. In some examples, the PHY layer includes a set of encoders for separately encoding the assigned information bits of the set of information bits associated with the set of data units, assigning, at the PHY layer of the access point, the first RU and the second RU to the two or more available bandwidth segments of the bandwidth allocation, the first RU having the first RU size and the second RU having the second RU size, and determining a ratio corresponding to one or more modulation coding schemes associated with the first RU and the second RU. In some examples, distributing the set of encoded information bits to the set of RUs includes distributing the set of encoded information bits to the first RU of the set of RUs and the second RU of the set of RUs based on the first RU size of the first RU of the set of RUs, the second RU size of the second RU of the set of RUs and the ratio corresponding to one or more modulation coding schemes associated with the first RU and the second RU.

In some examples of the method, apparatuses, and non-transitory computer-readable medium described herein, distributing the set of encoded information bits to the first RU of the set of RUs and the second RU of the set of RUs includes distributing the set of encoded information bits to the first RU of the set of RUs and the second RU of the set of RUs in a cyclical process based on the two or more available bandwidth segments of the bandwidth allocation associated with the first RU of the set of RUs and the second RU of the set of RUs.

In some examples of the method, apparatuses, and non-transitory computer-readable medium described herein, distributing the set of encoded information bits to the first RU of the set of RUs and the second RU of the set of RUs includes distributing the set of encoded information bits to the first RU of the set of RUs and the second RU of the set of RUs sequentially.

In some examples of the method, apparatuses, and non-transitory computer-readable medium described herein, distributing the set of encoded information bits to the first RU of the set of RUs and the second RU of the set of RUs sequentially includes assigning coded bits of the set of encoded information bits to the first RU of the set of RUs, the first RU corresponding to a first bandwidth segment of the bandwidth allocation. In some examples, the first bandwidth segment includes a 160 megahertz (MHz) segment, and assigning remaining coded bits of the set of encoded information bits to the second RU of the set of RUs after assigning the coded bits of the set of encoded information bits to the first RU, the second RU corresponding to a second bandwidth segment of the bandwidth allocation. In some examples, the second bandwidth segment includes a 160 MHz segment.

Some examples of the method, apparatuses, and non-transitory computer-readable medium described herein may further include operations, features, means, or instructions for determining, at the PHY layer of the access point, that each RU unit size of the set of RUs satisfies a threshold. In some examples, the threshold includes an available bandwidth segment of the two or more available bandwidth segments of the bandwidth allocation, assigning, at the PHY layer of the access point, RUs of the set of RUs to the available bandwidth segment of the two or more available bandwidth segments of the bandwidth allocation. In some examples, distributing the set of encoded information bits to the set of RUs may include distributing the set of encoded information bits to the RUs of the set of RUs based on assigning the RUs of the set of RUs to the available bandwidth segment.

Some examples of the method, apparatuses, and non-transitory computer-readable medium described herein may further include operations, features, means, or instructions for performing a RU interleaving of the set of encoded information bits within each RU of the set of RUs.

In some examples of the method, apparatuses, and non-transitory computer-readable medium described herein, the PHY layer includes an RU parser and a bandwidth segment parser. In some examples, the RU parser distributes the set of encoded information bits to the set of RUs, and the bandwidth segment parser assigns coded bits of each RU of the set of RUs to each available bandwidth segment within each RU of the set of RUs. In some examples, the available bandwidth segment includes an 80 MHz segment.

In some examples of the method, apparatuses, and non-transitory computer-readable medium described herein, the bandwidth segment parser assigns coded bits of each RU of the set of RUs to each available bandwidth segment within each RU of the set of RUs prior to the RU parser distributing the coded bits of each RU of the set of RUs within each available bandwidth segment.

In some examples of the method, apparatuses, and non-transitory computer-readable medium described herein, the bandwidth segment parser assigns coded bits of each RU of the set of RUs to each available bandwidth segment within each RU of the set of RUs in a cyclical process.

Some examples of the method, apparatuses, and non-transitory computer-readable medium described herein may further include operations, features, means, or instructions for determining an unavailable bandwidth segment of the two or more available bandwidth segments of the bandwidth allocation, and puncturing the unavailable bandwidth segment of the bandwidth allocation. In some examples, puncturing the unavailable bandwidth segment includes puncturing one or more frequency tones in the unavailable bandwidth segment.

Some examples of the method, apparatuses, and non-transitory computer-readable medium described herein may further include operations, features, means, or instructions for performing an interleaving of the set of encoded information bits within a transmission bandwidth based on the puncturing. In some examples, the interleaving includes distributing the coded bits to the available bandwidth and skipping the punctured one or more frequency tones in the unavailable bandwidth segment.

In some examples of the method, apparatuses, and non-transitory computer-readable medium described herein, the PHY layer includes a set of encoders for encoding the assigned information bits associated with each data unit of the set of data units separately, and the PHY layer processes each RU of the set of RUs independently.

In some examples of the method, apparatuses, and non-transitory computer-readable medium described herein, the assigning of the information bits of the set of information bits to the set of RUs occurs before encoding the set of information bits associated with the set of data units separately.

In some examples of the method, apparatuses, and non-transitory computer-readable medium described herein, the two or more RUs may be noncontiguous RUs of the set of RUs. In some examples, distributing the set of encoded information bits to the set of RUs may be further based on the aggregating.

In some examples of the method, apparatuses, and non-transitory computer-readable medium described herein, the two or more available bandwidth segments of the bandwidth allocation may be contiguous and include one or more of the RUs. In some examples, distributing the set of encoded information bits to the set of RUs may be further based on the aggregating.

Some examples of the method, apparatuses, and non-transitory computer-readable medium described herein may further include operations, features, means, or instructions for distributing the set of encoded information bits to the set of RUs may be based on the distributing.

Some examples of the method, apparatuses, and non-transitory computer-readable medium described herein may further include operations, features, means, or instructions for performing an LDPC tone interleaving of the set of encoded information bits within each RU of the set of RUs. In some examples, distributing the set of encoded information bits to the set of RUs may be further based on the performing.

Some examples of the method, apparatuses, and non-transitory computer-readable medium described herein may further include operations, features, means, or instructions for jointly scrambling the set of information bits associated with the set of data units includes using a same scrambling sequence for all of the information bits of the set of information bits.

In some examples of the method, apparatuses, and non-transitory computer-readable medium described herein, scrambling the information bits of each data unit associated with the set of data units separately from the scrambling of the information bits of the other data units of the set of data units may include operations, features, means, or instructions for using an equivalent scrambling sequence for information bits of the set of information bits distributed to different RUs of the set of RUs.

In some examples of the method, apparatuses, and non-transitory computer-readable medium described herein, scrambling the information bits of each data unit associated with the set of data units separately from the scrambling of the information bits of the other data units of the set of data units may include operations, features, means, or instructions for using a different scrambling seed for information bits of the set of information bits distributed to different RUs of the set of RUs.

In some examples of the method, apparatuses, and non-transitory computer-readable medium described herein, encoding the set of information bits associated with the set of data units jointly or separately may include operations, features, means, or instructions for encoding the set of information bits associated with the set of data units based on an interleaving scheme.

In some examples of the method, apparatuses, and non-transitory computer-readable medium described herein, the interleaving scheme includes an LDPC tone interleaving scheme or a BCC interleaving scheme.

Some examples of the method, apparatuses, and non-transitory computer-readable medium described herein may further include operations, features, means, or instructions for determining an aggregate RU that includes the set of RUs, determining an aggregate RU size associated with the set of RUs based on RU sizes of individual RUs of the set of RUs, and applying the interleaving scheme to the aggregate RU.

Some examples of the method, apparatuses, and non-transitory computer-readable medium described herein may further include operations, features, means, or instructions for determining that the aggregate RU size associated with the set of RUs includes a default aggregate RU size, determining that an existing mapping distance parameter may be valid or invalid based on the aggregate RU size including the default aggregate RU size, and preserving pilot tone locations in each RU of the aggregate RU associated with the set of RUs. In some examples, the interleaving scheme include an LDPC tone interleaving scheme using the preserved pilot tone locations in each RU of the aggregate RU.

Some examples of the method, apparatuses, and non-transitory computer-readable medium described herein may further include operations, features, means, or instructions for determining that the aggregate RU size associated with the set of RUs includes a default aggregate RU size, determining that an existing mapping distance parameter may be valid based on the aggregate RU size including the default aggregate RU size, preserving the existing mapping distance parameter for the aggregate RU size, and determining pilot tone locations in the aggregate RU. In some examples, the interleaving scheme includes an LDPC tone interleaving scheme using the identified pilot tone locations in the aggregate RU.

Some examples of the method, apparatuses, and non-transitory computer-readable medium described herein may further include operations, features, means, or instructions for determining that the aggregate RU size associated with the set of RUs includes an aggregate RU size different than a default aggregate RU size, determining a mapping distance parameter based on the aggregate RU size, and determining one or more pilot tone locations in the aggregate RU. In some examples, the interleaving scheme includes an LDPC tone interleaving scheme using one or more of the mapping distance parameter and pilot tone locations in the aggregate RU.

In some examples of the method, apparatuses, and non-transitory computer-readable medium described herein, determining the one or more pilot tone locations in the aggregate RU includes using one or more neighboring leftover tones or 26 tones RU associated with an unavailable bandwidth segment.

In some examples of the method, apparatuses, and non-transitory computer-readable medium described herein, distributing the set of encoded information bits to the set of RUs may include operations, features, means, or instructions for determining a quantity of OFDM symbol associated with a data field of a packet based on one or more of a space-time block coding parameter value, a length parameter value, a coding scheme parameter value, a payload bit parameter value, or an LDPC encoding parameter value. In some examples, the packet carries the set of information bits.

In some examples of the method, apparatuses, and non-transitory computer-readable medium described herein, the set of data units includes at least one data unit carrying the set of information bits, the at least one data unit including a PSDU.

In some examples of the method, apparatuses, and non-transitory computer-readable medium described herein, encoding the set of information bits associated with the set of data units jointly may include operations, features, means, or instructions for applying an equivalent code rate to the set of information bits associated with all data units of the set of data units.

Some examples of the method, apparatuses, and non-transitory computer-readable medium described herein may further include operations, features, means, or instructions for allocating the set of RUs for the STA in the BSS of the AP may be based on an OFDM access mode.

In some examples of the method, apparatuses, and non-transitory computer-readable medium described herein, at least one RU of the set of RUs may have at least one of a different RU length relative to the other RUs of the set of RUs, a different modulation order relative to the other RUs of the set of RUs, a different modulation coding scheme relative to the other RUs of the set of RUs, a different beam forming configuration, or a different spatial stream relative to the other RUs of the set of RUs.

In some examples of the method, apparatuses, and non-transitory computer-readable medium described herein, the bandwidth allocation includes a noncontiguous bandwidth allocation.

In some examples of the method, apparatuses, and non-transitory computer-readable medium described herein, the bandwidth allocation includes a contiguous subband having a length equal to a sum of multiple RUs of the set of RUs having preconfigured lengths.

A method of wireless communication at a STA is described. The method may include determining an allocation of a set of RUs, receiving a set of encoded information bits on the set of RUs from an AP, the set of encoded information bits being encoded based on encoding all the information bits associated with the set of data units together or by encoding the information bits of each data unit separately from the encoding of the information bits of the other data units of the set of data units, and decoding the set of encoded information bits associated with the set of RUs based on the receiving.

An apparatus for wireless communication is described. The apparatus may include a processor, memory in electronic communication with the processor, and instructions stored in the memory. The instructions may be executable by the processor to cause the apparatus to determine an allocation of a set of RUs, receive a set of encoded information bits on the set of RUs from an AP, the set of encoded information bits being encoded based on encoding all the information bits associated with the set of data units together or by encoding the information bits of each data unit separately from the encoding of the information bits of the other data units of the set of data units, and decode the set of encoded information bits associated with the set of RUs based on the receiving.

Another apparatus for wireless communication is described. The apparatus may include means for determining an allocation of a set of RUs, receiving a set of encoded information bits on the set of RUs from an AP, the set of encoded information bits being encoded based on encoding all the information bits associated with the set of data units together or by encoding the information bits of each data unit separately from the encoding of the information bits of the other data units of the set of data units, and decoding the set of encoded information bits associated with the set of RUs based on the receiving.

A non-transitory computer-readable medium storing code for wireless communication at a STA is described. The code may include instructions executable by a processor to determine an allocation of a set of RUs, receive a set of encoded information bits on the set of RUs from an AP, the set of encoded information bits being encoded based on encoding all the information bits associated with the set of data units together or by encoding the information bits of each data unit separately from the encoding of the information bits of the other data units of the set of data units, and decode the set of encoded information bits associated with the set of RUs based on the receiving.

In some examples of the method, apparatuses, and non-transitory computer-readable medium described herein, decoding the set of encoded information bits associated with the set of RUs may include operations, features, means, or instructions for decoding all the information bits associated with the set of data units together or by decoding the information bits of each data unit separately from the decoding of the information bits of the other data units of the set of data units.

In some examples of the method, apparatuses, and non-transitory computer-readable medium described herein, at least one RU of the set of RUs may have at least one of a different RU length relative to the other RUs of the set of RUs, a different modulation order relative to the other RUs of the set of RUs, a different modulation coding scheme relative to the other RUs of the set of RUs, a different beam forming configuration, or a different spatial stream relative to the other RUs of the set of RUs.

A method of wireless communication at a STA is described. The method may include encoding a set of information bits associated with a set of data units by jointly encoding all the information bits associated with the set of data units together or by encoding the information bits of each data unit separately from the encoding of the information bits of the other data units of the set of data units, distributing the set of encoded information bits to a set of RUs, the set of RUs associated with two or more available bandwidth segments of a bandwidth allocation, and transmitting the distributed set of encoded information bits on the set of RUs.

An apparatus for wireless communication is described. The apparatus may include a processor, memory in electronic communication with the processor, and instructions stored in the memory. The instructions may be executable by the processor to cause the apparatus to encode a set of information bits associated with a set of data units by jointly encoding all the information bits associated with the set of data units together or by encoding the information bits of each data unit separately from the encoding of the information bits of the other data units of the set of data units, distribute the set of encoded information bits to a set of RUs, the set of RUs associated with two or more available bandwidth segments of a bandwidth allocation, and transmit the distributed set of encoded information bits on the set of RUs.

Another apparatus for wireless communication is described. The apparatus may include means for encoding a set of information bits associated with a set of data units by jointly encoding all the information bits associated with the set of data units together or by encoding the information bits of each data unit separately from the encoding of the information bits of the other data units of the set of data units, distributing the set of encoded information bits to a set of RUs, the set of RUs associated with two or more available bandwidth segments of a bandwidth allocation, and transmitting the distributed set of encoded information bits on the set of RUs.

A non-transitory computer-readable medium storing code for wireless communication at a STA is described. The code may include instructions executable by a processor to encode a set of information bits associated with a set of data units by jointly encoding all the information bits associated with the set of data units together or by encoding the information bits of each data unit separately from the encoding of the information bits of the other data units of the set of data units, distribute the set of encoded information bits to a set of RUs, the set of RUs associated with two or more available bandwidth segments of a bandwidth allocation, and transmit the distributed set of encoded information bits on the set of RUs.

In some examples of the method, apparatuses, and non-transitory computer-readable medium described herein, the two or more RUs may be noncontiguous RUs of the set of RUs. In some examples, distributing the set of encoded information bits to the set of RUs may be further based on the aggregating.

In some examples of the method, apparatuses, and non-transitory computer-readable medium described herein, the two or more available bandwidth segments of the bandwidth allocation may be contiguous and include one or more of the RUs. In some examples, distributing the set of encoded information bits to the set of RUs may be further based on the aggregating.

Some examples of the method, apparatuses, and non-transitory computer-readable medium described herein may further include operations, features, means, or instructions for distributing the set of encoded information bits to the set of RUs may be based on the distributing.

In some examples of the method, apparatuses, and non-transitory computer-readable medium described herein, distributing the set of encoded information bits to the set of RUs may include operations, features, means, or instructions for distributing the set of encoded information bits to the set of RUs sequentially.

In some examples of the method, apparatuses, and non-transitory computer-readable medium described herein, distributing the set of encoded information bits to the set of RUs sequentially may include operations, features, means, or instructions for determining a RU of the set of RUs that may have a first frequency based on comparing relative frequencies of multiple RUs of the set of RUs, and assigning coded bits of the set of encoded information bits to the RU having the first frequency based on the determining.

In some examples of the method, apparatuses, and non-transitory computer-readable medium described herein, distributing the set of encoded information bits to the set of RUs sequentially further may include operations, features, means, or instructions for assigning remaining coded bits of the set of encoded information bits to one or more additional RUs of the set of RUs. In some examples, each of the one or more additional RUs may have a higher frequency than the first frequency.

In some examples of the method, apparatuses, and non-transitory computer-readable medium described herein, assigning coded bits of the set of encoded information bits to the RU having the first frequency may include operations, features, means, or instructions for filling all bits of an OFDM symbol associated with the RU having the first frequency with the coded bits of the set of encoded information bits before filling any bits of a second OFDM symbol.

In some examples of the method, apparatuses, and non-transitory computer-readable medium described herein, the first frequency may be a lowest frequency in the set of RUs.

In some examples of the method, apparatuses, and non-transitory computer-readable medium described herein, distributing the set of encoded information bits to the set of RUs includes distributing the set of encoded information bits to the set of RUs in a cyclical process.

Some examples of the method, apparatuses, and non-transitory computer-readable medium described herein may further include operations, features, means, or instructions for determining one or more of one or more modulation coding schemes or a ratio corresponding to the one or more modulation coding schemes. In some examples, distributing the set of encoded information bits to the set of RUs in the cyclical process is based on one or more of the one or more modulation coding schemes or the ratio corresponding to the one or more modulation coding schemes.

Some examples of the method, apparatuses, and non-transitory computer-readable medium described herein may further include operations, features, means, or instructions for determining a ratio corresponding to one or more modulation coding schemes and a ratio corresponding to two or more RUs of the set of RUs. In some examples, distributing the set of encoded information bits to the set of RUs in the cyclical process is based on the ratio corresponding to one or more modulation coding schemes and the ratio corresponding to two or more RUs of the set of RUs.

Some examples of the method, apparatuses, and non-transitory computer-readable medium described herein may further include operations, features, means, or instructions for forwarding two or more data units of the set of data units using a multi-link aggregation scheme. In some examples, the two or more data units of the set of data units includes PLCP protocol data units.

Some examples of the method, apparatuses, and non-transitory computer-readable medium described herein may further include operations, features, means, or instructions for forwarding, from a MAC layer of the STA, two or more data units of the set of data units to a PHY layer of the STA. In some examples, the two or more data units of the set of data units includes PSDUs, and each PSDU corresponds to a separate bandwidth segment.

Some examples of the method, apparatuses, and non-transitory computer-readable medium described herein may further include operations, features, means, or instructions for assigning, at a MAC layer of the STA, information bits of the set of information bits to the set of RUs, generating, at the MAC layer based on the assigning, the set of data units, each of the data units of the set of data units including a PSDU, and forwarding the set of data units to a PHY layer of the STA. In some examples, transmitting the distributed set of encoded information bits on the set of RUs includes transmitting the distributed set of encoded information bits on the set of RUs via the PHY layer.

Some examples of the method, apparatuses, and non-transitory computer-readable medium described herein may further include operations, features, means, or instructions for receiving the set of data units at the PHY layer of the STA. In some examples, encoding the information bits of each data unit separately includes and encoding the assigned information bits of the set of information bits associated with each data unit of the set of data units separately from the encoding of the information bits associated with the other data units of the set of data units based on the receiving.

In some examples of the method, apparatuses, and non-transitory computer-readable medium described herein, distributing the set of encoded information bits to the set of RUs may include operations, features, means, or instructions for distributing the assigned coded bits of the set of encoded information bits to the set of RUs based on the assigning of the coded bits of the set of encoded information bits to the set of RUs.

In some examples of the method, apparatuses, and non-transitory computer-readable medium described herein, the set of data units may include operations, features, means, or instructions for forwarding, from a MAC layer to a PHY layer of the STA, the one or more PSDUs, the one or more PSDUs carrying the set of information bits, and receiving, at the PHY layer, the one or more PSDUs jointly or independently.

Some examples of the method, apparatuses, and non-transitory computer-readable medium described herein may further include operations, features, means, or instructions for assigning, at the PHY layer of the STA, information bits of the set of information bits to the set of RUs.

In some examples of the method, apparatuses, and non-transitory computer-readable medium described herein, distributing the set of encoded information bits to the set of RUs may include operations, features, means, or instructions for distributing the set of assigned coded bits to the set of RUs based on the assigning of the coded bits of the set of encoded information bits to the set of RUs.

In some examples of the method, apparatuses, and non-transitory computer-readable medium described herein, distributing the set of assigned coded bits to the set of RUs may include operations, features, means, or instructions for distributing coded bits to the set of RUs sequentially by assigning one or more coded bits of the set of assigned coded bits to two or more RUs of the set of RUs before assigning one or more other coded bits to one or more other RUs of the set of RUs.

In some examples of the method, apparatuses, and non-transitory computer-readable medium described herein, distributing the set of assigned coded bits to the set of RUs may include operations, features, means, or instructions for distributing coded bits to the set of RUs sequentially by assigning one or more coded bits of the set of assigned coded bits to each RU of the set of RUs before assigning one or more other coded bits to one or more other RUs of the set of RUs.

In some examples of the method, apparatuses, and non-transitory computer-readable medium described herein, distributing the set of assigned coded bits to the set of RUs may include operations, features, means, or instructions for distributing coded bits to the set of RUs sequentially by assigning coded bits of the set of assigned coded bits to a first RU of the set of RUs and assigning remaining coded bits of the set of assigned coded bits to one or more other RUs of the set of RUs different than the first RU after all the bits of an OFDM symbol of the first RU may be filled.

Some examples of the method, apparatuses, and non-transitory computer-readable medium described herein may further include operations, features, means, or instructions for determining, at the PHY layer of the STA, that a RU size of a RU of the set of RUs satisfies a threshold. In some examples, the threshold includes an available bandwidth segment of the two or more available bandwidth segments of the bandwidth allocation, assigning, at the PHY layer of the STA, the RU of the set of RUs to the available bandwidth segment, and distributing, at the PHY layer of the STA, the set of encoded information bits to the RU of the set of RUs based on assigning the RU of the set of RUs to the available bandwidth segment.

Some examples of the method, apparatuses, and non-transitory computer-readable medium described herein may further include operations, features, means, or instructions for determining, at the PHY layer of the station, that a first RU size of a first RU of the set of RUs and a second RU size of a second RU of the set of RUs satisfies a threshold. In some examples, the threshold includes an available bandwidth segment of the two or more available bandwidth segments of the bandwidth allocation. In some examples, the PHY layer includes a set of encoders for separately encoding the assigned information bits of the set of information bits associated with the set of data units, assigning, at the PHY layer of the station, the first RU and the second RU to the two or more available bandwidth segments of the bandwidth allocation, the first RU having the first RU size and the second RU having the second RU size, and determining a ratio corresponding to one or more modulation coding schemes associated with the first RU and the second RU. In some examples, distributing the set of encoded information bits to the set of RUs includes distributing the set of encoded information bits to the first RU of the set of RUs and the second RU of the set of RUs based at least in part on the first RU size of the first RU of the set of RUs, the second RU size of the second RU of the set of RUs and the ratio corresponding to one or more modulation coding schemes associated with the first RU and the second RU.

In some examples of the method, apparatuses, and non-transitory computer-readable medium described herein, distributing the set of encoded information bits to the first RU of the set of RUs and the second RU of the set of RUs includes distributing the set of encoded information bits to the first RU of the set of RUs and the second RU of the set of RUs in a cyclical process based on the two or more available bandwidth segments of the bandwidth allocation associated with the first RU of the set of RUs and the second RU of the set of RUs.

In some examples of the method, apparatuses, and non-transitory computer-readable medium described herein, distributing the set of encoded information bits to the first RU of the set of RUs and the second RU of the set of RUs includes distributing the set of encoded information bits to the first RU of the set of RUs and the second RU of the set of RUs sequentially.

In some examples of the method, apparatuses, and non-transitory computer-readable medium described herein, distributing the set of encoded information bits to the first RU of the set of RUs and the second RU of the set of RUs sequentially includes assigning coded bits of the set of encoded information bits to the first RU of the set of RUs, the first RU corresponding to a first bandwidth segment of the bandwidth allocation. In some examples, the first bandwidth segment includes a 160 megahertz (MHz) segment, and assigning remaining coded bits of the set of encoded information bits to the second RU of the set of RUs after assigning the coded bits of the set of encoded information bits to the first RU, the second RU corresponding to a second bandwidth segment of the bandwidth allocation. In some examples, the second bandwidth segment includes a 160 MHz segment.

Some examples of the method, apparatuses, and non-transitory computer-readable medium described herein may further include operations, features, means, or instructions for determining, at the PHY layer of the STA, that each RU unit size of the set of RUs satisfies a threshold. In some examples, the threshold includes an available bandwidth segment of the two or more available bandwidth segments of the bandwidth allocation, assigning, at the PHY layer of the STA, RUs of the set of RUs to the available bandwidth segment of the two or more available bandwidth segments of the bandwidth allocation. In some examples, distributing the set of encoded information bits to the set of RUs may include distributing the set of encoded information bits to the RUs of the set of RUs based on assigning the RUs of the set of RUs to the available bandwidth segment.

Some examples of the method, apparatuses, and non-transitory computer-readable medium described herein may further include operations, features, means, or instructions for performing a RU interleaving of the set of encoded information bits within each RU of the set of RUs.

In some examples of the method, apparatuses, and non-transitory computer-readable medium described herein, the PHY layer includes an RU parser and a bandwidth segment parser. In some examples, the RU parser distributes the set of encoded information bits to the set of RUs, and the bandwidth segment parser assigns coded bits of each RU of the set of RUs to each available bandwidth segment within each RU of the set of RUs. In some examples, the available bandwidth segment includes an 80 MHz segment.

In some examples of the method, apparatuses, and non-transitory computer-readable medium described herein, the bandwidth segment parser assigns coded bits of each RU of the set of RUs to each available bandwidth segment within each RU of the set of RUs prior to the RU parser distributing the coded bits of each RU of the set of RUs within each available bandwidth segment.

In some examples of the method, apparatuses, and non-transitory computer-readable medium described herein, the bandwidth segment parser assigns coded bits of each RU of the set of RUs to each available bandwidth segment within each RU of the set of RUs in a cyclical process.

Some examples of the method, apparatuses, and non-transitory computer-readable medium described herein may further include operations, features, means, or instructions for determining an unavailable bandwidth segment of the two or more available bandwidth segments of the bandwidth allocation, and puncturing the unavailable bandwidth segment of the bandwidth allocation. In some examples, puncturing the unavailable bandwidth segment includes puncturing one or more frequency tones in the unavailable bandwidth segment.

Some examples of the method, apparatuses, and non-transitory computer-readable medium described herein may further include operations, features, means, or instructions for performing an interleaving of the set of encoded information bits within a transmission bandwidth based at least in part on the puncturing. In some examples, the interleaving includes distributing the set of encoded information bits to the available bandwidth segment and skipping the punctured one or more frequency tones in the unavailable bandwidth segment.

In some examples of the method, apparatuses, and non-transitory computer-readable medium described herein, the PHY layer includes a set of encoders for encoding the assigned information bits associated with each data unit of the set of data units separately, and the PHY layer processes each RU of the set of RUs independently.

In some examples of the method, apparatuses, and non-transitory computer-readable medium described herein, the assigning of the information bits of the set of information bits to the set of RUs occurs before encoding the set of information bits associated with the set of data units separately.

Some examples of the method, apparatuses, and non-transitory computer-readable medium described herein may further include operations, features, means, or instructions for distributing the set of encoded information bits to the set of RUs may be further based on the performing.

Some examples of the method, apparatuses, and non-transitory computer-readable medium described herein may further include operations, features, means, or instructions for jointly scrambling the set of information bits associated with the set of data units includes using a same scrambling sequence for all of the information bits of the set of information bits.

In some examples of the method, apparatuses, and non-transitory computer-readable medium described herein, scrambling the information bits of each data unit associated with the set of data units separately from the scrambling of the information bits of the other data units of the set of data units may include operations, features, means, or instructions for using an equivalent scrambling sequence for information bits of the set of information bits distributed to different RUs of the set of RUs.

In some examples of the method, apparatuses, and non-transitory computer-readable medium described herein, scrambling the information bits of each data unit associated with the set of data units separately from the scrambling of the information bits of the other data units of the set of data units may include operations, features, means, or instructions for using a different scrambling seed for information bits of the set of information bits distributed to different RUs of the set of RUs.

In some examples of the method, apparatuses, and non-transitory computer-readable medium described herein, encoding the set of information bits associated with the set of data units jointly or separately may include operations, features, means, or instructions for encoding the set of information bits associated with the set of data units based on an interleaving scheme.

In some examples of the method, apparatuses, and non-transitory computer-readable medium described herein, the interleaving scheme includes an LDPC tone interleaving scheme or a BCC interleaving scheme.

Some examples of the method, apparatuses, and non-transitory computer-readable medium described herein may further include operations, features, means, or instructions for determining an aggregate RU that includes the set of RUs, determining an aggregate RU size associated with the set of RUs based on RU sizes of individual RUs of the set of RUs, and applying the interleaving scheme to the aggregate RU.

Some examples of the method, apparatuses, and non-transitory computer-readable medium described herein may further include operations, features, means, or instructions for determining that the aggregate RU size associated with the set of RUs includes a default aggregate RU size, determining that an existing mapping distance parameter may be valid or invalid based on the aggregate RU size including the default aggregate RU size, and preserving pilot tone locations in each RU of the aggregate RU associated with the set of RUs. In some examples, the interleaving scheme include an LDPC tone interleaving scheme using the preserved pilot tone locations in each RU of the aggregate RU.

Some examples of the method, apparatuses, and non-transitory computer-readable medium described herein may further include operations, features, means, or instructions for determining that the aggregate RU size associated with the set of RUs includes a default aggregate RU size, determining that an existing mapping distance parameter may be valid based on the aggregate RU size including the default aggregate RU size, preserving the existing mapping distance parameter for the aggregate RU size, and determining pilot tone locations in the aggregate RU. In some examples, the interleaving scheme includes an LDPC tone interleaving scheme using the identified pilot tone locations in the aggregate RU.

Some examples of the method, apparatuses, and non-transitory computer-readable medium described herein may further include operations, features, means, or instructions for determining that the aggregate RU size associated with the set of RUs includes an aggregate RU size different than a default aggregate RU size, determining a mapping distance parameter based on the aggregate RU size, and determining one or more pilot tone locations in the aggregate RU. In some examples, the interleaving scheme includes an LDPC tone interleaving scheme using one or more of the mapping distance parameter and pilot tone locations in the aggregate RU.

In some examples of the method, apparatuses, and non-transitory computer-readable medium described herein, determining the one or more pilot tone locations in the aggregate RU includes using one or more neighboring leftover tones or a twenty-six tones RU associated with an unavailable bandwidth segment.

In some examples of the method, apparatuses, and non-transitory computer-readable medium described herein, distributing the set of encoded information bits to the set of RUs may include operations, features, means, or instructions for determining a quantity of OFDM symbol associated with a data field of a packet based on one or more of a space-time block coding parameter value, a length parameter value, a coding scheme parameter value, a payload bit parameter value, or an LDPC encoding parameter value. In some examples, the packet carries the set of information bits.

In some examples of the method, apparatuses, and non-transitory computer-readable medium described herein, the set of data units includes at least one data unit carrying the set of information bits, the at least one data unit including a PSDU.

In some examples of the method, apparatuses, and non-transitory computer-readable medium described herein, encoding the set of information bits associated with the set of data units jointly may include operations, features, means, or instructions for applying an equivalent code rate to the set of information bits associated with all data units of the set of data units.

In some examples of the method, apparatuses, and non-transitory computer-readable medium described herein, at least one RU of the set of RUs may have at least one of a different RU length relative to the other RUs of the set of RUs, a different modulation order relative to the other RUs of the set of RUs, a different modulation coding scheme relative to the other RUs of the set of RUs, a different beam forming configuration, or a different spatial stream relative to the other RUs of the set of RUs.

In some examples of the method, apparatuses, and non-transitory computer-readable medium described herein, the bandwidth allocation includes a noncontiguous bandwidth allocation.

In some examples of the method, apparatuses, and non-transitory computer-readable medium described herein, the bandwidth allocation includes a contiguous subband having a length equal to a sum of multiple RUs of the set of RUs having preconfigured lengths.

A method of wireless communication at an AP is described. The method may include receiving a set of encoded information bits on the set of RUs from a STA in a BSS of the AP, the set of encoded information bits being encoded based on encoding all the information bits associated with the set of data units together or by encoding the information bits of each data unit separately from the encoding of the information bits of the other data units of the set of data units and decoding the set of encoded information bits associated with the set of RUs based on the receiving.

An apparatus for wireless communication is described. The apparatus may include a processor, memory in electronic communication with the processor, and instructions stored in the memory. The instructions may be executable by the processor to cause the apparatus to receive a set of encoded information bits on the set of RUs from a STA in a BSS of the apparatus, the set of encoded information bits being encoded based on encoding all the information bits associated with the set of data units together or by encoding the information bits of each data unit separately from the encoding of the information bits of the other data units of the set of data units and decode the set of encoded information bits associated with the set of RUs based on the receiving.

Another apparatus for wireless communication is described. The apparatus may include means for receiving a set of encoded information bits on the set of RUs from a STA in a BSS of the apparatus, the set of encoded information bits being encoded based on encoding all the information bits associated with the set of data units together or by encoding the information bits of each data unit separately from the encoding of the information bits of the other data units of the set of data units and decoding the set of encoded information bits associated with the set of RUs based on the receiving.

A non-transitory computer-readable medium storing code for wireless communication at an AP is described. The code may include instructions executable by a processor to receive a set of encoded information bits on the set of RUs from a STA in a BSS of the AP, the set of encoded information bits being encoded based on encoding all the information bits associated with the set of data units together or by encoding the information bits of each data unit separately from the encoding of the information bits of the other data units of the set of data units and decode the set of encoded information bits associated with the set of RUs based on the receiving.

In some examples of the method, apparatuses, and non-transitory computer-readable medium described herein, decoding the set of encoded information bits associated with the set of RUs may include operations, features, means, or instructions for decoding all the information bits associated with the set of data units together or by decoding the information bits of each data unit separately from the decoding of the information bits of the other data units of the set of data units.

In some examples of the method, apparatuses, and non-transitory computer-readable medium described herein, at least one RU of the set of RUs may have at least one of a different RU length relative to the other RUs of the set of RUs, a different modulation order relative to the other RUs of the set of RUs, a different modulation coding scheme relative to the other RUs of the set of RUs, a different beam forming configuration, or a different spatial stream relative to the other RUs of the set of RUs.

A method for wireless communication at a station is described. The method may include determining an allocation of a set of resource units, receiving a set of encoded information bits on the set of resource units from an access point, the set of encoded information bits being encoded based on encoding all information bits associated with a set of data units together or by encoding the information bits of each data unit separately from encoding information bits of other data units of the set of data units, and decoding the set of encoded information bits associated with the set of resource units based on the receiving.

An apparatus for wireless communication at a station is described. The apparatus may include a processor, memory in electronic communication with the processor, and instructions stored in the memory. The instructions may be executable by the processor to cause the apparatus to determine an allocation of a set of resource units, receive a set of encoded information bits on the set of resource units from an access point, the set of encoded information bits being encoded based on encoding all information bits associated with a set of data units together or by encoding the information bits of each data unit separately from encoding information bits of other data units of the set of data units, and decode the set of encoded information bits associated with the set of resource units based on the receiving.

Another apparatus for wireless communication at a station is described. The apparatus may include means for determining an allocation of a set of resource units, means for receiving a set of encoded information bits on the set of resource units from an access point, the set of encoded information bits being encoded based on encoding all information bits associated with a set of data units together or by encoding the information bits of each data unit separately from encoding information bits of other data units of the set of data units, and means for decoding the set of encoded information bits associated with the set of resource units based on the receiving.

A non-transitory computer-readable medium storing code for wireless communication at a station is described. The code may include instructions executable by a processor to determine an allocation of a set of resource units, receive a set of encoded information bits on the set of resource units from an access point, the set of encoded information bits being encoded based on encoding all information bits associated with a set of data units together or by encoding the information bits of each data unit separately from encoding information bits of other data units of the set of data units, and decode the set of encoded information bits associated with the set of resource units based on the receiving.

In some examples of the method, apparatuses, and non-transitory computer-readable medium described herein, decoding the set of encoded information bits associated with the set of resource units may include operations, features, means, or instructions for decoding all the information bits associated with the set of data units together or by decoding the information bits of each data unit separately from the decoding of the information bits of other data units of the set of data units.

A method for wireless communication at a station is described. The method may include encoding a set of information bits associated with a set of data units, distributing the set of encoded information bits to one or more data units associated with communication between the station and an access point, and transmitting the distributed set of encoded information bits on the one or more data units.

An apparatus for wireless communication at a station is described. The apparatus may include a processor, memory in electronic communication with the processor, and instructions stored in the memory. The instructions may be executable by the processor to cause the apparatus to encode a set of information bits associated with a set of data units, distribute the set of encoded information bits to one or more data units associated with communication between the station and an access point, and transmit the distributed set of encoded information bits on the one or more data units.

Another apparatus for wireless communication at a station is described. The apparatus may include means for encoding a set of information bits associated with a set of data units, means for distributing the set of encoded information bits to one or more data units associated with communication between the station and an access point, and means for transmitting the distributed set of encoded information bits on the one or more data units.

A non-transitory computer-readable medium storing code for wireless communication at a station is described. The code may include instructions executable by a processor to encode a set of information bits associated with a set of data units, distribute the set of encoded information bits to one or more data units associated with communication between the station and an access point, and transmit the distributed set of encoded information bits on the one or more data units.

In some examples of the method, apparatuses, and non-transitory computer-readable medium described herein, distributing the set of encoded information bits to the one or more data units may include operations, features, means, or instructions for distributing the set of encoded information bits to the one or more data units sequentially, distributing the set of encoded information bits to the one or more data units in a cyclical process, or distributing the set of encoded information bits to the one or more data units in the cyclical process based on a ratio of the one or more data units to the set of data units.

In some examples of the method, apparatuses, and non-transitory computer-readable medium described herein, distributing the set of encoded information bits to the one or more data units may include operations, features, means, or instructions for assigning remaining coded bits of the set of encoded information bits to one or more additional data units of the set of data units sequentially, assigning remaining coded bits of the set of encoded information bits to the one or more additional data units in the cyclical process, or assigning remaining coded bits of the set of encoded information bits to the one or more additional data units of the set of data units in the cyclical process based on a ratio of the one or more remaining coded bits to the one or more additional data units.

In some examples of the method, apparatuses, and non-transitory computer-readable medium described herein, distributing the set of encoded information bits to the one or more data units may include operations, features, means, or instructions for distributing the set of encoded information bits to the set of data units associated with two or more available bandwidth segments of a bandwidth allocation.

In some examples of the method, apparatuses, and non-transitory computer-readable medium described herein, distributing the set of encoded information bits to the set of data units may include operations, features, means, or instructions for distributing the set of encoded information bits to the set of data units sequentially.

In some examples of the method, apparatuses, and non-transitory computer-readable medium described herein, distributing the set of encoded information bits to the set of data units sequentially may include operations, features, means, or instructions for determining a data unit of the set of data units that may have a first frequency based on comparing relative frequencies of multiple data units of the set of data units, and assigning coded bits of the set of encoded information bits to the data unit having the first frequency based on the determining.

In some examples of the method, apparatuses, and non-transitory computer-readable medium described herein, distributing the set of encoded information bits to the set of data units sequentially further may include operations, features, means, or instructions for assigning remaining coded bits of the set of encoded information bits to one or more additional data units of the set of data units, where each of the one or more additional data units may have a larger size than the data units having the first frequency.

In some examples of the method, apparatuses, and non-transitory computer-readable medium described herein, assigning coded bits of the set of encoded information bits to the data unit having the first frequency may include operations, features, means, or instructions for filling all bits of a orthogonal frequency division multiplexing (OFDM) symbol associated with the data unit having the first frequency with the coded bits of the set of encoded information bits before filling any bits of a second OFDM symbol.

In some examples of the method, apparatuses, and non-transitory computer-readable medium described herein, distributing the set of encoded information bits to the set of data units may include operations, features, means, or instructions for distributing the set of encoded information bits to the set of data units in a cyclical process.

Some examples of the method, apparatuses, and non-transitory computer-readable medium described herein may further include operations, features, means, or instructions for distributing the set of encoded information bits to the set of data units in the cyclical process may be based on one or more of the one or more modulation coding schemes or the ratio corresponding to the one or more modulation coding schemes.

Some examples of the method, apparatuses, and non-transitory computer-readable medium described herein may further include operations, features, means, or instructions for distributing the set of encoded information bits to the set of data units in the cyclical process may be based on the ratio corresponding to one or more modulation coding schemes and the ratio corresponding to the two or more data units of the set of data units.

Some examples of the method, apparatuses, and non-transitory computer-readable medium described herein may further include operations, features, means, or instructions for two or more data units of the set of data units each include physical layer convergence procedure (PLCP) protocol data units.

Some examples of the method, apparatuses, and non-transitory computer-readable medium described herein may further include operations, features, means, or instructions for assigning, at a MAC layer of the station, information bits of the set of information bits to a set of resource units, generating, at the MAC layer based on the assigning, the set of data units, each data unit of the set of data units including a PSDU, and forwarding the set of data units to a PHY layer of the station, where transmitting the distributed set of encoded information bits on includes transmitting the distributed set of encoded information bits on the set of resource units via the PHY layer.

In some examples of the method, apparatuses, and non-transitory computer-readable medium described herein, the set of data units may include operations, features, means, or instructions for forwarding, from the MAC layer to the PHY layer of the station, the one or more PSDUs, the one or more PSDUs carrying the set of information bits, and receiving, at the PHY layer, the one or more PSDUs jointly or independently.

Some examples of the method, apparatuses, and non-transitory computer-readable medium described herein may further include operations, features, means, or instructions for determining, at a PHY layer of the station, that a resource unit size of a resource unit of a set of resource units satisfies a threshold, where the threshold includes an available bandwidth segment of the two or more available bandwidth segments of the bandwidth allocation, assigning, at the PHY layer of the station, the resource unit of the set of resource units to the available bandwidth segment, and distributing, at the PHY layer of the station, the set of encoded information bits to the resource unit of the set of resource units based on assigning the resource unit of the set of resource units to the available bandwidth segment.

Some examples of the method, apparatuses, and non-transitory computer-readable medium described herein may further include operations, features, means, or instructions for determining, at a PHY layer of the station, that a first resource unit size of a first resource unit of a set of resource units and a second resource unit size of a second resource unit of the set of resource units satisfies a threshold, where the threshold includes an available bandwidth segment of the two or more available bandwidth segments of the bandwidth allocation, where the PHY layer includes a set of encoders for separately encoding information bits of the set of information bits associated with the set of data units, assigning, at the PHY layer of the station, the first resource unit and the second resource unit to the two or more available bandwidth segments of the bandwidth allocation, the first resource unit having the first resource unit size and the second resource unit having the second resource unit size, and determining a ratio corresponding to one or more modulation coding schemes associated with the first resource unit and the second resource unit, where distributing the set of encoded information bits to the set of resource units includes distributing the set of encoded information bits to the first resource unit of the set of resource units and the second resource unit of the set of resource units based on the first resource unit size of the first resource unit of the set of resource units, the second resource unit size of the second resource unit of the set of resource units and the ratio corresponding to one or more modulation coding schemes associated with the first resource unit and the second resource unit.

In some examples of the method, apparatuses, and non-transitory computer-readable medium described herein, distributing the set of encoded information bits to the first resource unit of the set of resource units and the second resource unit of the set of resource units may include operations, features, means, or instructions for distributing the set of encoded information bits to the first resource unit of the set of resource units and the second resource unit of the set of resource units in a cyclical process based on the two or more available bandwidth segments of the bandwidth allocation associated with the first resource unit of the set of resource units and the second resource unit of the set of resource units.

In some examples of the method, apparatuses, and non-transitory computer-readable medium described herein, distributing the set of encoded information bits to the first resource unit of the set of resource units and the second resource unit of the set of resource units may include operations, features, means, or instructions for distributing the set of encoded information bits to the first resource unit of the set of resource units and the second resource unit of the set of resource units sequentially.

In some examples of the method, apparatuses, and non-transitory computer-readable medium described herein, distributing the set of encoded information bits to the first resource unit of the set of resource units and the second resource unit of the set of resource units sequentially may include operations, features, means, or instructions for assigning coded bits of the set of encoded information bits to the first resource unit of the set of resource units, the first resource unit corresponding to a first bandwidth segment of the bandwidth allocation, where the first bandwidth segment includes a 160 megahertz (MHz) segment, and assigning remaining coded bits of the set of encoded information bits to the second resource unit of the set of resource units after assigning the coded bits of the set of encoded information bits to the first resource unit, the second resource unit corresponding to a second bandwidth segment of the bandwidth allocation, where the second bandwidth segment includes a 160 MHz segment.

Some examples of the method, apparatuses, and non-transitory computer-readable medium described herein may further include operations, features, means, or instructions for determining, at a PHY layer of the station, that each resource unit size of a set of resource units satisfies a threshold, where the threshold includes an available bandwidth segment of the two or more available bandwidth segments of the bandwidth allocation, assigning, at the PHY layer of the station, resource units of the set of resource units to the available bandwidth segment of the two or more available bandwidth segments of the bandwidth allocation, and where distributing the set of encoded information bits to the set of resource units includes distributing the set of encoded information bits to the resource units of the set of resource units based on assigning the resource units of the set of resource units to the available bandwidth segment.

In some examples of the method, apparatuses, and non-transitory computer-readable medium described herein, the PHY layer includes a resource unit parser and a bandwidth segment parser, where the resource unit parser distributes the set of encoded information bits to the set of resource units, and a bandwidth segment parser assigns coded bits of each resource unit of the set of resource units to each available bandwidth segment within each resource unit of the set of resource units, where the available bandwidth segment includes an 80 megahertz (MHz) segment.

In some examples of the method, apparatuses, and non-transitory computer-readable medium described herein, the bandwidth segment parser assigns coded bits of each resource unit of the set of resource units to each available bandwidth segment within each resource unit of the set of resource units prior to the resource unit parser distributing the coded bits of each resource unit of the set of resource units within each available bandwidth segment.

Some examples of the method, apparatuses, and non-transitory computer-readable medium described herein may further include operations, features, means, or instructions for determining an unavailable bandwidth segment of the two or more available bandwidth segments of the bandwidth allocation, and puncturing the unavailable bandwidth segment of the bandwidth allocation, where puncturing the unavailable bandwidth segment includes puncturing one or more frequency tones in the unavailable bandwidth segment.

In some examples of the method, apparatuses, and non-transitory computer-readable medium described herein, the interleaving includes distributing the set of encoded information bits to the available bandwidth segment and skipping the punctured one or more frequency tones in the unavailable bandwidth segment.

Some examples of the method, apparatuses, and non-transitory computer-readable medium described herein may further include operations, features, means, or instructions for encoding the set of information bits associated with the set of data units includes jointly encoding the set of information bits associated with the set of data units together, where each data unit includes one of a resource unit, an aggregated resource unit, or a bandwidth segment.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

DETAILED DESCRIPTION

Figure 1:
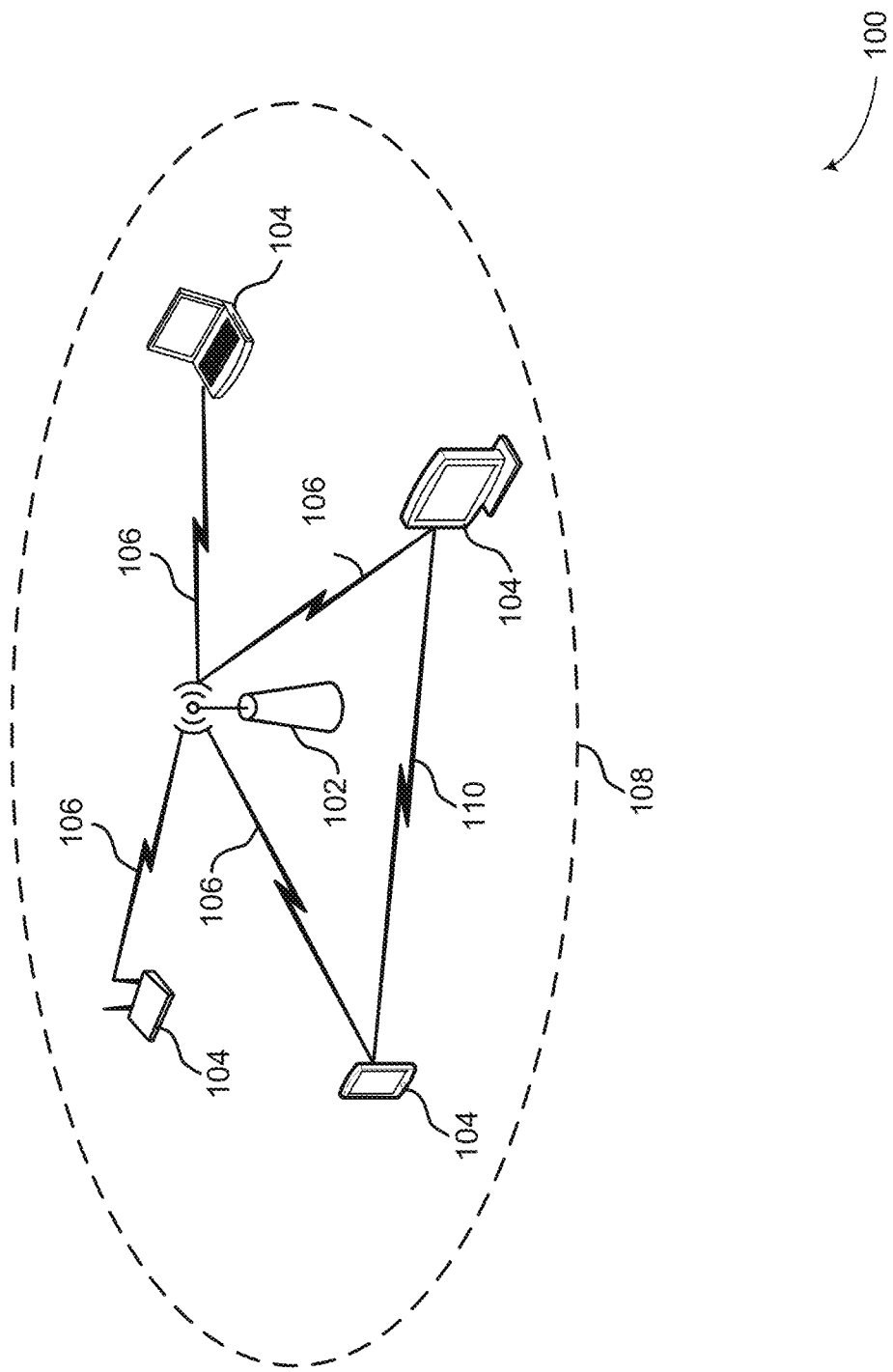
FIG. 1 illustrates an example of a wireless communication system that supports data parsing to support resource unit (RU) aggregation in accordance with aspects of the present disclosure.

The following description is directed to particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), third generation (3G), fourth generation (4G), or fifth generation (5G) (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to data parsing schemes for flexible channel aggregation over a noncontiguous bandwidth. The noncontiguous bandwidth may correspond to one or more bandwidth segments of an extended basic service set (BSS). In some examples, one or more non-primary or primary channels may be occupied by data traffic associated with overlapping BSSs (OBSSs) or incumbent technologies. Some implementations more specifically relate to a wireless communication device (such as an access point (AP) or a station (STA)) that may be configured to aggregate a set of data units as part of a communication (for example, a SU transmission) with an associated recipient device. The wireless communication device may determine a data parsing and encoding scheme for distributing bits of a data payload across the aggregated set of data units. In some examples, a data unit may be a resource unit (RU), an aggregated RU, or a bandwidth segment. For example, the wireless communication device may be configured to aggregate a set of RUs as part of a communication (for example, a SU transmission) with an associated recipient device. The wireless communication device may determine a data parsing and encoding scheme for distributing bits of a data payload across the aggregated set of RUs. In other examples, the wireless communication device may be configured to aggregate a set of bandwidth segments as part of a communication (for example, a SU transmission) with an associated recipient device. The wireless communication device may determine a data parsing and encoding scheme for distributing bits of a data payload across the aggregated set of bandwidth segments. A recipient device may receive physical (PHY) layer signaling from the wireless communication device and decode the distributed bits carried on the multiple RUs, as well as process one or more low-density parity check tones for linear error correction on the multiple RUs.

By way of example, in a 320 megahertz (MHz) BSS, which may include two 160 MHz bandwidth segments (for example, 160 MHz+160 MHz), the AP or the STA may support joint encoding over the entire 320 MHz bandwidth segment or separate encoding on each 160 MHz bandwidth segment. In some examples, irrespective of encoding method (for example, joint encoding or separate encoding), the AP or the STA may support a per-80 MHz bandwidth segment parser over multiple bandwidth segments (for example, four 80 MHz bandwidth segments) in the 320 MHz bandwidth. Each bandwidth segment may include multiple RUs (for example, multiple RUs within each 80 MHz bandwidth segment). In some examples, each bandwidth segment may include multiple RUs (for example, multiple RUs within each 160 MHz subband).

In some examples, a medium access control (MAC) layer of the wireless communication device may indicate a single PHY service data unit (PSDU). At the PHY layer, the included data payload of the PSDU may be distributed to the set of RUs based on a data parsing scheme. In some examples, the wireless communication device may encode the bits included in the data payload prior to distributing the encoded bits to the set of RUs. The bits distributed across the set of RUs may have a same coding rate corresponding to a joint encoding for RU aggregation. Alternatively, the wireless communication device may segment the bits to the set of RUs and perform separate encoding and interleaving for each RU. In other examples, the data parsing may be performed at the MAC layer and may be carried via multiple PSDUs to the PHY layer for separate encoding and interleaving for each RU.

In some implementations of RU aggregation applied to a PSDU, some example data parsing implementations may include pre-encoding parsing (for example, using multiple low-density parity check (LDPC) encoders, one LDPC encoder for each RU) or post-encoding parsing (for example, one LDPC encoder followed by a bandwidth segment parser/RU parser). In some examples, some data parsing implementations may include RU aggregation applied to multiple PSDUs. In some example implementations, RU aggregation may include parsing and interleaving after encoding.

According to some aspects, some implementations described herein may include parsing associated with bandwidth segments (for example, 80 MHz segments) for punctured transmission. In some implementations, parsing may be performed before or after encoding. For example, some implementations may include parsing associated with 80 MHz segments before or after forward error correction (FEC) encoding. In some examples, pre-FEC encoding (for example, parsing 80 MHz segments before FEC encoding) may include determining and indicating an additional LDPC symbol for each LDPC encoder involved in the encoding. Example implementations of pre-FEC encoding may include aligning the extra symbol for an entire bandwidth allocation. To reduce memory storage, some example implementations of pre-FEC encoding may include storing partially decoded codewords for each LDPC encoder. In some examples, post-FEC encoding (for example, parsing 80 MHz segments after FEC encoding) may include determining an additional LDPC symbol for an entire bandwidth allocation, which may reduce processing overhead. To decrease memory storage, some example implementations of post-FEC encoding may include storing a partially decoded codeword for an entire bandwidth allocation.

Example implementations are described herein which may include post-FEC parsing associated with 80 MHz segments. Some example implementations may include optimizing interleaving parameters for segments spanning up to 80 MHz. In some aspects, for transmissions greater than 80 MHz, some example implementations may include data parsing for each 80 MHz segment. Example implementations described herein may be compatible with legacy communications standards. Implementations described herein may include parsing for each 80 MHz segment based on a cyclical process ("round robin parsing"), for example, for RUs spanning a bandwidth greater than 80 MHz.

Particular implementations of the subject matter described in this disclosure can be implemented to realize one or more of the following potential advantages. In some implementations, the described techniques can be used to enhance signaling capability for communications associated with high efficiency (HE) WLAN operations (such as defined in IEEE 802.11ax) or extremely high throughput (EHT) operations (such as defined in IEEE 802.11be). The enhanced signaling capability may more specifically relate to SU transmissions and promote increased spectral efficiency and signaling throughput over non-adjacent RUs within a wireless channel.

FIG. 1 illustrates an example of a wireless communication system 100 that supports data parsing to support RU aggregation in accordance with aspects of the present disclosure. According to some aspects, the wireless communication system 100 can be an example of a WLAN such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple STAs 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a BSS, which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a BSS identifier (BSSID), which may be a MAC address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs)). In some examples, one TU may be equal to 1024 microseconds (s)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some examples, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some examples, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and MAC layers. The APs 102 and STAs 104 transmit and receive wireless communications (hereinafter also referred to as "Wi-Fi communications") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands. In some examples, multiple operators may have a license to operate in the same or overlapping frequency band or bands.

Each of the frequency bands may include multiple sub-bands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz. But larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PSDU. The information provided in the preamble may be used by a receiving device to decode the subsequent data in the PSDU.

In instances in which PPDUs are transmitted over a bonded channel, the preamble fields may be duplicated and transmitted in each of the multiple component channels. The legacy preamble may be used for packet detection, automatic gain control and channel estimation, among other uses. The legacy preamble also may be used to maintain compatibility with legacy devices. The format of, coding of, and information provided in the non-legacy portion of the preamble is based on the particular IEEE 802.11 protocol.

Figure 2A:
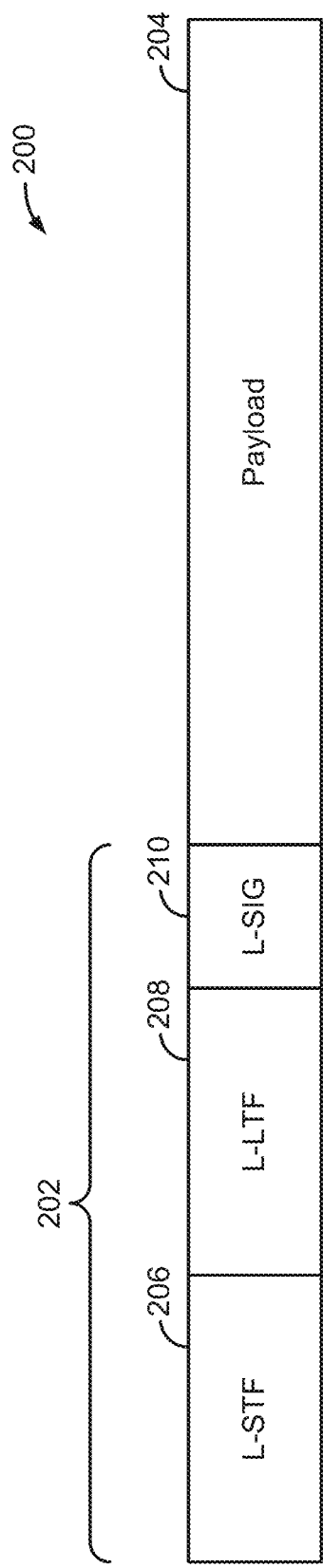
FIGS. 2A and 2B illustrate examples of protocol data units (PDUs) usable for communications between an access point (AP) and one or more stations (STAs) that support data parsing to support RU aggregation in accordance with aspects of the present disclosure.

FIG. 2A shows an example protocol data unit (PDU) 200 usable for communications between an AP and one or more STAs that support data parsing to support RU aggregation in accordance with aspects of the present disclosure. For example, the PDU 200 can be configured as a PPDU. As shown, the PDU 200 includes a PHY preamble 202 and a PHY payload 204. For example, the PHY preamble 202 may include a legacy portion that itself includes a legacy short training field (L-STF) 206, a legacy long training field (L-LTF) 208, and a legacy signaling field (L-SIG) 210. The PHY preamble 202 may also include a non-legacy portion (not shown). The L-STF 206 generally enables a receiving device to perform automatic gain control (AGC) and coarse timing and frequency estimation. The L-LTF 208 generally enables a receiving device to perform fine timing and frequency estimation and also to estimate the wireless channel. The L-SIG 210 generally enables a receiving device to determine a duration of the PDU and use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may generally carry higher layer data, for example, in the form of MAC protocol data units (MPDUs) or aggregated MPDUs (A-MPDUs).

Figure 2B:
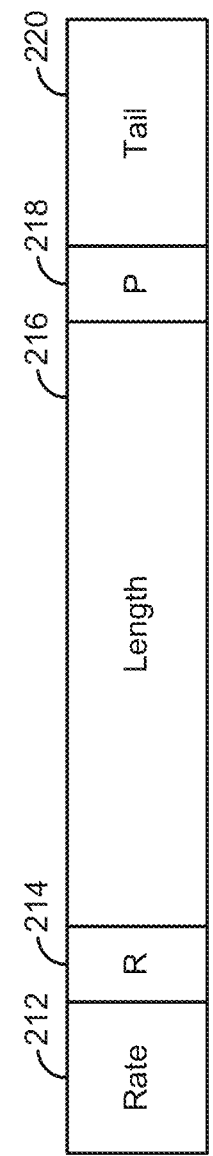

FIG. 2B shows an example L-SIG field 210 in the PDU of FIG. 2A usable for communications between an access point (AP) and one or more STAs that support data parsing to support RU aggregation in accordance with aspects of the present disclosure. The L-SIG 210 includes a data rate field 212, a reserved bit 214, a length field 216, a parity bit 218, and a tail field 220. The data rate field 212 indicates a data rate (note that the data rate indicated in the data rate field 212 may not be the actual data rate of the data carried in the payload 204). The length field 216 indicates a length of the packet in units of, for example, bytes. The parity bit 218 is used to detect a bit error. The tail field 220 includes tail bits that are used by the receiving device to terminate operation of a decoder (for example, a Viterbi decoder). The receiving device utilizes the data rate and the length indicated in the data rate field 212 and the length field 216 to determine a duration of the packet in units of, for example, microseconds (μs).

Figure 3A:
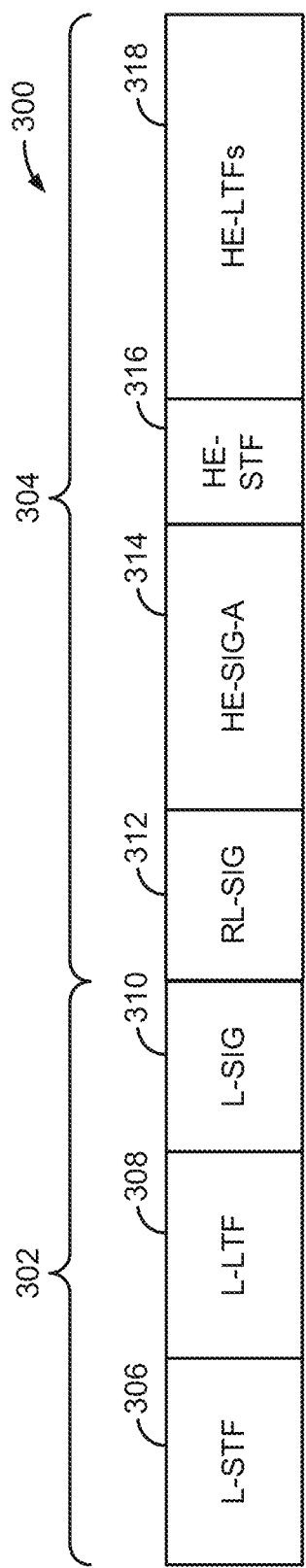
FIGS. 3A and 3B illustrate examples of physical (PHY) layer preambles that support data parsing to support RU aggregation in accordance with aspects of the present disclosure.

FIG. 3A shows an example PHY preamble 300 that supports data parsing to support RU aggregation in accordance with aspects of the present disclosure. The example PHY preamble 300 may be usable for communications between an AP 102 and each of a number of STAs 104. The preamble 300 may be used for SU transmissions, for example, SU-OFDMA or SU-MIMO transmissions. The preamble 300 includes a legacy portion 302 and a non-legacy portion 304. The legacy portion 302 includes an L-STF 306, an L-LTF 308, and an L-SIG 310. The non-legacy preamble portion 304 is formatted as an HE WLAN preamble in accordance with the IEEE 802.11 ax amendment to the IEEE 802.11 standard. The non-legacy preamble portion 304 includes a repeated legacy signaling field (RL-SIG) 312, a first HE signaling field (HE-SIG-A) 314, an HE short training field (HE-STF) 316 and HE long training fields (HE-LTFs) 318. Like the L-STF 306, L-LTF 308, and L-SIG 310, the information in the RL-SIG field 312 and the HE-SIG-A field 314 may be duplicated and transmitted in each of the component 20 MHz channels in instances involving the use of a bonded channel.

The RL-SIG field 312 may indicate to an HE-compatible STA 104 that the PPDU is an HE PPDU. An AP 102 may use the HE-SIG-A field 314 to indicate to multiple identified STAs 104 that the AP has scheduled uplink (UL) or downlink (DL) resources. The HE-SIG-A field 314 may be decoded by each HE-compatible STA 104 served by the AP 102. The HE-SIG-A field 314 also may include HE WLAN signaling information usable by STAs 104 other than the number of identified STAs 104.

Figure 3B:
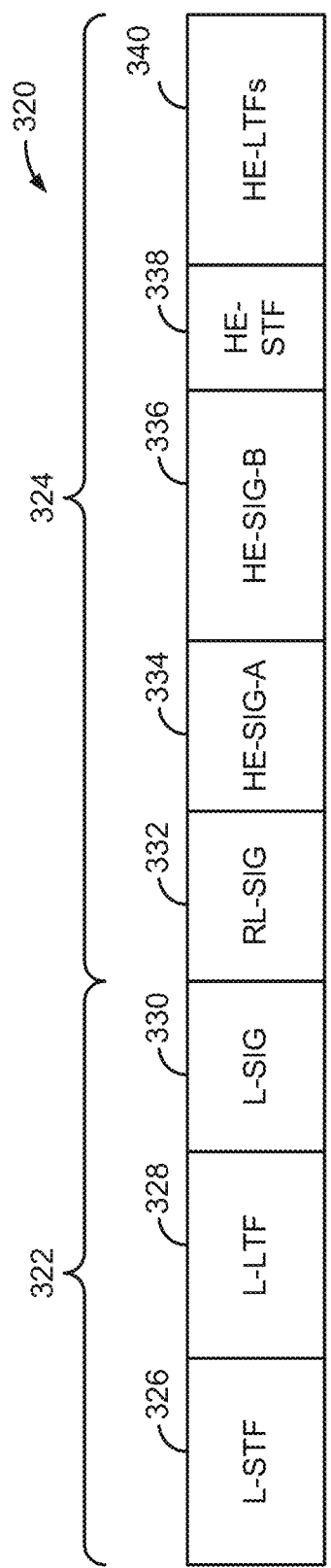

FIG. 3B shows another example PHY preamble 320 that supports data parsing to support RU aggregation in accordance with aspects of the present disclosure. The example PHY preamble 320 may be usable for communications between an AP 102 and each of a number of STAs 104. The preamble 320 may be used for MU-OFDMA or MU-MIMO transmissions. The preamble 320 includes a legacy portion 322 and a non-legacy portion 324. The legacy portion 322 includes an L-STF 326, an L-LTF 328, and an L-SIG 330. The non-legacy preamble portion 304 is formatted as an HE WLAN preamble in accordance with the IEEE 802.11ax amendment to the IEEE 802.11 standard. The non-legacy preamble portion 324 includes an RL-SIG 332, a first HE signaling field (HE-SIG-A) 334, a second HE signaling field (HE-SIG-B) 336 encoded separately from the HE-SIG-A field 334, an HE-STF 338 and HE-LTFs 340. Like the L-STF 326, L-LTF 328, and L-SIG 330, the information in the RL-SIG field 332 and the HE-SIG-A field 334 may be duplicated and transmitted in each of the component 20 MHz channels in instances involving the use of a bonded channel.

The RL-SIG field 332 may indicate to an HE-compatible STA 104 that the PPDU is an HE PPDU. An AP 102 may use the HE-SIG-A field 334 to indicate to multiple identified STAs 104 that the AP has scheduled UL or DL resources. The HE-SIG-A field 334 may be decoded by each HE-compatible STA 104 served by the AP 102. The HE-SIG-A field 334 includes information usable by the identified STAs 104 to decode associated HE-SIG-B fields 336. For example, the HE-SIG-A field 334 may indicate the frame format, including locations and lengths of HE-SIG-B fields 336, available channel bandwidths, modulation and coding schemes (MCS), among other possibilities. The HE-SIG-A field 334 also may include HE WLAN signaling information usable by STAs 104 other than the number of identified STAs 104.

The HE-SIG-B fields 336 carry STA-specific scheduling information such as, for example, per-user MCS values and per-user RU allocation information. In the context of DL MU-OFDMA, such information enables the respective STAs 104 to identify and decode corresponding RUs in the associated data field, where the RUs may be an example of a data unit. Each HE-SIG-B field 336 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, the number of users in allocations, among other possibilities. The common field may be encoded with common bits, cyclic redundancy check (CRC) bits, and tail bits. The user-specific fields are assigned to particular STAs 104 and used to schedule specific RUs and to indicate the scheduling to other WLAN devices. Each user-specific field may include multiple user block fields (which may be followed by padding). Each user block field may include two user fields that contain information for two STAs to decode their respective RU payloads.

Figure 4:
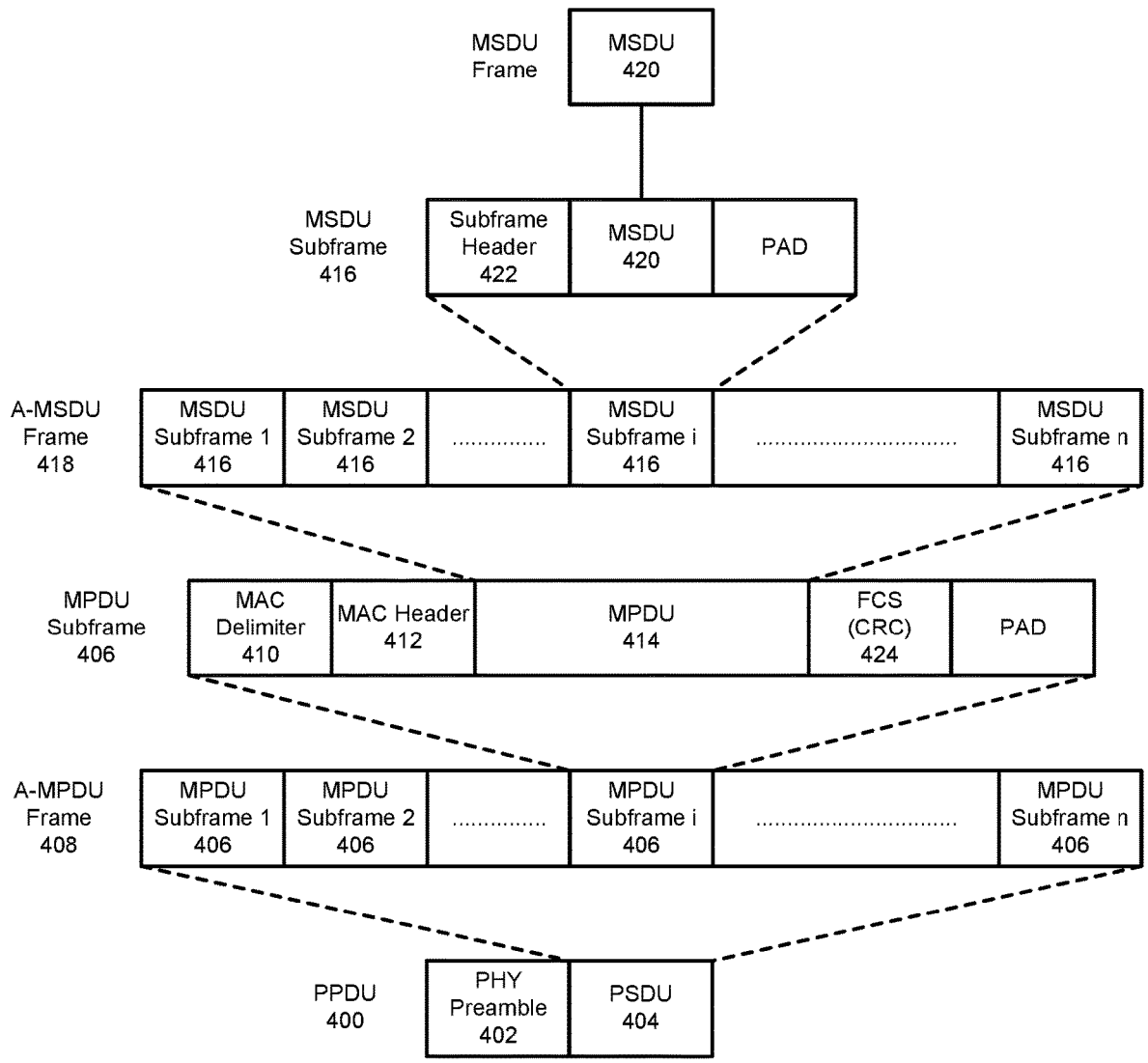
FIG. 4 illustrates an example of a PHY PDU (PPDU) usable for communications between an AP and one or more STAs that supports data parsing to support RU aggregation in accordance with aspects of the present disclosure.

FIG. 4 shows an example PPDU 400 usable for communications between an AP 102 and one or more STAs 104 that supports data parsing to support RU aggregation in accordance with aspects of the present disclosure. As described above, each PPDU 400 includes a PHY preamble 402 and a PSDU 404. Each PSDU 404 may carry one or more MPDUs 406. For example, each PSDU 404 may carry an aggregated MPDU (A-MPDU) 408 that includes an aggregation of multiple MPDU subframes 406. Each MPDU subframe 406 may include a MAC delimiter 410 and a MAC header 412 prior to the accompanying MPDU 414, which includes the data portion ("payload" or "frame body") of the MPDU subframe 406. The MPDU 414 may carry one or more MAC service data unit (MSDU) subframes 416. For example, the MPDU 414 may carry an aggregated MSDU (A-MSDU) 418 including multiple MSDU subframes 416. Each MSDU subframe 416 contains a corresponding MSDU 420 preceded by a subframe header 422.

Referring back to the MPDU subframe 406, the MAC header 412 may include a number of fields containing information that defines or indicates characteristics or attributes of data encapsulated within the MPDU 414. The MAC header 412 also includes a number of fields indicating addresses for the data encapsulated within the MPDU 414. For example, the MAC header 412 may include a combination of a source address, a transmitter address, a receiver address or a destination address. The MAC header 412 may include a frame control field containing control information. The frame control field specifies the frame type, for example, a data frame, a control frame, or a management frame. The MAC header 412 may further including a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the network allocation vector (NAV). Each MPDU subframe 406 may also include a frame check sequence (FCS) field 424 for error detection. For example, the FCS field 424 may include a CRC.

Figure 5:
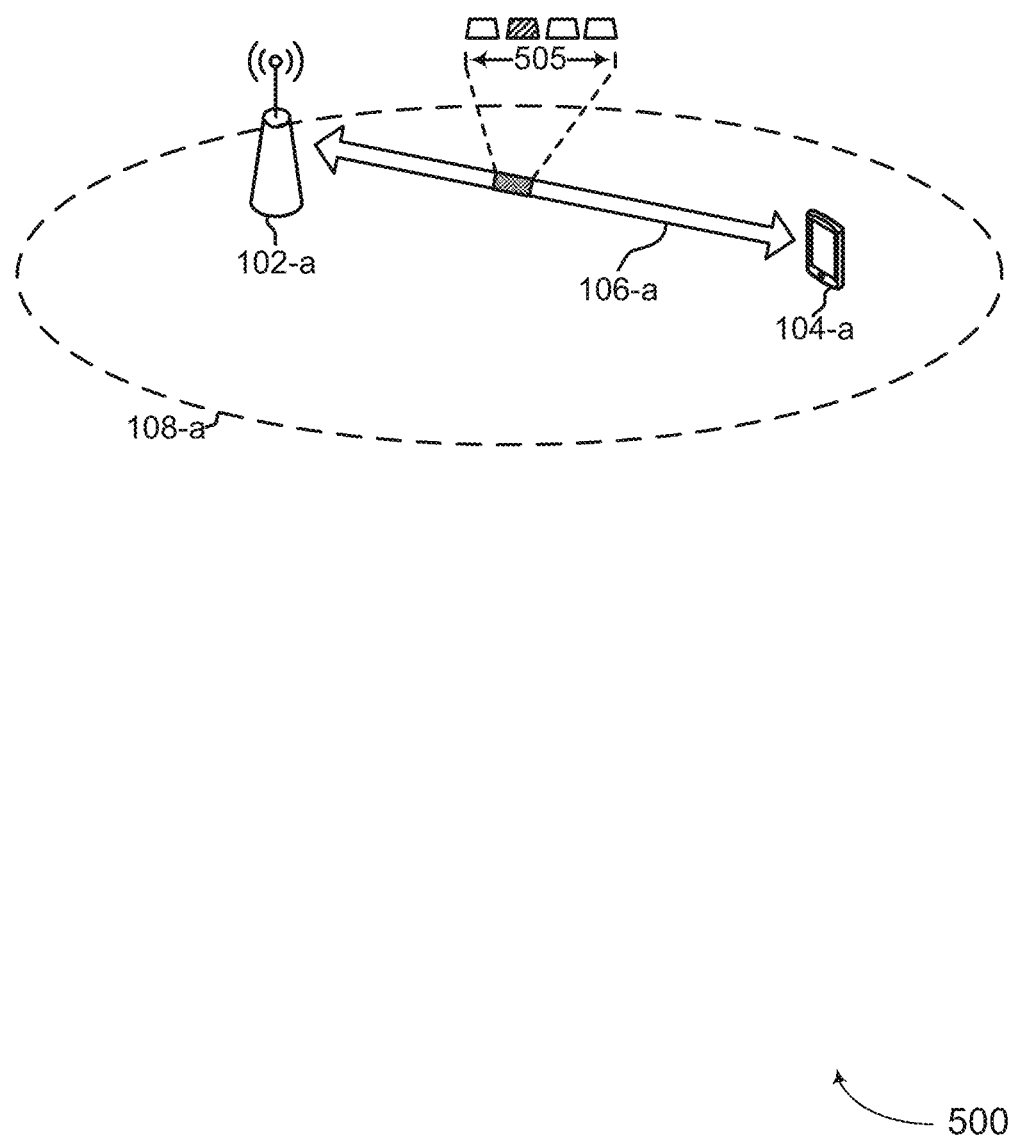
FIG. 5 illustrates an example of a wireless communication system that supports data parsing to support RU aggregation in accordance with aspects of the present disclosure.

FIG. 5 illustrates an example of a wireless communication system 500 that supports data parsing to support RU aggregation in accordance with aspects of the present disclosure. The wireless communication system 500 may include an AP 102-a and an STA 104-a, which may be examples of the corresponding devices described with reference to FIG. 1. For example, the AP 102-a and the STA 104-a may correspond to a BSS managed by the AP 102-a. In some examples, the BSS may include one or more additional sets of STAs 104 within range of the AP 102-a that have established association.

The AP 102-a may support an example coverage area 108-a, which may represent a BSS for the wireless communication system 500. The AP 102-a and the STA 104-a may communicate via a communication link (or "Wi-Fi link") 106-a. In some examples, the communications may correspond to multi-user communications; that is, concurrent transmissions from one device to each of multiple devices (for example, multiple simultaneous DL communications from the AP 102-a to corresponding STAs 104), or concurrent transmissions from multiple devices to a single device (for example, multiple simultaneous UL transmissions from corresponding STAs 104 to the AP 102-a). To support the multi-user transmissions, the AP 102-a and one or more STAs 104 may utilize MU-MIMO and MU-OFDMA techniques. In other examples, as shown, the communication may correspond to SU communications, and may include sequential communications between the AP 102-a and the STA 104-a. To support the SU transmissions, the AP 102-a and the STA 104-a may utilize SU-MIMO and SU-OFDMA techniques.

In some examples, the wireless communication system 500 may include a resource deployment that is used for Wi-Fi technology that overlaps with resources associated with one or more incumbent technologies (for example, 4G systems such as LTE systems and 5G systems which may be referred to as NR systems). The AP 102-a and the STA 104-a may be HE supported devices and may be configured for 802.11ax or EHT operation over the resource deployment. For example, the AP 102-a and the STA 104-a may transmit SU PPDUs in an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Additionally, or alternatively, the AP 102-a and the STA 104-a may communicate in other frequency bands, such as the 6 GHz band, which may support both licensed and unlicensed communications. Each of the frequency bands may include multiple sub-bands or frequency channels for carrying the SU PPDUs and spanning a minimum bandwidth of 20 MHz.

Based on the supported HE operation, the AP 102-a and the STA 104-a may transmit SU PPDUs over an extended BSS bandwidth 505 that may be formed through channel bonding. Based on the channel bonding, the extended BSS bandwidth 505 may span a frequency spectrum of 40 MHz, 80 MHz, 160 MHz, or 320 MHz. In some examples, data traffic associated with the incumbent technologies or associated with nearby AP 102 and STA 104 communications within an OBSS may occupy frequency resources of the extended BSS bandwidth 505. As a result, the AP 102-a and the STA 104-a may have difficulty discovering a contiguous idle channel (for example, a contiguous 80 MHz, 160 MHz, or 320 MHz channel) for HE or EHT operations over the communication link 106-a.

As described herein, the AP 102-a and the STA 104-a may support an OFDMA mode managed by the AP 102-a or a preamble puncturing mode in which a non-primary or primary frequency channel of the extended BSS bandwidth 505 may be zeroed out as part of the included PHY preamble for PPDUs. In addition, the AP 102-a and the STA 104-a may support flexible channel aggregation for transmitting SU PPDUs over a non-contiguous frequency channel included within the extended BSS bandwidth 505. That is, multiple RUs may be assigned to a same user, which may include SU transmission on a punctured bandwidth that includes multiple RUs that are contiguous, or noncontiguous, or both, where the multiple RUs may each be an example of a data unit. Additionally, or alternatively, multiple RUs may be assigned to multiple users for MU-OFDMA transmission with each user assigned to have multiple RUs that are contiguous, or noncontiguous, or both, as described herein. For example, the available frequency spectrum of the extended BSS bandwidth 505 may be divided into multiple non-adjacent or nonadjacent RUs each including a number of different frequency subcarriers ("tones"). Different RUs may be allocated or assigned by the AP 102-*a* at particular times. The sizes and distributions of the RUs may be referred to as an RU allocation. As part of the flexible channel aggregation, the AP 102-*a* may allocate multiple non-adjacent RUs as part of an RU aggregation. That is, the STA 104-*a* may be assigned multiple adjacent or non-adjacent RUs for signaling over a frequency channel of the RU aggregation.

In order to support the RU aggregation, the AP 102-*a* or STA 104-*a* may determine a data parsing and encoding scheme for distributing and encoding information bits of a PSDU data payload. For example, as part of a DL SU PPDU, the AP 102-*a* may identify at least a data rate field, length field, and tail field for the PPDU. Based on the identifying, the AP 102-*a* may calculate a number of OFDM symbols included in the data field assigned for the STA 104-*a* according to Equations (1), (2), and (3) below.

$$N_{sym\_init} = m_{STBC} \times \left\lceil \frac{8 \cdot LENGTH + N_{service} + N_{tail} \cdot N_{ES}}{m_{STBC} \cdot N_{DBPS}} \right\rceil \quad (1)$$

$$N_{pld} = N_{sym\_init} \times N_{DBPS} \quad (2)$$

$$N_{sym} = N_{sym\_init} + m_{STBC} \times N_{ldpc\_ext} \quad (3)$$

For example, the AP 102-*a* may determine a minimum number of symbols $N_{sym\_init}$ included in the data field based on Equation (1). The variable, $N_{sym\_init}$ may be based on whether space-time block coding (STBC) is used to transmit multiple copies of a data stream across one or more antenna ports supported by the SU-MIMO scheme. For example, the AP 102-*a* may use a $m_{STBC}$ value of 2 if STBC is used, and a $m_{STBC}$ value of 1 otherwise. As included within Equation (1), LENGTH may correspond to a length field of the PPDU (in octets) as indicated within a SIG field (for example, an L-SIG field) or an A-MPDU length prior to end-of-frame MAC padding for passing to a PSDU. The variable, $N_{tail}$ may correspond to a number of tail bits for terminating the operation of a decoder at the STA 104-*a*. In some examples, the number of tail bits may be based on a type of encoding performed by the AP 102-*a*. For example, 6 tail bits may be used for binary convolutional coding (BCC) of the included information bits, and $N_{ES}$ may indicate the number of BCC encoders for the STA 104-*a*. In other examples, the one or more aggregated RUs may use BCC or LDPC for linear error correction and encoding, and the number of tail bits may be 0. The variable, $N_{DBPS}$ may include the number of data bits for each OFDM symbol that may be indicated within a data rate field of the PPDU. In the case of RU aggregation, $N_{DBPS}$ may be based on a sum of the included data bits for each RU, as indicated by $\Sigma_{k=1}^{N_{RU}} N_{DBPS,k}$.

Based on the minimum number of OFDM symbols, $N_{sym\_init}$, the AP 102-*a* may determine a number, such as a total number of data payloads $N_{pld}$, as shown in Equation (2). The variable, $N_{pld}$ may be based on the RU aggregation and may correspond to the product of $N_{sym\_init}$ and $N_{DBPS}$. Further, the AP 102-*a* may then determine a number of symbols based on the LDPC encoding parameters of the one or more RUs, as shown in Equation (3). For example, $N_{ldpc\_ext}$ may be a binary bit indication (flag) for indicating if the LDPC codewords will overflow into one or more additional OFDM symbols. In the case that an extra symbol is used for any LDPC encoded RU, all LDPC RUs of the aggregation may add an extra symbol. In addition, if both LDPC and BCC encoding are allowed for different RUs of the RU aggregation, then if an extra symbol is added for the LDPC encoded RUs, then extra padding bits may be inserted for the BCC encoding in order to support timing alignment.

The AP 102-*a* may calculate a number of distributed payload bits for each available RU of the RU aggregation. The distributed payload bits may include service bits, information bits contained within the PSDU, and padding bits for transmission. In some examples, the AP 102-*a* may assume that padding bits included at the MAC layer (as part of an MPDU) and at the PHY layer (as part of a PPDU) will be provided to an encoder on an as-needed basis for an equal number of OFDM symbols to support timing alignment. For each RU of the aggregation, the AP 102-*a* may determine the number of distributed data bits based on the data rate the RU can support according to Equation (4) below.

$$N_{pld,i} = N_{sym\_init} * N_{bpcs,i} * R_i * \left\lfloor \frac{\text{Data\_rate}, i^* T_{sym}}{N_{bpcs,i} * R_i} \right\rfloor - N_{tail,i} \quad (4)$$

For example, the AP 102-*a* may determine a number of distributed payload bits for an RU of the flexible channel aggregation, as shown in Equation (4). The AP 102-*a* may determine a minimum number of symbols $N_{sym\_init}$ included in the data field based on Equation (1). The AP 102-*a* may then determine a number of coded bits, $N_{bpcs,i}$ for each carrier spanning a spatial stream or modulation order of the respective RU and may identify a code rate, $R_i$. As part of the calculation shown in Equation (4), the AP 102-*a* may determine a data rate of the respective RU and may identify a number of tail bits that may be appended to the data bits following the data parsing and encoding scheme.

Following the one or more calculations, a parser and encoder associated with the AP 102-*a* may distribute the information bits included in the data payload to each RU of the aggregation. In some implementations, the AP 102-*a* may distribute the information bits to each RU in a sequential manner according to Equation (5) below.

$$x_i^{(j)} = b_{N_{RU}*i+j}, 0 \le i < N_{pld,j}, 0 \le j < N_{RU} \quad (5)$$

As part of the sequential distribution, a single information bit may be distributed to a respective RU based on a cyclical process ("round robin fashion"), with a first bit being distributed to a first RU of the aggregation followed by a subsequent bit being distributed to an additional RU. In the case that an RU of the allocation (such as an RU with a smaller number of available resources) is filled with the distributed bits, one or more additional RUs of the aggregation may receive the remaining bits for distribution. In other implementations, the AP 102-*a* may distribute the information bits by filling an RU of the aggregation with the distributed bits prior to distributing to the one or more additional RUs according to Equation (6) below.

$$x_i^{(j)} = b_{\Sigma_{k=0}^{j-1} N_{pld,k}+i}, 0 \le i < N_{pld,j}, 0 \le j < N_{RU} \quad (6)$$

As detailed within Equations (5) and (6), b may correspond to a data string corresponding to the data payload. In addition, the AP 102-*a* may append tail bits to the data bits of the distribution following the data parsing and encoding scheme.

Although the described features are provided with reference to a DLSU PPDU transmission by the AP 102-*a*, the STA 104-*a* may provide similar operations as part of an UL SU communication. For OFDMA, AP 102-*a* may perform resource scheduling, multiple users may do OFDMA either in downlink or UL with each user handling at least one RU and RU aggregation. For example, the STA 104-*a* may perform UL SU PPDU transmission as part of a preamble puncturing mode in which a non-primary or primary frequency channel of the extended BSS bandwidth 505 may be zeroed out as part of the included PHY preamble. The STA 104-*a* may calculate a number of OFDM symbols in a data field of the PPDU and may calculate a number of distributed payload bits for each RU of an aggregation. The STA 104-*a* may also distribute the payload bits for transmission over the one or more RUs of the flexible channel.

As described herein, a wireless communication device (for example, the AP 102-*a*, the STA 104-*a*) may implement the data parsing and encoding scheme for distributing and encoding information bits of a PSDU data payload. In some examples, the wireless device may encode the set of information bits at the PHY layer, and subsequently distribute the coded bits (e.g., the coded bits of the set of encoded information bits) based on a data parsing scheme. The encoding may correspond to a joint encoding in the RU aggregation. In some examples, each RU may have the same coding rate. In other examples, the wireless device may distribute the information bits of the data payload to the multiple RUs of the aggregation and perform separate encoding and interleaving for each RU. For example, the MAC layer of the wireless device may perform data parsing among multiple RUs and may deliver multiple PSDUs to the PHY layer for encoding. Additionally, or alternatively, the MAC layer may pass all the information bits in a single PSDU. In some examples, the PHY layer may distribute the information bits to the multiple RUs for subsequent encoding and interleaving.

In some implementations, the wireless communication device (for example, the AP 102-*a*, the STA 104-*a*) may support multiple RUs for each bandwidth segment. For example, the AP 102-*a* and the STA 104-*a* may support up to two RUs for each bandwidth segment (for example, two RUs for each 80 MHz segment). In some examples, the data parsing and encoding schemes described herein may mitigate or reduce bandwidth efficiency loss, assuming a 20 MHz clear channel assessment (CCA), thereby achieving lossless or near lossless bandwidth utilization. The data parsing and encoding schemes described herein may support various RU combinations. Examples of RU combinations include RU242, RU484, RU996, RU242+RU242, and RU242+RU484.

The wireless communication device (for example, the AP 102-*a*, the STA 104-*a*) may support schemes for parsing and interleaving after encoding for punctured transmission (for example, a per-80 MHz segment parsing for transmissions greater than 80 MHz). In some aspects, the parsing and interleaving schemes described herein may include (for example, for each 80 MHz segment) an RU parser and an RU interleaving scheme. The parsing and interleaving schemes may include a combination of RUs (also referred to as a combo RU) with a new mapping distance parameter (for example, tone mapping distance, $D_{tm}$) for joint interleaving. In some examples, the parsing and interleaving schemes may include a punctured interleaving scheme with a default $D_{tm}$ for 80 MHz processing.

Figure 6:
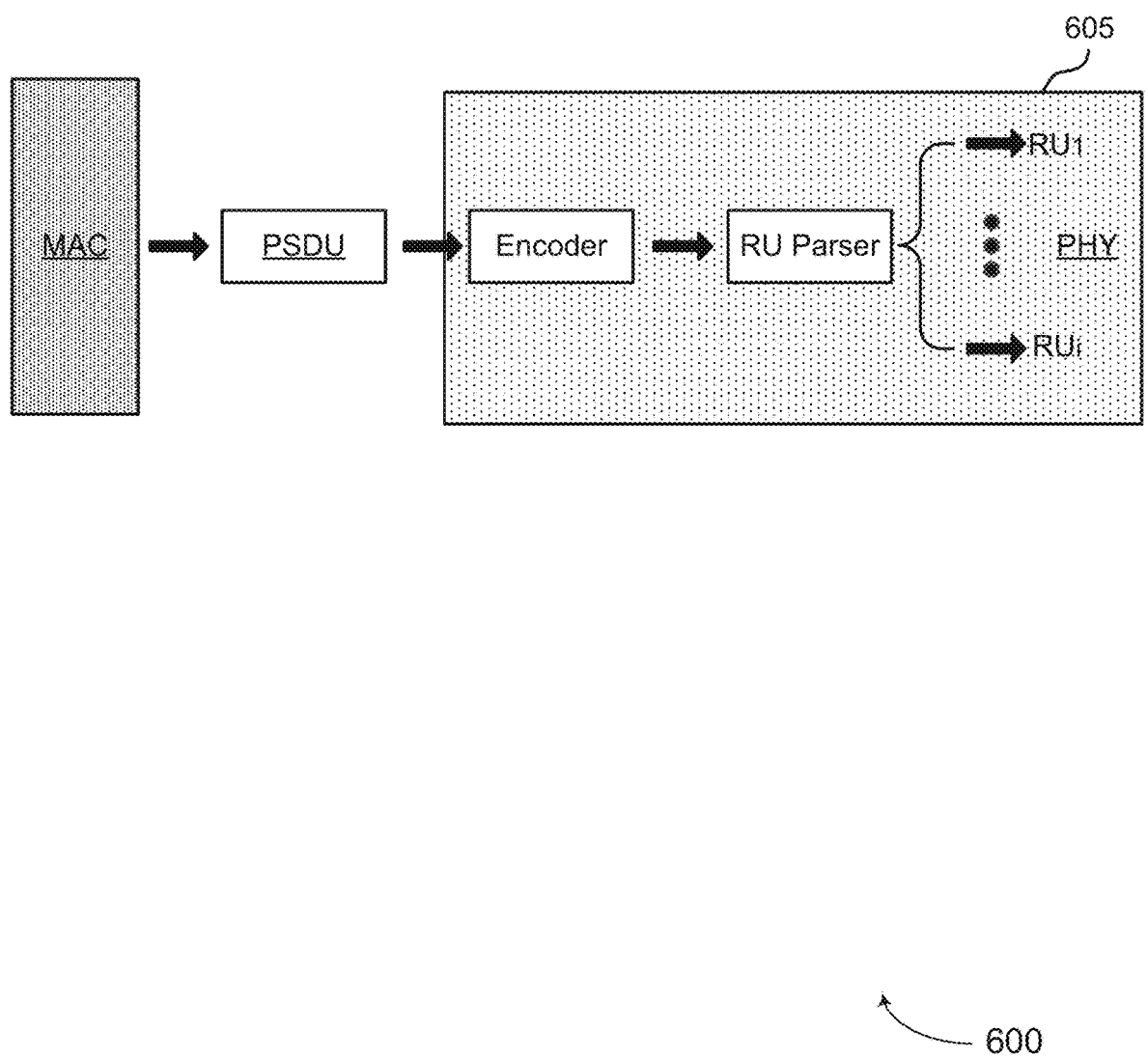
FIGS. 6-10 illustrate examples of data parsing and encoding schemes that supports data parsing to support RU aggregation in accordance with aspects of the present disclosure.

FIG. 6 illustrates an example of a data parsing and encoding scheme 600 that supports data parsing to support RU aggregation in accordance with aspects of the present disclosure. In some examples, the data parsing and encoding scheme 600 may implement aspects of the wireless communication systems 100 and 500, as described with reference to FIGS. 1 and 5. For example, a wireless communication device (such as an AP or an STA) may encode the set of information bits at the PHY layer, and subsequently distribute the coded bits (e.g., the coded bits of the set of encoded information bits) based on a data parsing scheme.

As shown in FIG. 6, a MAC layer of the wireless communication device (such as an AP or a STA) may pass a set of information bits to the PHY layer 605 in a single PSDU. At the PHY layer 605, the wireless communication device may encode the received information bits. For example, the wireless communication device may encode the information bits according to a single coding rate across all RUs of the aggregation (for example, RUs assigned to the recipient device), where the Rus of the aggregation may each be an example of a data unit. The encoding may correspond to a joint encoding in the RU aggregation. Despite having the same coding rate, the multiple RUs of the aggregation may support distinct modulation orders, spatial streams, beamforming configurations, and data rates for PHY layer signaling.

Following the encoding, the wireless communication device may implement an interleaving procedure that includes the data parsing scheme for the RU aggregation. In some examples, the interleaving procedure may include a per-segment parsing that corresponds to a configured bandwidth allocation of the frequency channel. The per-segment parsing may include an even distribution among a configured number of segments (for example, 2) for distributing $N_{BPSCS}/2$ coded bits (e.g., coded bits of the set of encoded information bits) to a first segment, followed by $N_{BPSCS}/2$ to a subsequent segment of the frequency channel, in accordance with the description of $N_{BPSCS}$ with reference to FIG. 5. When a smaller segment is filled up, all the remaining bits may go to the larger segment. In addition, the interleaving procedure may include an RU parsing for distributing coded bits among the RUs included in each configured segment. As part of the interleaving procedure, the wireless communication device may implement an LDPC tone mapping within each RU of the aggregation to ensure that points of a constellation mapping (for example, QAM mapping) are separated by a sufficient distance (subcarriers) to capture the full frequency diversity. In other examples, the wireless communication device may implement bit interleaving with BCC within each RU of the aggregation.

For example, the frequency channel may correspond to a 160 MHz operating bandwidth. In some examples, an OBSS or incumbent technologies may occupy ("puncture") resources of the operating bandwidth, such as a minimum channel bandwidth (for example, 20 MHz) or a refined bandwidth spectrum (for example, 10 MHz, 5 MHz) for NR communications. The wireless communication device may support flexible channel aggregation for transmitting SU PPDUs over a non-contiguous frequency channel that is divided into multiple adjacent or non-adjacent RUs. As part of the interleaving procedure, the wireless communication device may parse the operating bandwidth into two 80 MHz segments. In some examples, one or both of the segments may include the punctured resources. The wireless communication device may then evaluate the parsed segments and determine the segment with the smaller number of needed coded bits (e.g., encoded information bits) given the punctured resources.

Starting from the lowest frequency RU, the wireless communication device may sequentially fill bits in each RU included in each segment of the aggregation over an OFDM symbol. For example, the wireless communication device may distribute the coded bits (e.g., encoded information bits) by filling the lowest frequency RU with the coded bits prior to distributing to one or more additional RUs of the segment. Following distribution to each of the aggregated RUs included in the segment, the wireless communication device may then distribute the remaining coded bits to the RUs included in the secondary 80 MHz segment for the operating bandwidth. Within each of the aggregated RUs, the wireless communication device may implement LDPC tone mapping in each RU to capture frequency diversity.

Additionally, or alternatively, the wireless communication device (for example, the AP 102-*a*, the STA 104-*a*) may distribute the coded bits (e.g., encoded information bits) by filling the smallest RU with the coded bits prior to distributing to one or more additional RUs of the segment. Following distribution to each of the aggregated RUs included in the segment, the wireless communication device may then distribute the remaining coded bits to the RUs with a larger size.

Additionally, or alternatively, the wireless communication device (for example, the AP 102-*a*, the STA 104-*a*) may distribute the coded bits based on a cyclical parsing scheme depending on an MCS ratio. The MCS ratio may have a proportional relationship (for example, an S:S ratio, in which S=$N_{bpscs}$ is an integer value). In an example aspect, the wireless communication device may distribute the coded bits according to the example ratio $N_{bpscs}1/2:N_{bpscs}2/2$. The wireless communication device may distribute the coded bits to RUs in a cyclical process. In some aspects, the wireless communication device may determine MCSs or a ratio corresponding to the MCSs. In an example, the wireless communication device may distribute the coded bits to the RUs in the cyclical process based on the MCSs or the ratio corresponding to the MCSs.

Additionally, or alternatively, the wireless communication device (for example, the AP 102-*a*, the STA 104-*a*) may distribute the coded bits based on a cyclical parsing scheme proportional to the RU size of segments. The wireless communication device may distribute the coded bits according to the example ratio (size(RU1)*bps1/2):(size(RU2)*$N_{bpscs}2/2$). In some examples, RU1 may be a first RU and RU2 may be a second RU. In an example aspect that includes different MCSs, the cyclical parsing scheme may be based on both RU size ratio and MCS ratio. For example, the wireless communication device may determine a ratio corresponding to MCSs and a ratio corresponding to two or more RUs. In some aspects, the wireless communication device may distribute the coded bits to the RUs in the cyclical process based on the ratio corresponding to MCSs and the ratio corresponding to the two or more RUs.

Additionally, or alternatively, the wireless communication device may evaluate the multiple adjacent or non-adjacent RUs included in the frequency channel as a combo RU. Based on the evaluation, the wireless communication device may encode the information bits included in a data payload and may allocate the encoded bits as if it is a single contiguous RU and may implement the LDPC tone mapping within the combo RU based on a new mapping $D_{tm}$ parameter.

In an example, for a combo RU of 60 MHz (for example, multiple adjacent or non-adjacent RUs of 20 MHz+40 MHz), the wireless communication device may implement the LDPC tone mapping within the combo RU based on a new $D_{tm}$ parameter. In an example, for a combo RU of 40 MHz (for example, multiple adjacent or non-adjacent RUs of 20 MHz+20 MHz), the wireless communication device may implement the LDPC tone mapping within the combo RU based on reusing an existing $D_{tm}$ parameter (for example, a default $D_{tm}$ parameter for 40 MHz). In some aspects, for an SU punctured transmission, example combo RUs in an 80 MHz segment may include 20 MHz+20 MHz or 20 MHz+40 MHz. For each STA in an OFDMA transmission, example combo RUs for small RUs within 20 MHz may include RU26+RU26 (where, for example, RU26 refers to a 26 tone RU), RU26+RU52, RU26+RU106, RU52+RU52, RU52+RU106, and RU106+RU106, but are not limited thereto.

As part of a transmission at the PHY layer 605, the wireless communication device may signal the coded bits as part of an SU PPDU on the aggregated RUs of the frequency channel. The receiving device (such as an AP or an STA) may receive the SU PPDU over the non-contiguous channel and perform demodulation and decoding of the coded information bits. Based on the joint encoding, the receiving device may perform separate modulation for the received signaling over each of the RUs of the flexible channel aggregation and may decode the received signaling having a same code rate.

In other examples, the wireless device may distribute the information bits of the data payload to the multiple RUs of the aggregation and may perform separate encoding and interleaving for each RU. The wireless communication device may implement the separate encoding and interleaving for the aggregate RUs as part of a punctured SU mode (for UL and DL SU PPDU transmission) or an OFDMA mode. The multiple RUs of the aggregation may support different resource allocations sizes, space-time streams, beamforming configuration, modulation orders, among other examples.

For example, in some implementations, the MAC layer of a wireless communication device may perform the data parsing among the included RUs of the aggregation.

In some implementations, the MAC layer may forward multiple PPDUs using an aggregation scheme. For example, the MAC layer may forward multiple PPDUs (for example, two or more PPDUs) using a multi-link aggregation (MLA) scheme. The MAC layer of the wireless communication device may forward multiple PSDUs (for example, two PSDUs) to a PHY layer of the wireless communication device. In some examples, each PSDU may correspond to a separate bandwidth segment. Data parsing by the MAC layer may include aspects of MU-OFDMA as described herein. In some aspects, the MAC layer may parse an SU payload based on an MCS and RU size in each bandwidth segment (for example, in each 160 MHz segment).

In some implementations, as part of an interleaving procedure, the wireless communication device may parse an operating bandwidth into two 160 MHz segments. In some examples, one or both of the segments may include punctured resources. The wireless communication device may evaluate the parsed segments and distribute PSDU bits to each of the 160 MHz segments. The wireless communication device may support different MCSs on each of the two 160 MHz segments. In some implementations, the wireless communication device may implement PHY layer solutions with a single PSDU. For example, the wireless communication device may implement a parsing scheme at the PHY layer to distribute PSDU bits of the PSDU to each of the 160 MHz segments. In some aspects, the wireless communication device may implement the parsing scheme based on preamble signaling in each of the 160 MHz segments (for example, in either SU or MU OFDMA format).

In some example implementations, the wireless communication device may perform post-encoding parsing of coded bits (e.g., encoded information bits) to available bandwidth segments using cyclical parsing. In some examples, the wireless communication device may use a bandwidth segment parser to assign coded bits of resource units of a set of resource units to available bandwidth segments within each of the resource units. The bandwidth segment parser may assign the coded bits in a cyclical process.

For example, using an 80 MHz segment parser, the wireless communication device may proportionally distribute coded bits among four 80 MHz segments. In some examples, the wireless communication device may distribute $N_{BPSCS,1}/2$ coded bits to a first 80 MHz segment, followed by distributing the remainder of the $N_{BPSCS,1}/2$ coded bits to a second 80 MHz segment. In some examples, the wireless communication device may distribute $N_{BPSCS,2}/2$ coded bits to a third 80 MHz segment, followed by distributing the remainder of the $N_{BPSCS,2}/2$ coded bits to a fourth 80 MHz segment. In some aspects of distributing the coded bits, if smaller 80 MHz segments are filled up, the wireless communication device may distribute remaining bits to larger 80 MHz segments.

In some aspects, the wireless communication device may support different MCSs on X+Y (for example, 80 MHz+240 MHz, 160 MHz+160 MHz). In some aspects, the wireless communication device may perform post-encoding parsing using a segment parser as described herein. In some examples, the wireless communication device may use an 80 MHz segment parser for proportional cyclical processing ("round robin parsing").

In some aspects, the wireless communication device may parse an operating bandwidth into multiple segments of multiple sizes (for example, an X segment of 80 MHz, and a Y segment of 240 MHz). Using an 80 MHz segment parser, the wireless communication device may proportionally distribute coded bits among 80 MHz segments in the X segment and among 80 MHz segments in the Y segment. In some examples, the wireless communication device may distribute $N_{BPSCS,X}/2$ coded bits to each 80 MHz segment in the X segment, followed by distributing the remainder of the $N_{BPSCS,Y}/2$ coded bits to each 80 MHz segment in the Y segment. In some aspects of distributing the coded bits, if smaller segments are filled up, the wireless communication device may distribute remaining bits to larger segments.

Figure 7:
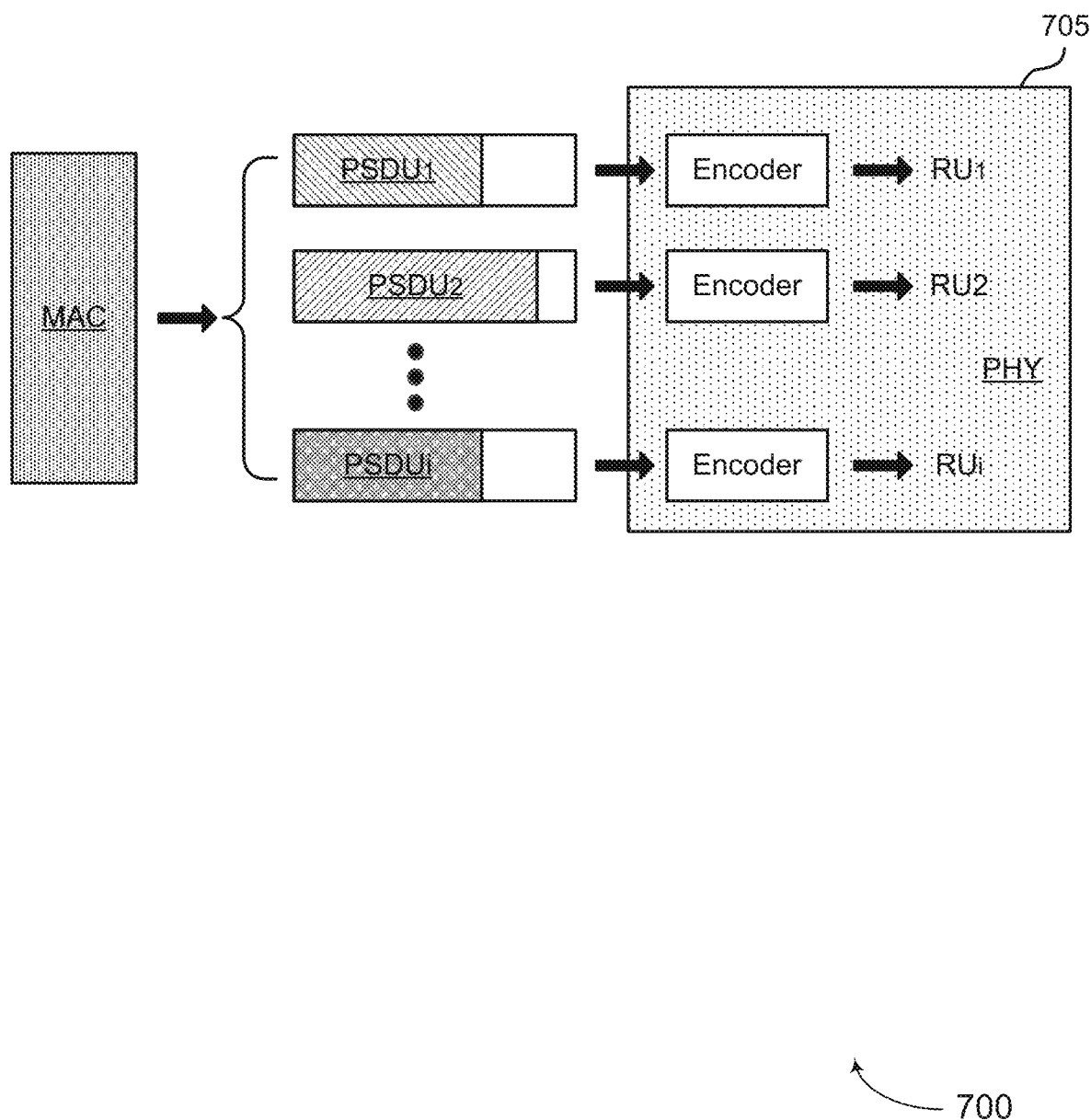

FIG. 7 illustrates an example of a data parsing and encoding scheme 700 that supports data parsing to support RU aggregation in accordance with aspects of the present disclosure. In some examples, the data parsing and encoding scheme 700 may implement aspects of the wireless communication systems 100 and 500, as described with reference to FIGS. 1 and 5. As described herein, the data parsing and encoding scheme 700 may describe an alternate data parsing and encoding scheme in RU aggregation relative to the data parsing and encoding scheme 600, as described with reference to FIG. 6.

As shown in FIG. 7, a MAC layer of the wireless communication device (such as an AP or an STA) may distribute the set of information bits according to a data parsing scheme. The MAC layer may then pass the information bits to the PHY layer 705 via multiple PSDUs (for example, $PSDU_1$, $PSDU_2$, ..., $PSDU_i$). Each of the respective PSDUs may carry a distinct number of information bits based on the data parsing.

At the PHY layer 705, the wireless communication device may encode the received information bits carried by the multiple PSDUs. For example, the wireless communication device may treat each RU of the aggregation independently and may perform separate encoding and interleaving for the segmented PSDUs over the multiple RUs, where each RU and the multiple RUs may be examples of a data unit. That is, for each RU of the flexible channel aggregation, the wireless communication device may encode the received information bits carried over a segmented PSDU. As a result, each RU may have different resource allocation sizes, coding schemes, space-time streams, beamforming configuration, modulation orders, among other examples.

Within each of the aggregated RUs, the wireless communication device may implement LDPC tone mapping on OFDM symbols to capture the frequency diversity. As part of a transmission at the PHY layer 705, the wireless communication device may then signal the coded bits (e.g., encoded information bits) as part of an SU PPDU or an MU PPDU on the aggregated RUs for each user of the frequency channel. A receiving device (such as an AP or an STA) may receive the SU PPDU or an MU PPDU over the contiguous or the non-contiguous channel and may perform demodulation and decoding of the coded information bits. In some examples, the separate encoding and interleaving may correspond to multiple assigned RUs for the receiving device. As a result, the receiving device may process the PHY layer transmission as a multi-user packet signaled over the frequency channel.

In other implementations, the MAC layer of a wireless communication device may pass the set of information bits to a PHY layer in a single PSDU. In some examples, the wireless communication device may perform segmentation to multiple RUs for subsequent encoding.

Figure 8:
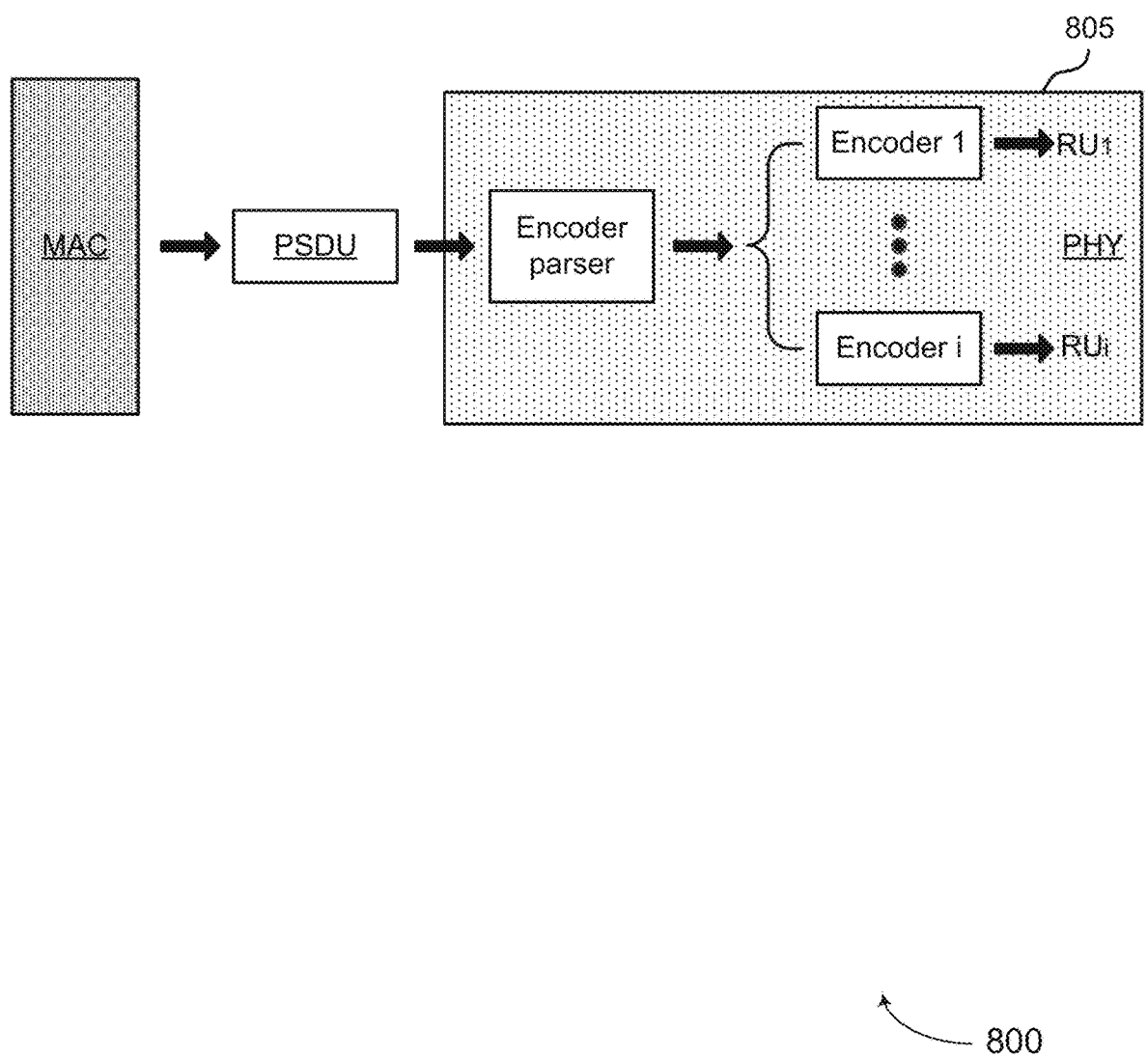

FIG. 8 illustrates an example of a data parsing and encoding scheme 800 that supports data parsing to support RU aggregation in accordance with aspects of the present disclosure. In some examples, the data parsing and encoding scheme 800 may implement aspects of the wireless communication systems 100 and 500, as described with reference to FIGS. 1 and 5. As described, the data parsing and encoding scheme 800 may describe an alternate data parsing and encoding scheme in RU aggregation relative to the data parsing and encoding schemes 600 and 700, as described with reference to FIGS. 6 and 7.

As shown in FIG. 8, a MAC layer of the wireless communication device (such as an AP or an STA) may pass the set of information bits to the PHY layer 805 in a single PSDU. The PHY layer 805 may include an encoder parser for distributing the information bits to the multiple RUs, where the multiple RUs may be examples of a data unit. In some implementations, as part of a sequential distribution at the PHY layer 805, the encoder parser may distribute each information bit to a respective RU based on a cyclical process, with a first bit being distributed to a first RU of the aggregation followed by a subsequent bit being distributed to an additional RU. In the case that an RU of the allocation (such as an RU with a smaller number of available resources) is filled with the distributed bits, one or more additional RUs of the aggregation may receive the remaining bits for distribution. In other implementations, the encoder parser may distribute the information bits by filling an RU of the aggregation with the distributed bits prior to distributing to the one or more additional RUs. For example, the encoder parser may distribute information bits to a first RU (for example, $RU_1$) until the RU is filled with the distributed bits. The encoder parser may then distribute the remaining information bits to one or more additional RUs of the aggregation.

In some aspects, the wireless communication device may parse an operating bandwidth into multiple bandwidth segments of multiple sizes (for example, 80 MHz+240 MHz, or 160 MHz+160 MHz). The wireless communication device may support different MCSs on X+Y (for example, 80 MHz+240 MHz).

As discussed herein, in some implementations, as part of an interleaving procedure, the wireless communication device may parse an operating bandwidth into two 160 MHz segments. In some aspects, the wireless communication device may support different MCSs on each of the two 160 MHz segments. The wireless communication device may implement PHY layer solutions with a single PSDU. For example, the wireless communication device may implement a parsing scheme at the PHY layer to distribute PSDU bits of the PSDU to each of the 160 MHz segments. In some aspects, the wireless communication device may implement the parsing scheme based on preamble signaling in each of the 160 MHz segments (for example, in either SU or MU OFDMA format).

In some implementations, the wireless communication device may perform pre-encoding parsing of coded bits (e.g., encoded information bits) to available bandwidth segments based on a cyclical process ("round robin fashion") or sequential parsing. In some example implementations, the wireless communication device may use two encoders with an encoder parser to distribute the information bits based on the MCS and the RU size in each 160 MHz bandwidth segment. For example, the wireless communication device may determine, at the PHY layer of the access point, that a first RU size of a first RU and a second RU size of a second RU satisfies a threshold. The threshold may include an available bandwidth segment of the bandwidth allocation, and the PHY layer may include a set of encoders for separately encoding the assigned information bits of the set of information bits associated with the set of data units. In some aspects, the wireless communications device may assign, at the PHY layer of the access point, the first RU and the second RU to the two or more available bandwidth segments of the bandwidth allocation. In some examples, the wireless communications device may determine a ratio corresponding to MCSs associated with the first RU and the second RU. In some aspects, the wireless communications device may distribute coded bits to the first RU and the second RU based on the first RU size, the second RU size, or the ratio corresponding to the MCSs associated with the first RU and the second RU.

In some example implementations, the wireless communication device may perform parsing of coded bits to available bandwidth segments based on a cyclical process ("round robin fashion"). For example, the wireless communication device may distribute a first coded bit to a first 160 MHz segment, followed by a next coded bit to a second 160 MHz segment, and then back to the first 160 MHz segment. In some aspects of distributing coded bits, once a 160 MHz segment (for example, the first 160 MHz segment) is full, the wireless communication device may distribute remaining bits to a 160 MHz segment having a smaller number of bits (for example, the second 160 MHz segment). For example, the wireless communication device may distribute coded bits to the first RU and the second RU in a cyclical process based on the two or more available bandwidth segments of a bandwidth allocation associated with the first RU and the second RU.

In some examples, the wireless communication device may perform parsing of coded bits to available bandwidth segments based on sequential parsing. The wireless communication device may distribute bits to the first 160 MHz segment (for example, until the first 160 MHz segment is filled up), followed by distributing remaining bits to the second 160 MHz segment. For example, the wireless communication device may distribute coded bits to the first RU and the second RU sequentially. In some aspects, the wireless communication device may assign coded bits to the first RU. The wireless communication device may assign remaining coded bits to the second RU after assigning coded bits to the first RU. In some examples, the first RU corresponds to a first 160 MHz segment, and the second RU corresponds to a second 160 MHz segment.

In some aspects, the wireless communication device may support different MCSs on X+Y (for example, 80 MHz+240 MHz). The wireless communication device may perform pre-encoding parsing using two encoders with an encoder parser as described herein.

In some implementations, the wireless communication device may parse an operating bandwidth into multiple segments of multiple sizes (for example, an X segment of 80 MHz and a Y segment of 240 MHz). The wireless communication device may perform parsing of coded bits to the X and Y bandwidth segments based on a cyclical process ("round robin fashion"). For example, the wireless communication device may distribute a first coded bit to the X segment, followed by a next coded bit to the Y segment, and then a coded bit to the X segment, until the wireless communication device has distributed all coded bits, or a segment is filled. In distributing the coded bits, if the X segment is filled up and the Y segment is a larger segment, the wireless communication device may distribute the remaining bits to the Y segment.

In some examples, the wireless communication device may perform the parsing of coded bits to available bandwidth segments based on sequential parsing. For example, the wireless communication device may distribute bits to the X segment (for example, until the X segment is filled up), followed by distributing remaining bits to the Y segment.

Following the data parsing at the PHY layer 805, the wireless communication device may encode distributed information bits over the multiple RUs. For example, the wireless communication device may treat each RU of the aggregation independently and may perform separate encoding and interleaving over the multiple RUs. That is, for each RU of the flexible channel aggregation, the wireless communication device may encode the segmented information bits. As a result, each RU may have different resource allocation sizes, coding schemes, space-time streams, beamforming configuration, modulation orders, among other examples.

In addition, within each of the aggregated RUs, the wireless communication device may implement LDPC tone mapping within each respective RU of the RU aggregation. As part of a transmission at the PHY layer 805, the wireless communication device may then signal the coded bits as part of an SU PPDU or an MU PPDU on the aggregated RUs of the frequency channel. A receiving device (such as an AP or an STA) may receive the SU or the MU PPDU over the contiguous or non-contiguous channel and perform demodulation and decoding of the coded information bits.

In the described examples for PHY layer data parsing and encoding at a wireless communication device, the distributed information bits associated with the data parsing may include scrambled information bits. In other examples, the data parsing may include distribution of raw information bits and subsequent scrambling at the PHY layer. Raw information bits may correspond to bits which have not been mixed with a pseudo-random sequence.

Figure 9:
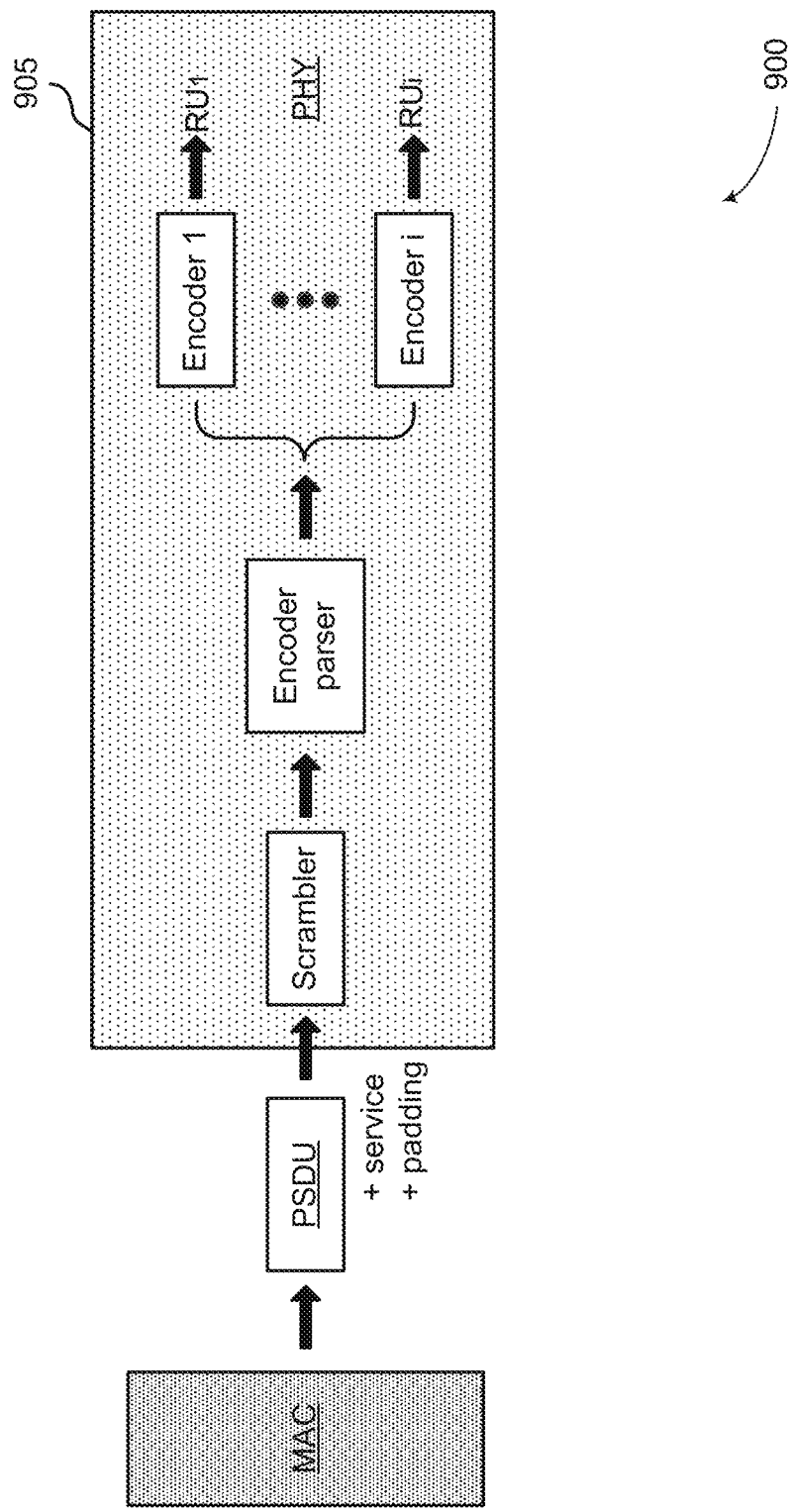

FIG. 9 illustrates an example of a data parsing and encoding scheme 900 that supports data parsing to support RU aggregation in accordance with aspects of the present disclosure. In some examples, the data parsing and encoding scheme 900 may implement aspects of the wireless communication systems 100 and 500, as described with reference to FIGS. 1 and 5. The data parsing and encoding scheme 900 may describe a data parsing and encoding scheme that includes data scrambling prior to data parsing. The data parsing and encoding scheme 900 may be implemented in conjunction with the data parsing and encoding schemes 600 and 800, as described with reference to FIGS. 6 and 8.

As shown in FIG. 9, a MAC layer of the wireless communication device (such as an AP or an STA) may pass the set of information bits to the PHY layer 905 in a single PSDU. The information bits may include service bits, data bits contained within the PSDU, and padding bits for each user in transmitting the SU or the MU PPDU. The PHY layer 905 may include a scrambler for mixing the included information bits of the PSDU with a pseudo-random sequence in order to reduce attenuation due to neighboring data traffic.

Following the scrambling, the PHY layer 905 may include an encoder parser for distributing the scrambled bits to the multiple RUs, where the multiple RUs may be examples of a data unit. In some implementations, as part of a sequential distribution at the PHY layer 905, the encoder parser may distribute each information bit to a respective RU based on a cyclical process, with a first bit being distributed to a first RU of the aggregation followed by a subsequent bit being distributed to an additional RU. In other implementations, the encoder parser may distribute the information bits by filling an RU of the aggregation with the distributed bits prior to distributing to one or more additional RUs.

The wireless communication device may then encode distributed information bits over the multiple RUs on the PHY layer 905. For example, the wireless communication device may treat each RU of the aggregation independently and may perform separate encoding and interleaving over the multiple RUs. In addition, within each of the aggregated RUs, the wireless communication device may implement LDPC tone mapping within each respective RU and may signal the coded bits as part of an SU or an MU PPDU on the aggregated RUs of the frequency channel.

Figure 10:
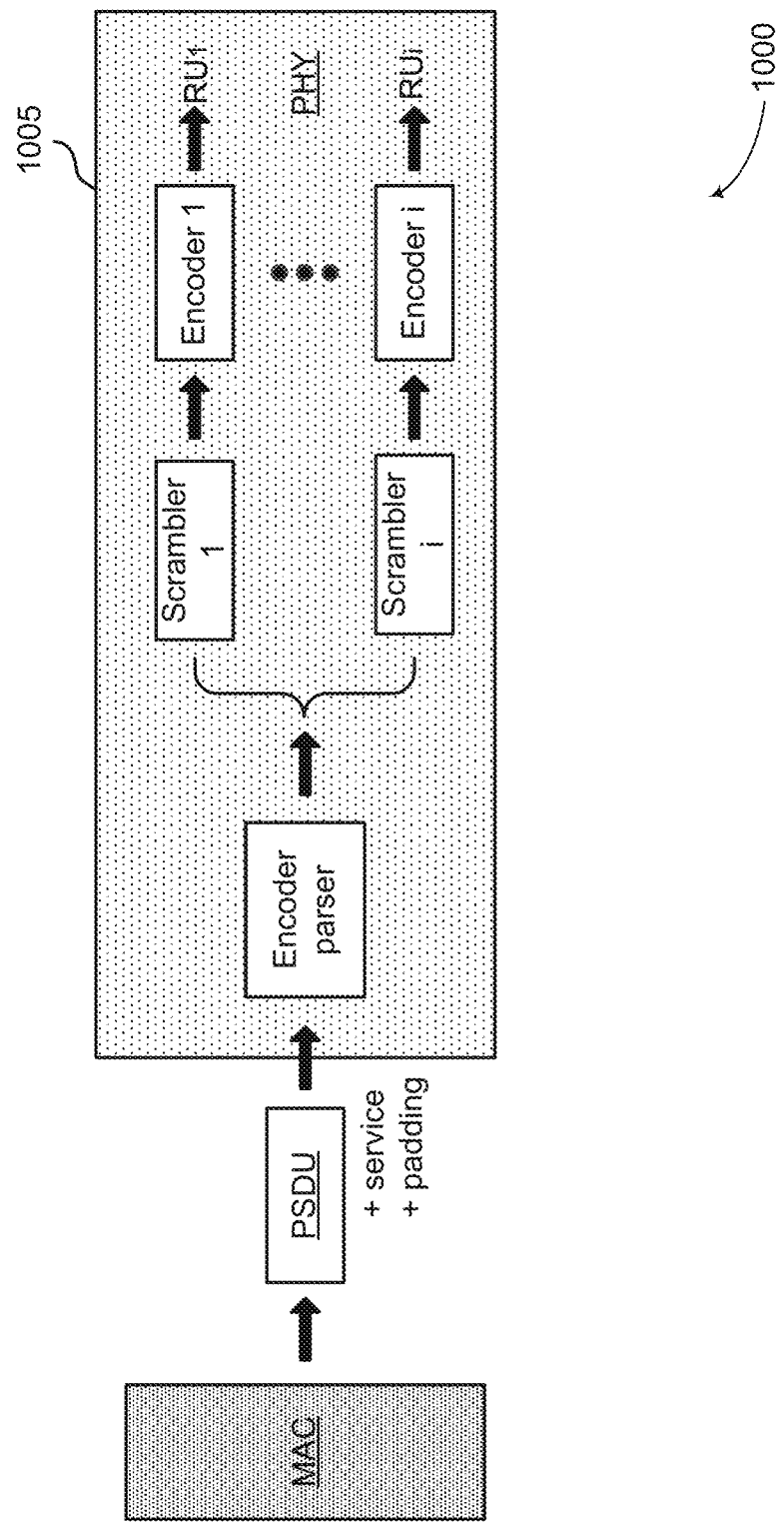

FIG. 10 illustrates an example of a data parsing and encoding scheme 1000 that supports data parsing to support RU aggregation in accordance with aspects of the present disclosure. In some examples, the data parsing and encoding scheme 1000 may implement aspects of the wireless communication systems 100 and 500, as described with reference to FIGS. 1 and 5. The data parsing and encoding scheme 1000 may describe a data parsing and encoding scheme that includes data parsing and subsequent data scrambling. The data parsing and encoding scheme 1000 may be implemented in conjunction with the data parsing and encoding schemes 600 and 800, as described with reference to FIGS. 6 and 8.

As shown in FIG. 10, a MAC layer of the wireless communication device (such as an AP or an STA) may pass the set of information bits to the PHY layer 1005 in a single PSDU. The information bits may include service bits, data bits contained within the PSDU, and padding bits for each user in transmitting the SU or the MU PPDU. The PHY layer 1005 may include an encoder parser for distributing the information bits to the multiple RUs. In some implementations, as part of a sequential distribution at the PHY layer 1005, the encoder parser may distribute each information bit to a respective RU based on a cyclical process, with a first bit being distributed to a first RU of the aggregation followed by a subsequent bit being distributed to an additional RU, where the first RU and the additional RU may each be an example of a data unit. In other implementations, the encoder parser may distribute the information bits by filling an RU of the aggregation with the distributed bits prior to distributing to one or more additional RUs.

Following the data parsing, the PHY layer 1005 may include multiple scramblers associated with a respective RU of the RU aggregation. The multiple scramblers may mix the distributed information bits with a pseudo-random sequence in order to reduce attenuation due to neighboring data traffic. In some examples, the multiple scramblers of the PHY layer 1005 may be configured with different scrambling sequences for scrambling the distributed information bits.

The wireless communication device may then perform separate encoding and interleaving for each of the sets of scrambled bits over the multiple RUs. For example, the wireless communication device may treat each RU of the aggregation independently and perform separate encoding and interleaving over the multiple RUs. In addition, within each of the aggregated RUs, the wireless communication device may implement LDPC tone mapping within each respective RU and may signal the coded bits as part of an SU or an MU PPDU on the aggregated RUs of the frequency channel.

Figure 11:
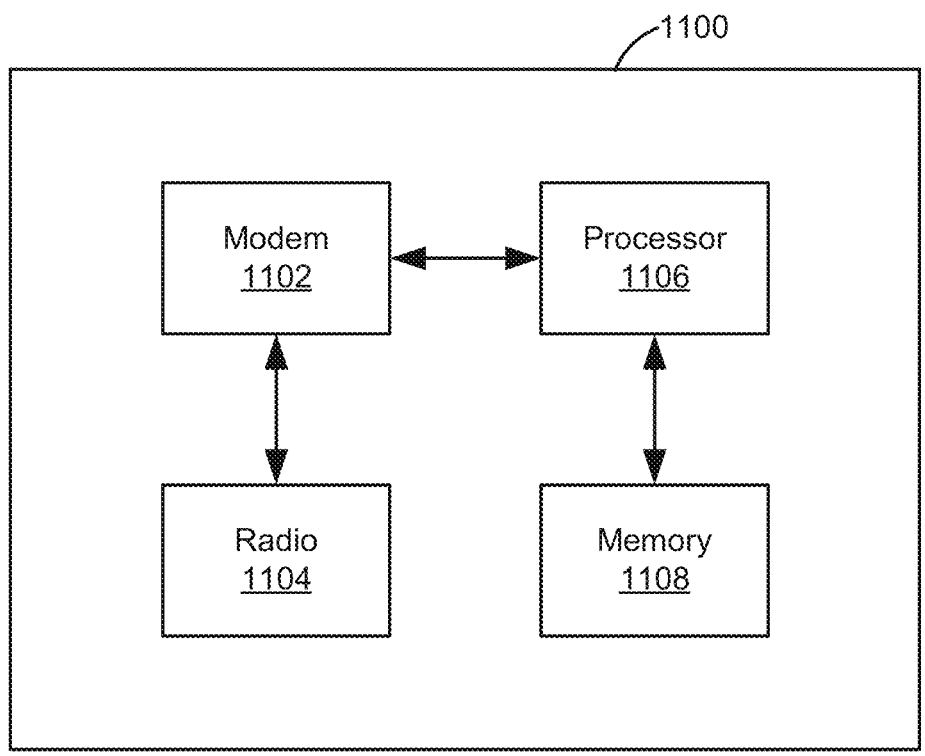
FIG. 11 illustrates a block diagram of an example wireless communication device that supports data parsing to support RU aggregation in accordance with aspects of the present disclosure.

FIG. 11 shows a block diagram of an example wireless communication device 1100 that supports data parsing to support RU aggregation in accordance with aspects of the present disclosure. In some implementations, the wireless communication device 1100 can be an example of a device for use in a STA such as one of the STAs 104 described above with reference to FIG. 1. In some implementations, the wireless communication device 1100 can be an example of a device for use in an AP such as the AP 102 described above with reference to FIG. 1. The wireless communication device 1100 is capable of transmitting (or outputting for transmission) and receiving wireless communications (for example, in the form of wireless packets). For example, the wireless communication device can be configured to transmit and receive packets in the form of PPDUs and MPDUs conforming to an IEEE 802.11 standard, such as that defined by the IEEE 802.11-2016 specification or amendments thereof including, but not limited to, 802.11 ah, 802.11 ad, 802.11ay, 802.11ax, 802.11az, 802.11ba and 802.11be.

The wireless communication device 1100 can be, or can include, a chip, system on chip (SoC), chipset, package or device that includes one or more modems 1102, for example, a Wi-Fi (IEEE 802.11 compliant) modem. In some implementations, the one or more modems 1102 (collectively "the modem 1102") additionally include a WWAN modem (for example, a 3GPP 4G LTE or 5G compliant modem). In some implementations, the wireless communication device 1100 also includes one or more radios 1104 (collectively "the radio 1104"). In some implementations, the wireless communication device 1106 further includes one or more processors, processing blocks or processing elements 1106 (collectively "the processor 1106") and one or more memory blocks or elements 1108 (collectively "the memory 1108").

The modem 1102 can include an intelligent hardware block or device such as, for example, an application-specific integrated circuit (ASIC) among other possibilities. The modem 1102 is generally configured to implement a PHY layer. For example, the modem 1102 is configured to modulate packets and to output the modulated packets to the radio 1104 for transmission over the wireless medium. The modem 1102 is similarly configured to obtain modulated packets received by the radio 1104 and to demodulate the packets to provide demodulated packets. In addition to a modulator and a demodulator, the modem 1102 may further include digital signal processing (DSP) circuitry, AGC, a coder, a decoder, a multiplexer and a demultiplexer. For example, while in a transmission mode, data obtained from the processor 1106 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 1104. In implementations involving beamforming, the modulated symbols in the respective spatial streams are precoded via a steering matrix prior to their provision to the IFFT block.

While in a reception mode, digital signals received from the radio 1104 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 1106) for processing, evaluation or interpretation.

The radio 1104 generally includes at least one RF transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 1100 can include, or be coupled with, multiple transmit antennas (each with a corresponding transmit chain) and multiple receive antennas (each with a corresponding receive chain). The symbols output from the modem 1102 are provided to the radio 1104, which then transmits the symbols via the coupled antennas. Similarly, symbols received via the antennas are obtained by the radio 1104, which then provides the symbols to the modem 1102.

The processor 1106 can include an intelligent hardware block or device such as, for example, a processing core, a processing block, a central processing unit (CPU), a microprocessor, a microcontroller, a DSP, an ASIC, a programmable logic device (PLD) such as a field programmable gate array (FPGA), discrete gate or transistor logic, discrete hardware components, or any combination thereof designed to perform the functions described herein. The processor 1106 processes information received through the radio 1104 and the modem 1102, and processes information to be output through the modem 1102 and the radio 1104 for transmission through the wireless medium. For example, the processor 1106 may implement a control plane and MAC layer configured to perform various operations related to the generation and transmission of MPDUs, frames or packets. The MAC layer is configured to perform or facilitate the coding and decoding of frames, spatial multiplexing, STBC, beamforming, and OFDMA resource allocation, among other operations or techniques. In some implementations, the processor 1106 may generally control the modem 1102 to cause the modem to perform various operations described above.

The memory 1108 can include tangible storage media such as random access memory (RAM) or read-only memory (ROM), or combinations thereof. The memory 1108 also can store non-transitory processor- or computer-executable software (SW) code containing instructions that, if executed by the processor 1106, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more components of one or more computer programs.

Figure 12:
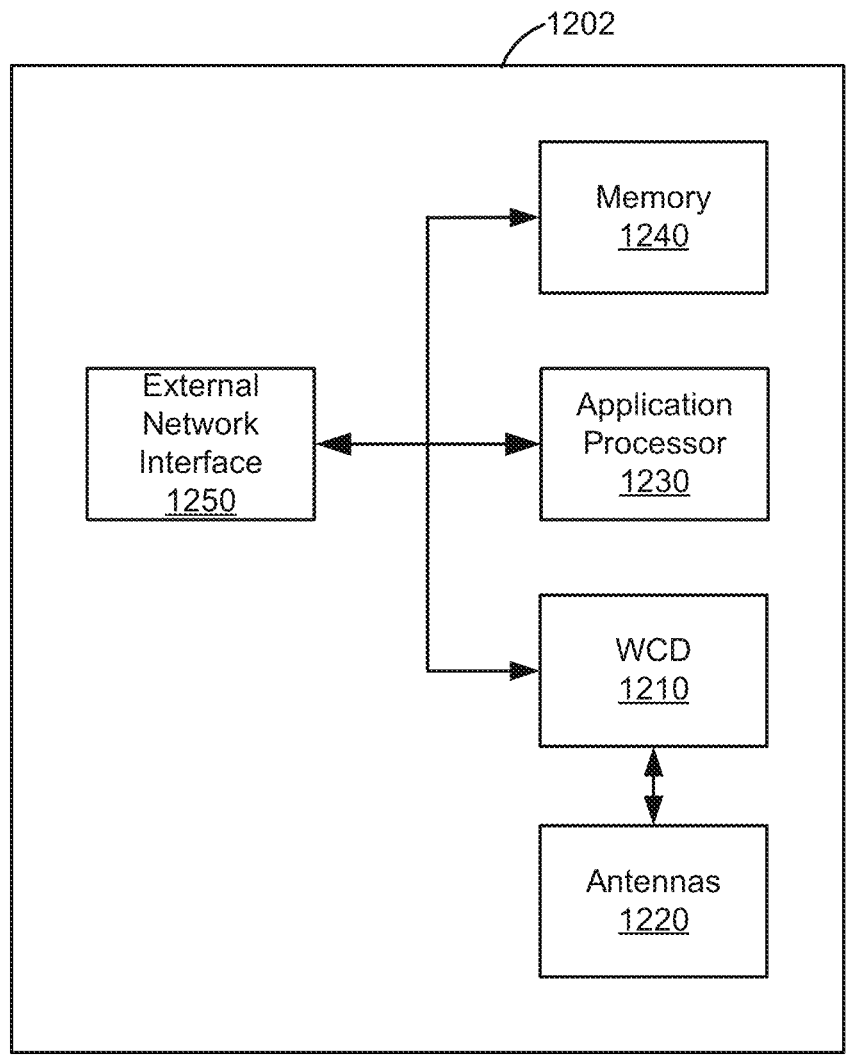
FIG. 12 illustrates a block diagram of an example AP that supports data parsing to support RU aggregation in accordance with aspects of the present disclosure.

FIG. 12 shows a block diagram of an example AP 1202 that supports data parsing to support RU aggregation in accordance with aspects of the present disclosure. For example, the AP 1202 can be an example implementation of the AP 102 or the AP 102-a, as described with reference to FIGS. 1 and 5. The AP 1202 includes a wireless communication device (WCD) 1210. For example, the wireless communication device 1210 may be an example implementation of the wireless communication device 1100 described with reference to FIG. 11. The AP 1202 also includes multiple antennas 1220 coupled with the wireless communication device 1210 to transmit and receive wireless communications. In some implementations, the AP 1202 additionally includes an application processor 1230 coupled with the wireless communication device 1210, and a memory 1240 coupled with the application processor 1230. The AP 1202 further includes at least one external network interface 1250 that enables the AP 1202 to communicate with a core network or backhaul network to gain access to external networks including the Internet. For example, the external network interface 1250 may include one or both of a wired (for example, Ethernet) network interface and a wireless network interface (such as a WWAN interface). Ones of the aforementioned components can communicate with other ones of the components directly or indirectly, over at least one bus. The AP 1202 further includes a housing that encompasses the wireless communication device 1210, the application processor 1230, the memory 1240, and at least portions of the antennas 1220 and external network interface 1250.

Figure 13:
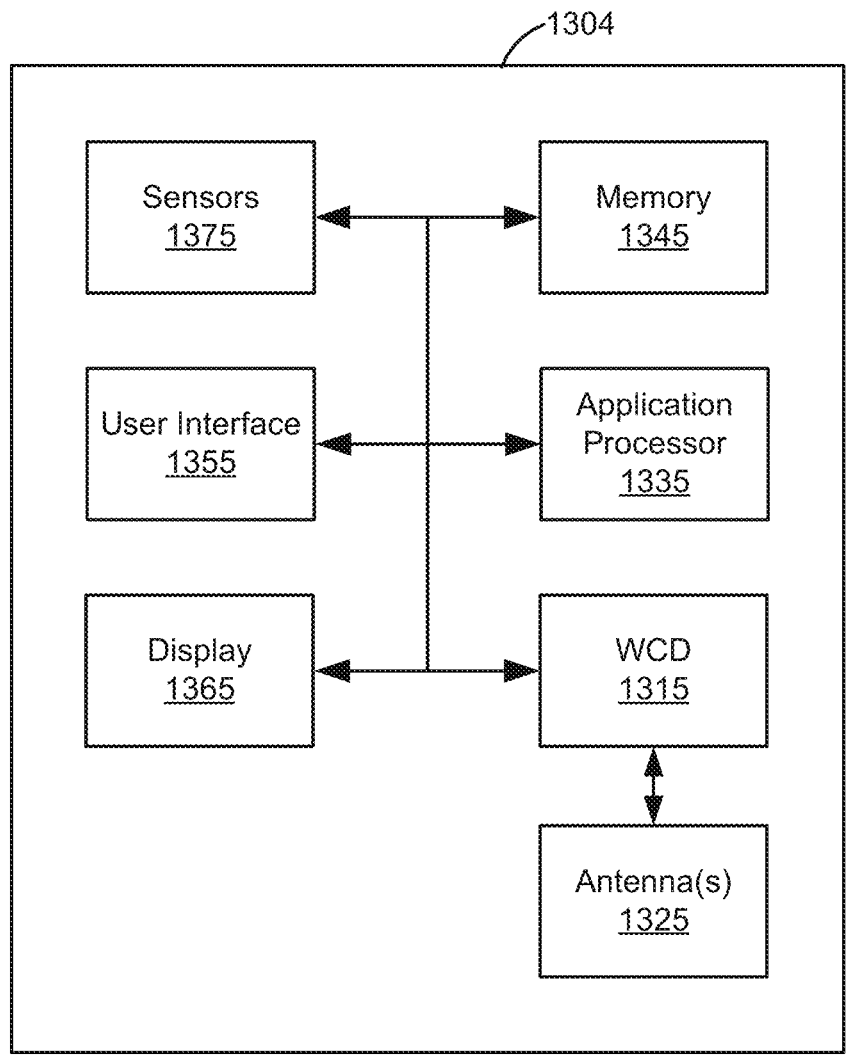
FIG. 13 illustrates a block diagram of an example STA that supports data parsing to support RU aggregation in accordance with aspects of the present disclosure.

FIG. 13 shows a block diagram of an example STA 1304 that supports data parsing to support RU aggregation in accordance with aspects of the present disclosure. For example, the STA 1304 can be an example implementation of the STA 104 or the STA 104-a, as described with reference to FIGS. 1 and 5. The STA 1304 includes a wireless communication device 1315. For example, the wireless communication device 1315 may be an example implementation of the wireless communication device 1100 described with reference to FIG. 11. The STA 1304 also includes one or more antennas 1325 coupled with the wireless communication device 1315 to transmit and receive wireless communications. The STA 1304 additionally includes an application processor 1335 coupled with the wireless communication device 1315, and a memory 1345 coupled with the application processor 1335. In some implementations, the STA 1304 further includes a user interface (UI) 1355 (such as a touchscreen or keypad) and a display 1365, which may be integrated with the UI 1355 to form a touchscreen display. In some implementations, the STA 1304 may further include one or more sensors 1375 such as, for example, one or more inertial sensors, accelerometers, temperature sensors, pressure sensors, or altitude sensors. Ones of the aforementioned components can communicate with other ones of the components directly or indirectly, over at least one bus. The STA 1304 further includes a housing that encompasses the wireless communication device 1315, the application processor 1335, the memory 1345, and at least portions of the antennas 1325, UI 1355, and display 1365.

Figure 14:
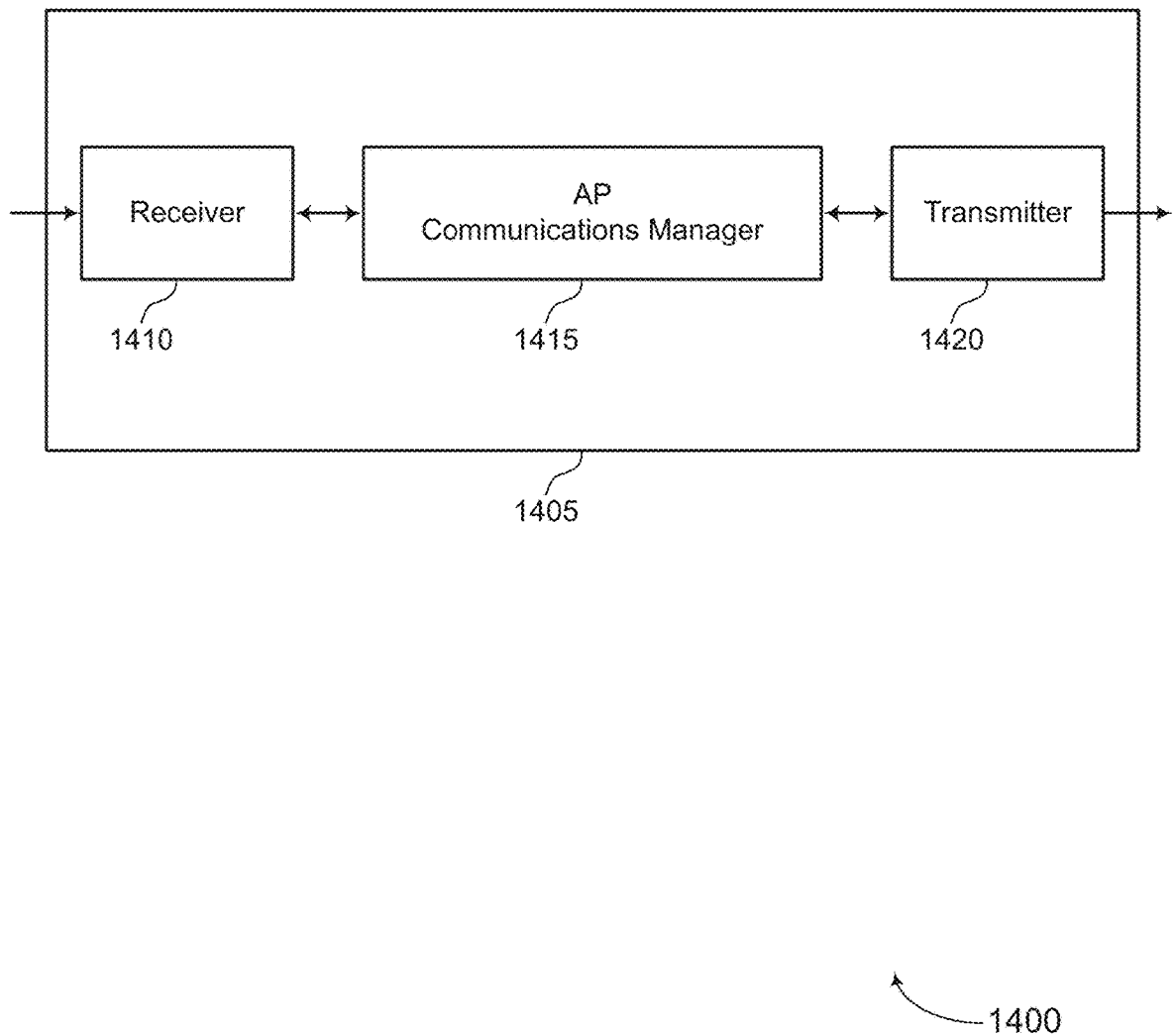
FIGS. 14 and 15 show block diagrams of devices that support data parsing to support RU aggregation in accordance with aspects of the present disclosure.

FIG. 14 shows a block diagram of a device 1405 that supports data parsing to support RU aggregation in accordance with aspects of the present disclosure. The device 1405 may be an example of aspects of an AP as described herein. The device 1405 may include a receiver 1410, an AP communications manager 1415, and a transmitter 1420. The device 1405 can be implemented, at least in part, by one or both of a modem and a processor. Each of these components may be in communication with one another, for example, via one or more buses.

The receiver 1410 may receive information such as packets, user data, or control information associated with various information channels, for example, control channels, data channels, and information related to data parsing to support RU aggregation. Information may be passed on to other components of the device. The receiver 1410 may be an example of aspects of the transceiver 1720 described with reference to FIG. 17. The receiver 1410 may utilize a single antenna or a set of antennas.

The AP communications manager 1415 may allocate a set of RUs for a STA in a BSS of the AP, the set of RUs associated with two or more available bandwidth segments of a bandwidth allocation, encode a set of information bits associated with a set of data units by jointly encoding all the information bits associated with the set of data units together or by encoding the information bits of each data unit separately from the encoding of the information bits of the other data units of the set of data units, distribute the set of encoded information bits to the set of RUs, and transmit the distributed set of encoded information bits on the set of RUs. The AP communications manager 1415 may also receive a set of encoded information bits on the set of RUs from a STA in a BSS of the AP, the set of encoded information bits being encoded based on encoding all the information bits associated with the set of data units together or by encoding the information bits of each data unit separately from the encoding of the information bits of the other data units of the set of data units and decode the set of encoded information bits associated with the set of RUs based on the receiving. The AP communications manager 1415 may be an example of aspects of the AP communications manager 1710 described herein.

The transmitter 1420 may transmit signals generated by other components of the device. In some examples, the transmitter 1420 may be collocated with a receiver 1410 in a transceiver component. For example, the transmitter 1420 may be an example of aspects of the transceiver 1720 described with reference to FIG. 17. The transmitter 1420 may utilize a single antenna or a set of antennas.

Figure 15:
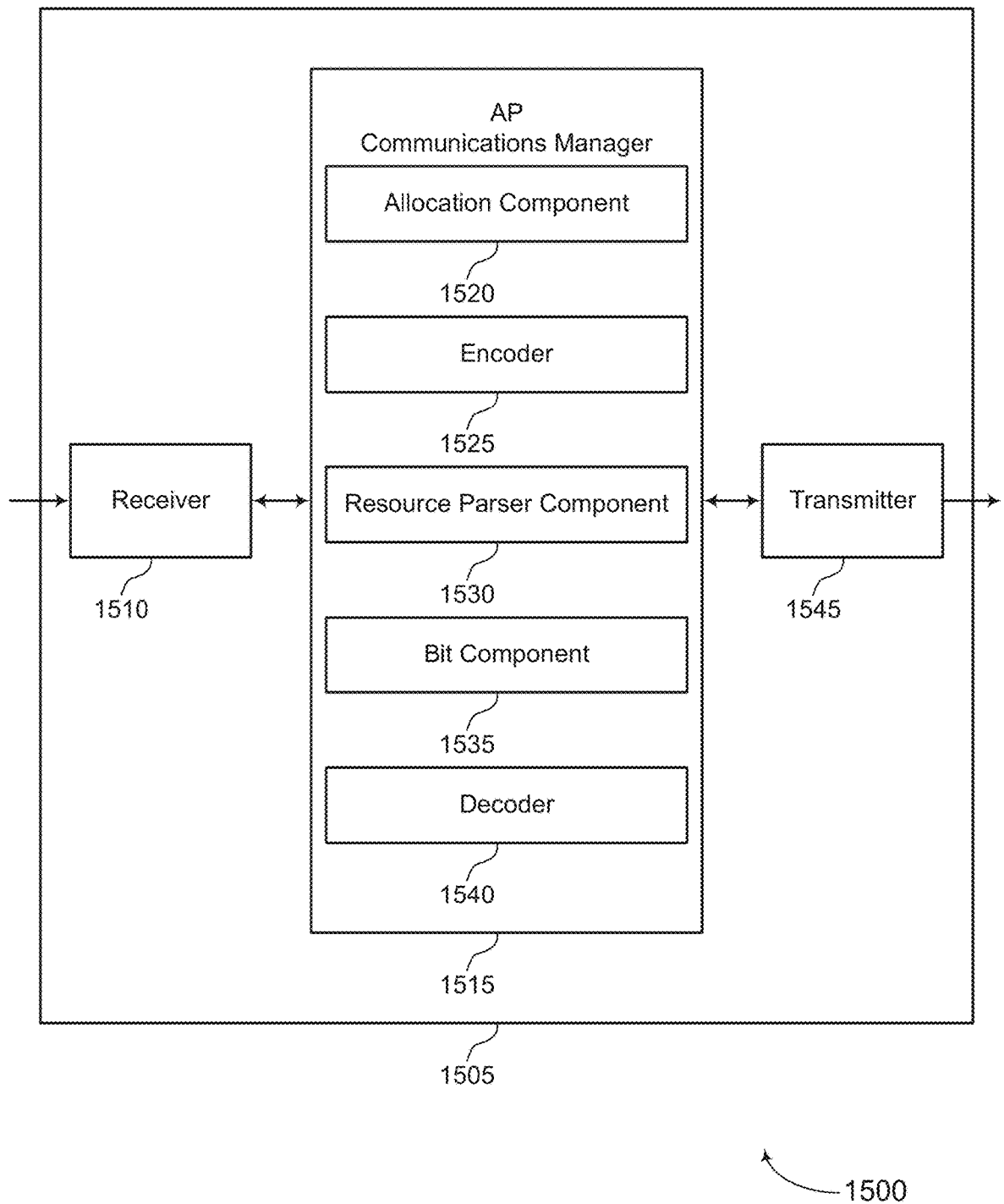

FIG. 15 shows a block diagram of a device 1505 that supports data parsing to support RU aggregation in accordance with aspects of the present disclosure. The device 1505 may be an example of aspects of a device 1405 or an AP 102 as described herein. The device 1505 may include a receiver 1510, an AP communications manager 1515, and a transmitter 1545. The device 1505 can be implemented, at least in part, by one or both of a modem and a processor. Each of these components may be in communication with one another, for example, via one or more buses.

The receiver 1510 may receive information such as packets, user data, or control information associated with various information channels, for example, control channels, data channels, and information related to data parsing to support RU aggregation. Information may be passed on to other components of the device. The receiver 1510 may be an example of aspects of the transceiver 1720 described with reference to FIG. 17. The receiver 1510 may utilize a single antenna or a set of antennas.

The AP communications manager 1515 may be an example of aspects of the AP communications manager 1415 as described herein. The AP communications manager 1515 may include an allocation component 1520, an encoder 1525, a resource/segment parser component 1530, a bit component 1535, and a decoder 1540. The AP communications manager 1515 may be an example of aspects of the AP communications manager 1710 described herein.

The allocation component 1520 may allocate a set of RUs for a STA in a BSS of the AP, the set of RUs associated with two or more available bandwidth segments of a bandwidth allocation. The encoder 1525 may encode a set of information bits associated with a set of data units by jointly encoding all the information bits associated with the set of data units together or by encoding the information bits of each data unit separately from the encoding of the information bits of the other data units of the set of data units. The resource/segment parser component 1530 may distribute the set of encoded information bits to the set of RUs and transmit the distributed set of encoded information bits on the set of RUs. The bit component 1535 may receive a set of encoded information bits on the set of RUs from a STA in a BSS of the AP, the set of encoded information bits being encoded based on encoding all the information bits associated with the set of data units together or by encoding the information bits of each data unit separately from the encoding of the information bits of the other data units of the set of data units. The decoder 1540 may decode the set of encoded information bits associated with the set of RUs based on the receiving.

The transmitter 1545 may transmit signals generated by other components of the device. In some examples, the transmitter 1545 may be collocated with a receiver 1510 in a transceiver component. For example, the transmitter 1545 may be an example of aspects of the transceiver 1720 described with reference to FIG. 17. The transmitter 1545 may utilize a single antenna or a set of antennas.

Figure 16:
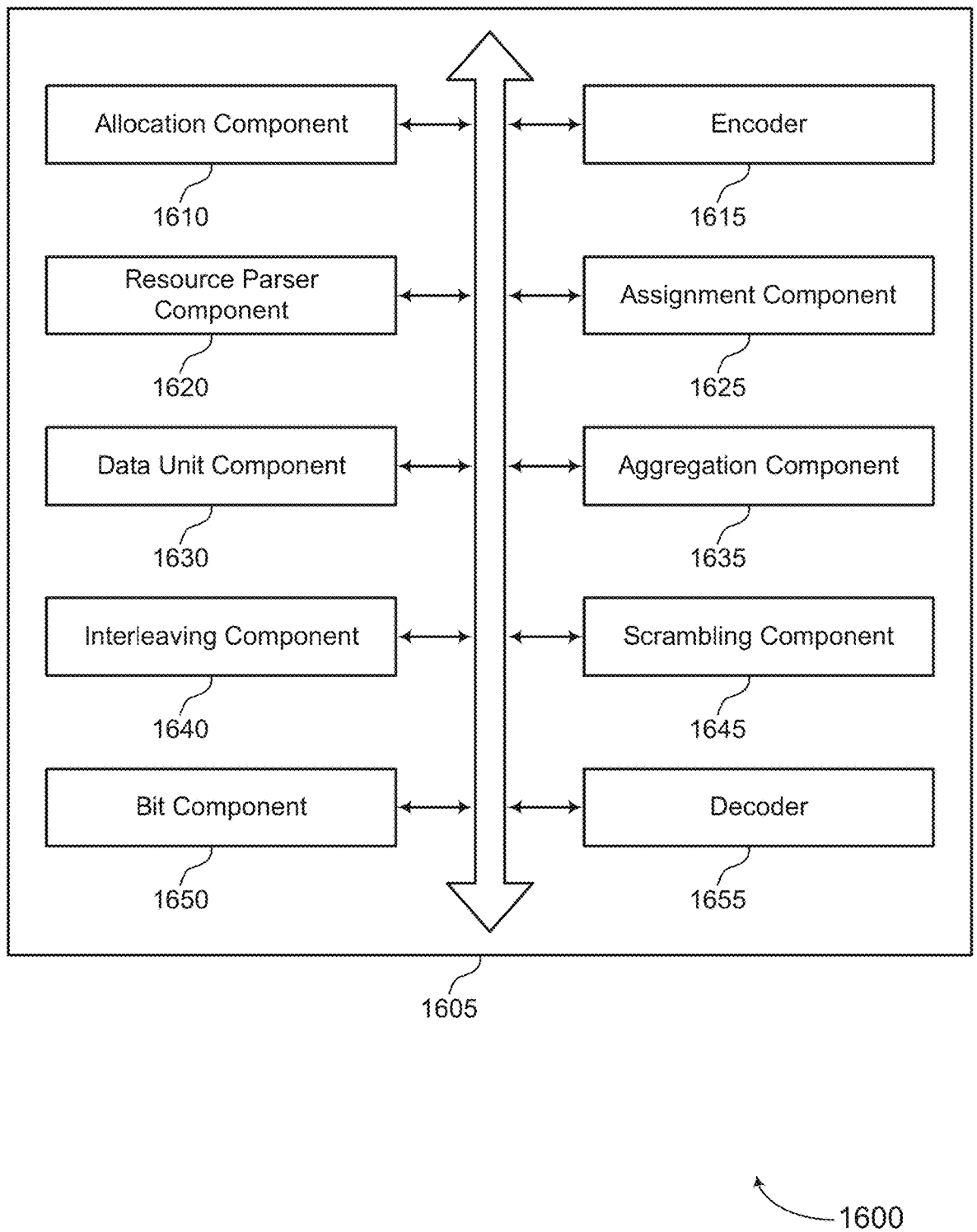
FIG. 16 shows a block diagram of an AP communications manager that supports data parsing to support RU aggregation in accordance with aspects of the present disclosure.

FIG. 16 shows a block diagram of an AP communications manager 1605 that supports data parsing to support RU aggregation in accordance with aspects of the present disclosure. The AP communications manager 1605 may be an example of aspects of an AP communications manager 1415, an AP communications manager 1515, or an AP communications manager 1710 described herein. The AP communications manager 1605 may include an allocation component 1610, an encoder 1615, a resource/segment parser component 1620, an assignment component 1625, a data unit component 1630, an aggregation component 1635, an interleaving component 1640, a scrambling component 1645, a bit component 1650, and a decoder 1655. Each of these components may communicate, directly or indirectly, with one another, such as via one or more buses.

The allocation component 1610 may allocate a set of RUs for a STA in a BSS of the AP, the set of RUs associated with two or more available bandwidth segments of a bandwidth allocation. In some examples, the allocation component 1610 may determine a noncontiguous bandwidth allocation including the two or more available bandwidth segments. In some examples, allocating the set of RUs is based on the two or more available bandwidth segments. In some examples, the allocation component 1610 may allocate the set of RUs for the STA in the BSS of the AP is based on an OFDMA mode.

In some examples, at least one RU of the set of RUs has at least one of a different RU length relative to the other RUs of the set of RUs, a different modulation order relative to the other RUs of the set of RUs, a different modulation coding scheme relative to the other RUs of the set of RUs, a different beam forming configuration, or a different spatial stream relative to the other RUs of the set of RUs. In some examples, the bandwidth allocation includes a noncontiguous bandwidth allocation. In some examples, the bandwidth allocation includes a contiguous subband having a length equal to a sum of multiple RUs of the set of RUs having preconfigured lengths. In some examples, the set of data units includes at least one data unit carrying the set of information bits, the at least one data unit including a PSDU.

The encoder 1615 may encode a set of information bits associated with a set of data units by jointly encoding all the information bits associated with the set of data units together or by encoding the information bits of each data unit separately from the encoding of the information bits of the other data units of the set of data units. In some examples, receiving the set of data units at the PHY layer of the AP. In some examples, encoding the information bits of each data unit separately includes encoding the information bits of the set of assigned information bits associated with each data unit of the set of data units separately from the encoding of the information bits associated with the other data units of the set of data units based at least in part on the assigning of the information bits of the set of information bits to the set of RUs. In some examples, encoding the information bits of each data unit separately includes encoding the assigned information bits of the set of information bits associated with each data unit of the set of data units separately from the encoding of the information bits associated with the other data units of the set of data units based at least in part on the receiving.

In some examples, the encoder 1615 may apply an equivalent code rate to the set of information bits associated with all data units of the set of data units. In some examples, the PHY layer includes a set of encoders for separately encoding the assigned information bits of the set of information bits associated with the set of data units. In some examples, the PHY layer includes a set of encoders for encoding the assigned information bits associated with each data unit of the set of data units separately.

The resource/segment parser component 1620 may distribute the set of encoded information bits to the set of RUs. In some examples, the resource/segment parser component 1620 may transmit the distributed set of encoded information bits on the set of RUs. In some examples, the resource/segment parser component 1620 may distribute the set of encoded information bits to the set of RUs sequentially. In some examples, the resource/segment parser component 1620 may determine a RU of the set of RUs that has a first frequency based on comparing relative frequencies of multiple RUs of the set of RUs. In some examples, the resource/segment parser component 1620 may assign coded bits of the set of encoded information bits to the RU having the first frequency based on the determining. In some examples, the resource/segment parser component 1620 may assign remaining coded bits of the set of encoded information bits to one or more additional RUs of the set of RUs. In some examples, each of the one or more additional RUs has a higher frequency than the first frequency. In some examples, the first frequency is a lowest frequency in the set of RUs. In some examples, the resource/segment parser component 1620 may fill all bits of an OFDM symbol associated with the RU having the first frequency with the coded bits of the set of encoded information bits before filling any bits of a second OFDM symbol.

In some examples, the resource/segment parser component 1620 may distribute the set of encoded information bits to the set of RUs in a cyclical process. In some examples, the resource/segment parser component 1620 may determine one or more of one or more modulation coding schemes or a ratio corresponding to the one or more modulation coding schemes. In some examples, distributing the set of encoded information bits to the set of RUs in the cyclical process is based on one or more of the one or more modulation coding schemes or the ratio corresponding to the one or more modulation coding schemes. In some examples, the resource/segment parser component 1620 may determine a ratio corresponding to one or more modulation coding schemes and a ratio corresponding to two or more RUs of the set of RUs. In some examples, distributing the set of encoded information bits to the set of RUs in the cyclical process is based on the ratio corresponding to one or more modulation coding schemes and the ratio corresponding to two or more RUs of the set of RUs.

In some examples, the resource/segment parser component 1620 may forward two or more data units of the set of data units using a multi-link aggregation scheme. In some examples, the two or more data units of the set of data units includes PLCP protocol data units. In some examples, the resource/segment parser component 1620 may forward, from a MAC layer of the access point, two or more data units of the set of data units to a PHY layer of the access point. In some examples, the two or more data units of the set of data units includes PSDUs, and each PSDU corresponds to a separate bandwidth segment.

The resource/segment parser component 1620 may distributing the set of encoded information bits to the first RU of the set of RUs and the second RU of the set of RUs in a cyclical process based on the two or more available bandwidth segments of the bandwidth allocation associated with the first RU of the set of RUs and the second RU of the set of RUs.

In some examples, the resource/segment parser component 1620 may distribute the set of encoded information bits to the first RU of the set of RUs and the second RU of the set of RUs sequentially.

In some examples, the resource/segment parser component 1620 may distribute the assigned coded bits of the set of encoded information bits to the set of RUs based on the assigning of the coded bits of the set of encoded information bits to the set of RUs. In some examples, the resource/segment parser component 1620 may distribute the set of assigned coded bits to the set of RUs based on the assigning of the coded bits of the set of encoded information bits to the set of RUs.

In some examples, the resource/segment parser component 1620 may distribute coded bits to the set of RUs sequentially by assigning one or more coded bits of the set of assigned coded bits to two or more RUs of the set of RUs before assigning one or more other coded bits to one or more other RUs of the set of RUs. In some examples, the resource/segment parser component 1620 may distribute coded bits to the set of RUs sequentially by assigning one or more coded bits of the set of assigned coded bits to each RU of the set of RUs before assigning one or more other coded bits to one or more other RUs of the set of RUs. In some examples, the resource/segment parser component 1620 may distribute coded bits to the set of RUs sequentially by assigning coded bits of the set of assigned coded bits to a first RU of the set of RUs and assigning remaining coded bits of the set of assigned coded bits to one or more other RUs of the set of RUs different than the first RU after all the bits of an OFDM symbol of the first RU are filled.

In some examples, the resource/segment parser component 1620 may distribute the set of encoded information bits to the set of RUs is further based on the aggregating. In some examples, the resource/segment parser component 1620 may distribute one or more RUs of the set of RUs based on the two or more available bandwidth segments of the bandwidth allocation. In some examples, distributing the set of encoded information bits to the set of RUs is based on the distributing. In some examples, the resource/segment parser component 1620 may distribute the set of encoded information bits to the set of RUs is further based on the performing. In some examples, the resource/segment parser component 1620 may determine a quantity of OFDM symbols associated with a data field of a packet based on one or more of a space-time block coding parameter value, a length parameter value, a coding scheme parameter value, a payload bit parameter value, or an LDPC encoding parameter value. In some examples, the packet carries the set of information bits. In some examples, the resource/segment parser component 1620 may assign an additional OFDM symbol for each RU of the set of RUs based on the LDPC encoding parameter value. In some examples, the resource/segment parser component 1620 may determine a set of distributed information bits for each RU of the set of RUs based on one or more of a symbol duration parameter value, a data rate parameter value, a spatial stream parameter value, or a padding bit parameter value. In some examples, the PHY layer processes each RU of the set of RUs independently.

In some examples, the resource/segment parser component 1620 may determine, at the PHY layer of the access point, that a RU size of a RU of the set of RUs satisfies a threshold. In some examples, the threshold includes an available bandwidth segment of the two or more available bandwidth segments of the bandwidth allocation, assign, at the PHY layer of the access point, the RU of the set of RUs to the available bandwidth segment, and distribute, at the PHY layer of the access point, the set of encoded information bits to the RU of the set of RUs based at least in part on assigning the RU of the set of RUs to the available bandwidth segment. In some other examples, the resource/segment parser component 1620 may determine, at the PHY layer of the access point, that each RU size of the set of RUs satisfies a threshold In some examples, the threshold includes an available bandwidth segment of the two or more available bandwidth segments of the bandwidth allocation, and assign, at the PHY layer of the access point, RUs of the set of RUs to the available bandwidth segment of the two or more available bandwidth segments of the bandwidth allocation. In some examples, distributing the set of encoded information bits to the set of RUs may include distributing the set of encoded information bits to the RUs of the set of RUs based at least in part on assigning the RUs of the set of RUs to the available bandwidth segment.

The resource/segment parser component 1620 may perform a RU interleaving of the set of encoded information bits within each RU of the set of RUs. In some examples, the PHY layer may include a RU parser and a bandwidth segment parser, the RU parser may distribute the set of encoded information bits to the set of RUs, and the bandwidth segment parser may assign coded bits of each RU of the set of RUs to each available bandwidth segment within each RU of the set of RUs In some examples, the available bandwidth segment includes an 80 MHz segment. In some examples, the bandwidth segment parser may assign coded bits of each RU of the set of RUs to each available bandwidth segment within each RU of the set of RUs prior to the RU parser distributing the coded bits of each RU of the set of RUs within each available bandwidth segment. The resource/segment parser component 1620 may determine an unavailable bandwidth segment of the two or more available bandwidth segments of the bandwidth allocation and puncture the unavailable bandwidth segment of the bandwidth allocation. In some examples, puncturing the unavailable bandwidth segment includes puncturing one or more frequency tones in the unavailable bandwidth segment. The resource/segment parser component 1620 may perform an interleaving of the set of encoded information bits within a transmission bandwidth based at least in part on the puncturing. In some examples, the interleaving includes distributing the set of encoded information bits to the available bandwidth segment and skipping the punctured one or more frequency tones in the unavailable bandwidth segment.

The bit component 1650 may receive a set of encoded information bits on the set of RUs from a STA in a BSS of the AP, the set of encoded information bits being encoded based on encoding all the information bits associated with the set of data units together or by encoding the information bits of each data unit separately from the encoding of the information bits of the other data units of the set of data units. In some examples, at least one RU of the set of RUs has at least one of a different RU length relative to the other RUs of the set of RUs, a different modulation order relative to the other RUs of the set of RUs, a different modulation coding scheme relative to the other RUs of the set of RUs, a different beam forming configuration, or a different spatial stream relative to the other RUs of the set of RUs.

The decoder 1655 may decode the set of encoded information bits associated with the set of RUs based on the receiving. In some examples, the decoder 1655 may decode all the information bits associated with the set of data units together or by decoding the information bits of each data unit separately from the decoding of the information bits of the other data units of the set of data units.

The assignment component 1625 may assign, at a MAC layer of the AP, information bits of the set of information bits to the set of RUs. In some examples, the assignment component 1625 may assign, at the PHY layer of the AP, information bits of the set of information bits to the set of RUs. In some examples, the assignment component 1625 may assign information bits of the set of information bits to the set of RUs occurs before encoding the set of information bits associated with the set of data units separately.

The assignment component 1625 may determine, at the PHY layer of the access point, that a first RU size of a first RU of the set of RUs and a second RU size of a second RU of the set of RUs satisfies a threshold. In some examples, the threshold includes an available bandwidth segment of the two or more available bandwidth segments of the bandwidth allocation. In some examples, the PHY layer includes a set of encoders for separately encoding the assigned information bits of the set of information bits associated with the set of data units, assign, at the PHY layer of the access point, the first RU and the second RU to the two or more available bandwidth segments of the bandwidth allocation, the first RU having the first RU size and the second RU having the second RU size, and determine a ratio corresponding to one or more modulation coding schemes associated with the first RU and the second RU. In some examples, distributing the set of encoded information bits to the set of RUs includes distributing the set of encoded information bits to the first RU of the set of RUs and the second RU of the set of RUs based on the first RU size of the first RU of the set of RUs, the second RU size of the second RU of the set of RUs and the ratio corresponding to one or more modulation coding schemes associated with the first RU and the second RU.

The assignment component 1625 may assign coded bits of the set of encoded information bits to the first RU of the set of RUs, the first RU corresponding to a first bandwidth segment of the bandwidth allocation. In some examples, the first bandwidth segment includes a 160 megahertz (MHz) segment, and assign remaining coded bits of the set of encoded information bits to the second RU of the set of RUs after assigning the coded bits of the set of encoded information bits to the first RU, the second RU corresponding to a second bandwidth segment of the bandwidth allocation. In some examples, the second bandwidth segment includes a 160 MHz segment. The assignment component 1625 may assign coded bits of each RU of the set of RUs to each available bandwidth segment within each RU of the set of RUs in a cyclical process.

The data unit component 1630 may generate, at the MAC layer based on the assigning, the set of data units, each of the data units of the set of data units including a PSDU. In some examples, the data unit component 1630 may forward the set of data units to a PHY layer of the AP. In some examples, the data unit component 1630 may forward, from a MAC layer to a PHY layer of the AP, the one or more PSDUs, the one or more PSDUs carrying the set of information bits. In some examples, the data unit component 1630 may receive, at the PHY layer, the one or more RUs jointly or independently.

The aggregation component 1635 may aggregate two or more RUs of the set of RUs based on the two or more available bandwidth segments of the bandwidth allocation. In some examples, the two or more RUs are noncontiguous RUs of the set of RUs. In some examples, the aggregation component 1635 may aggregate two or more RUs of the set of RUs based on the two or more available bandwidth segments of the bandwidth allocation. In some examples, the two or more available bandwidth segments of the bandwidth allocation are contiguous and include one or more of the RUs. In some examples, aggregation component 1635 may determine an aggregate RU that includes the set of RUs. In some examples, the aggregation component 1635 may determine an aggregate RU size associated with the set of RUs based on RU sizes of individual RUs of the set of RUs.

The aggregation component 1635 may determine that the aggregate RU size associated with the set of RUs includes a default aggregate RU size, determine that an existing mapping distance parameter is valid or invalid based at least in part on the aggregate RU size including the default aggregate RU size, and preserve pilot tone locations in each RU of the aggregate RU associated with the set of RUs. In some examples, the interleaving scheme includes an LDPC tone interleaving scheme using the preserved pilot tone locations in each RU of the aggregate RU. The aggregation component 1635 may determine that the aggregate RU size associated with the set of RUs includes a default aggregate RU size, determine that an existing mapping distance parameter is valid based at least in part on the aggregate RU size including the default aggregate RU size, preserve the existing mapping distance parameter for the aggregate RU size, and identify pilot tone locations in the aggregate RU. In some examples, the interleaving scheme includes an LDPC tone interleaving scheme using the identified pilot tone locations in the aggregate RU. The aggregation component 1635 may determine that the aggregate RU size associated with the set of RUs includes an aggregate RU size different than a default aggregate RU size, determine a mapping distance parameter based at least in part on the aggregate RU size, and determine one or more pilot tone locations in the aggregate RU. In some examples, the interleaving scheme includes an LDPC tone interleaving scheme using one or more of the mapping distance parameter and pilot tone locations in the aggregate RU. In some examples, determining the one or more pilot tone locations in the aggregate RU includes using one or more neighboring leftover tones or 26 tones RU associated with an unavailable bandwidth segment.

The interleaving component 1640 may perform an LDPC tone interleaving of the set of encoded information bits within each RU of the set of RUs. In some examples, the interleaving component 1640 may encode the set of information bits associated with the set of data units based on an interleaving scheme. In some examples, the interleaving component 1640 may apply the interleaving scheme to the aggregate RU. In some examples, the interleaving scheme includes an LDPC tone interleaving scheme or a BCC interleaving scheme.

The scrambling component 1645 may scramble the set of information bits associated with the set of data units by jointly scrambling all of the information bits of the set of information bits associated with the set of data units together or by scrambling the information bits of each data unit separately from the scrambling of the information bits of the other data units of the set of data units. In some examples, jointly scrambling the set of information bits associated with the set of data units includes using a same scrambling sequence for all of the information bits of the set of information bits. In some examples, scrambling the information bits of each data unit associated with the set of data units separately from the scrambling of the information bits of the other data units of the set of data units includes using an equivalent scrambling sequence for information bits of the set of information bits distributed to different RUs of the set of RUs. In some examples, scrambling the information bits of each data unit associated with the set of data units separately from the scrambling of the information bits of the other data units of the set of data units includes using a different scrambling seed for information bits of the set of information bits distributed to different RUs of the set of RUs.

Figure 17:
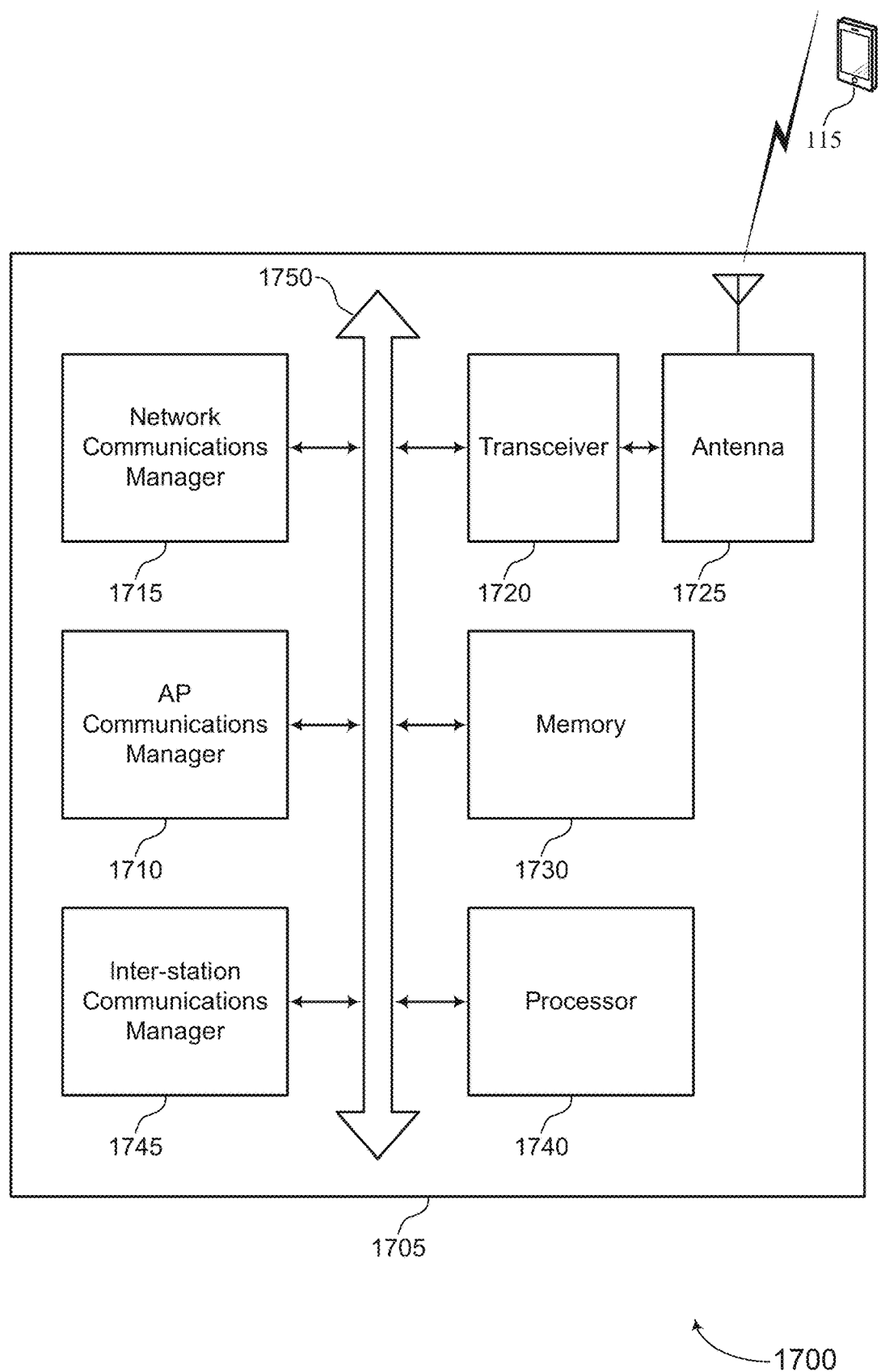
FIG. 17 shows a diagram of a system including a device that supports data parsing to support RU aggregation in accordance with aspects of the present disclosure.

FIG. 17 shows a diagram of a system including a device 1705 that supports data parsing to support RU aggregation in accordance with aspects of the present disclosure. The device 1705 may be an example of or include the components of device 1405, device 1505, or an AP as described herein. The device 1705 may include components for bi-directional voice and data communications including components for transmitting and receiving communications, including an AP communications manager 1710, a network communications manager 1715, a transceiver 1720, an antenna 1725, memory 1730, a processor 1740, and an inter-station communications manager 1745. These components may be in electronic communication via one or more buses, for example, bus 1750.

The AP communications manager 1710 may allocate a set of RUs for a STA in a BSS of the AP, the set of RUs associated with two or more available bandwidth segments of a bandwidth allocation, encode a set of information bits associated with a set of data units by jointly encoding all the information bits associated with the set of data units together or by encoding the information bits of each data unit separately from the encoding of the information bits of the other data units of the set of data units, distribute the set of encoded information bits to the set of RUs, and transmit the distributed set of encoded information bits on the set of RUs.

The AP communications manager 1710 may also receive a set of encoded information bits on the set of RUs from a STA in a BSS of the AP, the set of encoded information bits being encoded based on encoding all the information bits associated with the set of data units together or by encoding the information bits of each data unit separately from the encoding of the information bits of the other data units of the set of data units and decode the set of encoded information bits associated with the set of RUs based on the receiving.

The network communications manager 1715 may manage communications with the core network, for example, via one or more wired backhaul links. For example, the network communications manager 1715 may manage the transfer of data communications for client devices, such as one or more STAs 104.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas. In some examples, the device 1705 may include a single antenna 1725. However, in some examples, the device 1705 may have more than one antenna 1725, which may be capable of concurrently transmitting or receiving multiple wireless transmissions.

The memory 1730 may include RAM and ROM. The memory 1730 may store computer-readable, computer-executable code 1735 including instructions that, if executed, cause the processor to perform various functions described herein. In some examples, the memory 1730 may contain, among other things, a basic input/basic output system (BIOS) which may control basic hardware or software operation such as the interaction with peripheral components or devices.

The processor 1740 may include an intelligent hardware device, such as a general-purpose processor, a DSP, a CPU, a microcontroller, an ASIC, an FPGA, a programmable logic device, a discrete gate or transistor logic component, a discrete hardware component, or any combination thereof. In some examples, the processor 1740 may be configured to operate a memory array using a memory controller. In other examples, a memory controller may be integrated into processor 1740. The processor 1740 may be configured to execute computer-readable instructions stored in a memory to perform various functions, such as functions or tasks supporting data parsing to support RU aggregation.

The inter-station communications manager 1745 may manage communications with other APs 102 and may include a controller or scheduler for controlling communications with STAs 104 in cooperation with other APs 102. For example, the inter-station communications manager 1745 may coordinate scheduling for transmissions to UEs 104 for various interference mitigation techniques such as beamforming or joint transmission. In some examples, the inter-station communications manager 1745 may provide an X2 interface within an LTE/LTE-A wireless communication network technology to provide communication between APs 102.

Figure 18:
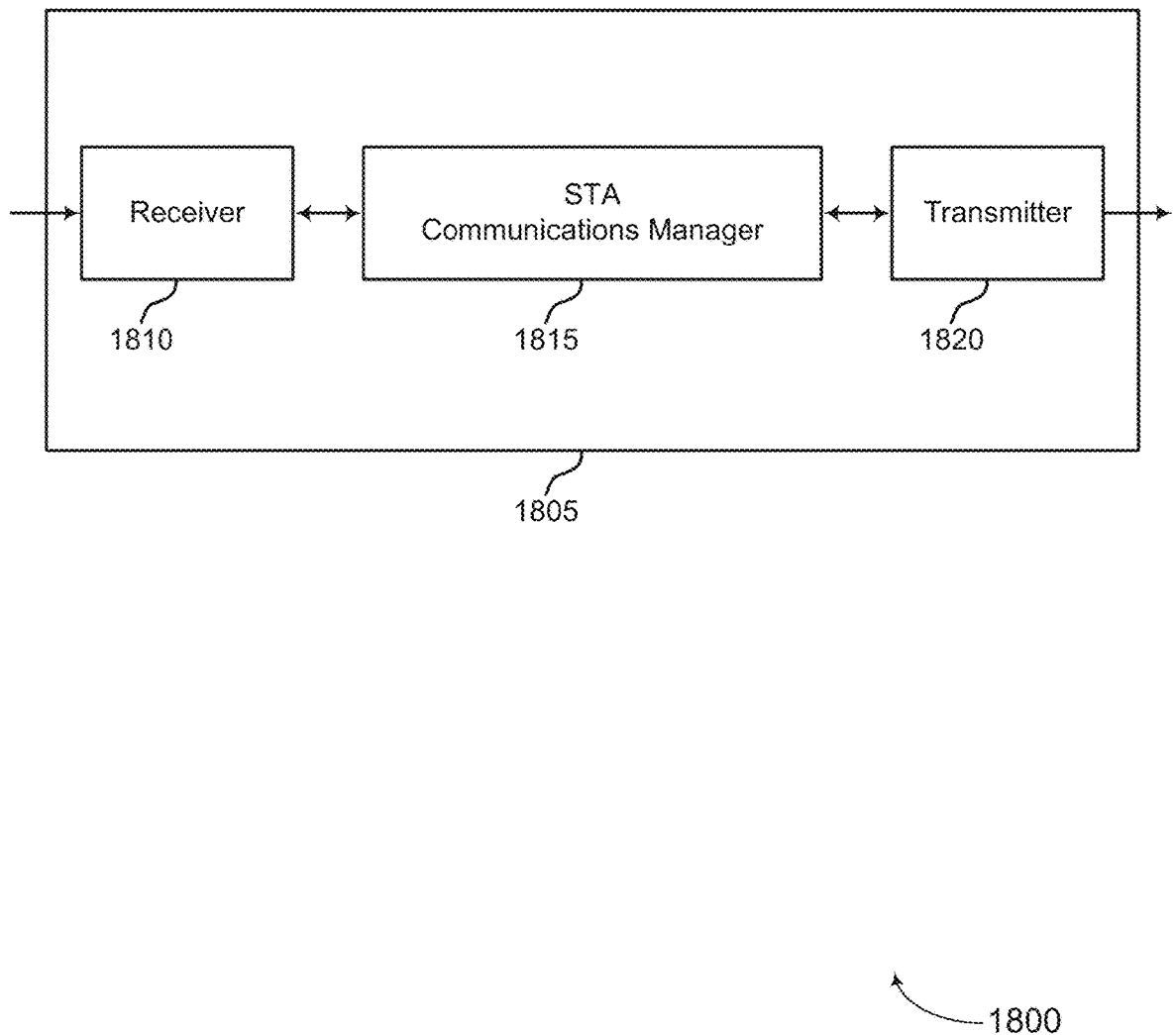
FIGS. 18 and 19 show block diagrams of devices that support data parsing to support RU aggregation in accordance with aspects of the present disclosure.

FIG. 18 shows a block diagram of a device 1805 that supports data parsing to support RU aggregation in accordance with aspects of the present disclosure. The device 1805 may be an example of aspects of a STA 104 as described herein. The device 1805 may include a receiver 1810, a STA communications manager 1815, and a transmitter 1820. The device 1805 can be implemented, at least in part, by one or both of a modem and a processor. Each of these components may be in communication with one another, for example, via one or more buses.

Receiver 1810 may receive information such as packets, user data, or control information associated with various information channels, such as control channels, data channels, and information related to data parsing to support RU aggregation. Information may be passed on to other components of the device. The receiver 1810 may be an example of aspects of the transceiver 2120 described with reference to FIG. 21. The receiver 1810 may utilize a single antenna or a set of antennas.

The STA communications manager 1815 may determine an allocation of a set of RUs, receive a set of encoded information bits on the set of RUs from an AP, the set of encoded information bits being encoded based on encoding all the information bits associated with the set of data units together or by encoding the information bits of each data unit separately from the encoding of the information bits of the other data units of the set of data units, and decode the set of encoded information bits associated with the set of RUs based on the receiving. The STA communications manager 1815 may also encode a set of information bits associated with a set of data units by jointly encoding all the information bits associated with the set of data units together or by encoding the information bits of each data unit separately from the encoding of the information bits of the other data units of the set of data units, distribute the set of encoded information bits to a set of RUs, the set of RUs associated with two or more available bandwidth segments of a bandwidth allocation, and transmit the distributed set of encoded information bits on the set of RUs. The STA communications manager 1815 may be an example of aspects of the STA communications manager 2110 described herein.

Transmitter 1820 may transmit signals generated by other components of the device. In some examples, the transmitter 1820 may be collocated with a receiver 1810 in a transceiver component. For example, the transmitter 1820 may be an example of aspects of the transceiver 2120 described with reference to FIG. 21. The transmitter 1820 may utilize a single antenna or a set of antennas.

Figure 19:
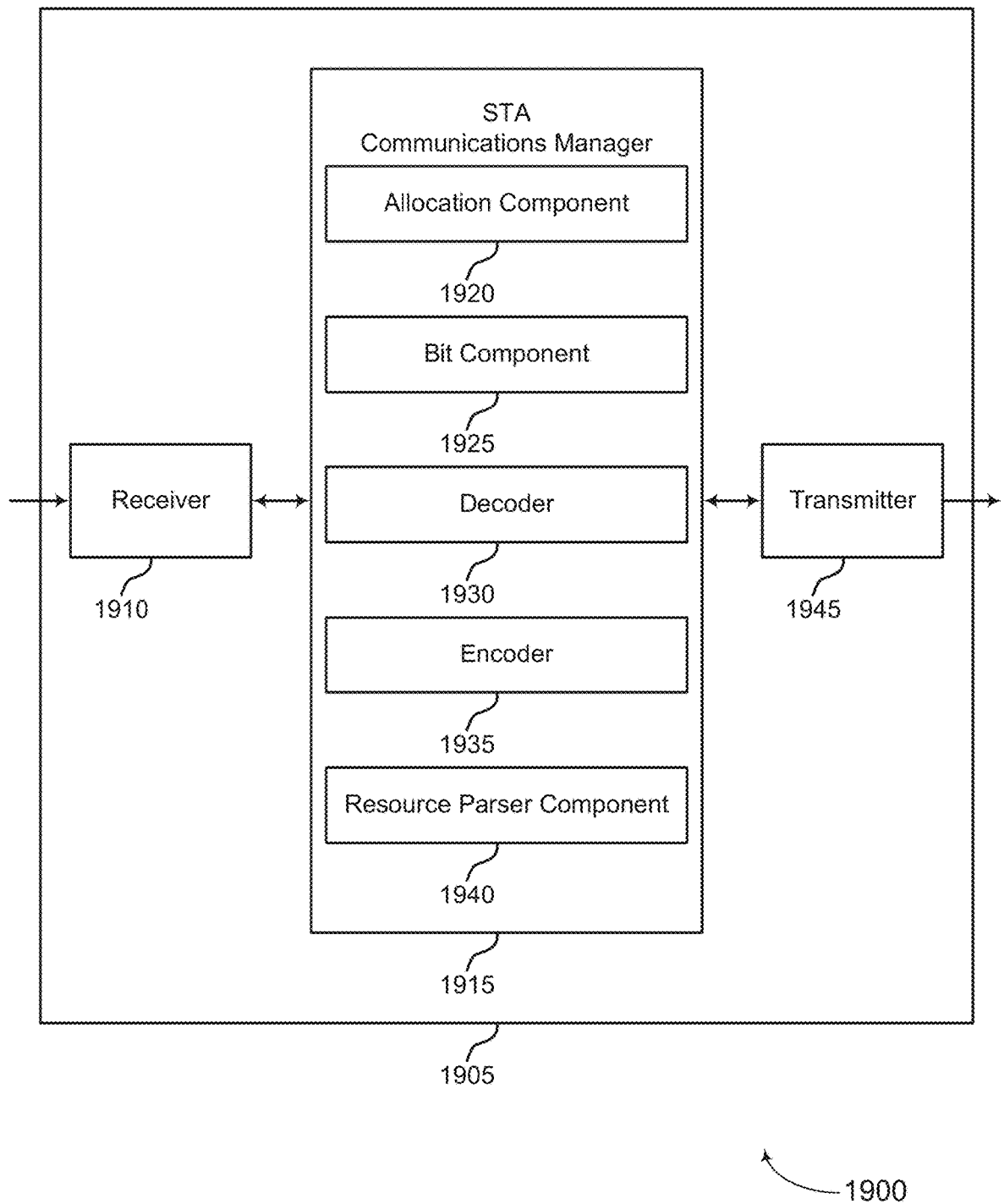

FIG. 19 shows a block diagram of a device 1905 that supports data parsing to support RU aggregation in accordance with aspects of the present disclosure. The device 1905 may be an example of aspects of a device 1805 or a STA 104 as described herein. The device 1905 may include a receiver 1910, a STA communications manager 1915, and a transmitter 1945. The device 1905 can be implemented, at least in part, by one or both of a modem and a processor. Each of these components may be in communication with one another, for example, via one or more buses.

Receiver 1910 may receive information such as packets, user data, or control information associated with various information channels, such as control channels, data channels, and information related to data parsing to support RU aggregation. Information may be passed on to other components of the device. The receiver 1910 may be an example of aspects of the transceiver 2120 described with reference to FIG. 21. The receiver 1910 may utilize a single antenna or a set of antennas.

The STA communications manager 1915 may be an example of aspects of the STA communications manager 1815 as described herein. The STA communications manager 1915 may include an allocation component 1920, a bit component 1925, a decoder 1930, an encoder 1935, and a resource/segment parser component 1940. The STA communications manager 1915 may be an example of aspects of the STA communications manager 2110 described herein.

The allocation component 1920 may determine an allocation of a set of RUs. The bit component 1925 may receive a set of encoded information bits on the set of RUs from an AP, the set of encoded information bits being encoded based on encoding all the information bits associated with the set of data units together or by encoding the information bits of each data unit separately from the encoding of the information bits of the other data units of the set of data units. The decoder 1930 may decode the set of encoded information bits associated with the set of RUs based on the receiving. The encoder 1935 may encode a set of information bits associated with a set of data units by jointly encoding all the information bits associated with the set of data units together or by encoding the information bits of each data unit separately from the encoding of the information bits of the other data units of the set of data units. The resource/segment parser component 1940 may distribute the set of encoded information bits to a set of RUs, the set of RUs associated with two or more available bandwidth segments of a bandwidth allocation and transmit the distributed set of encoded information bits on the set of RUs.

Transmitter 1945 may transmit signals generated by other components of the device. In some examples, the transmitter 1945 may be collocated with a receiver 1910 in a transceiver component. For example, the transmitter 1945 may be an example of aspects of the transceiver 2120 described with reference to FIG. 21. The transmitter 1945 may utilize a single antenna or a set of antennas.

Figure 20:
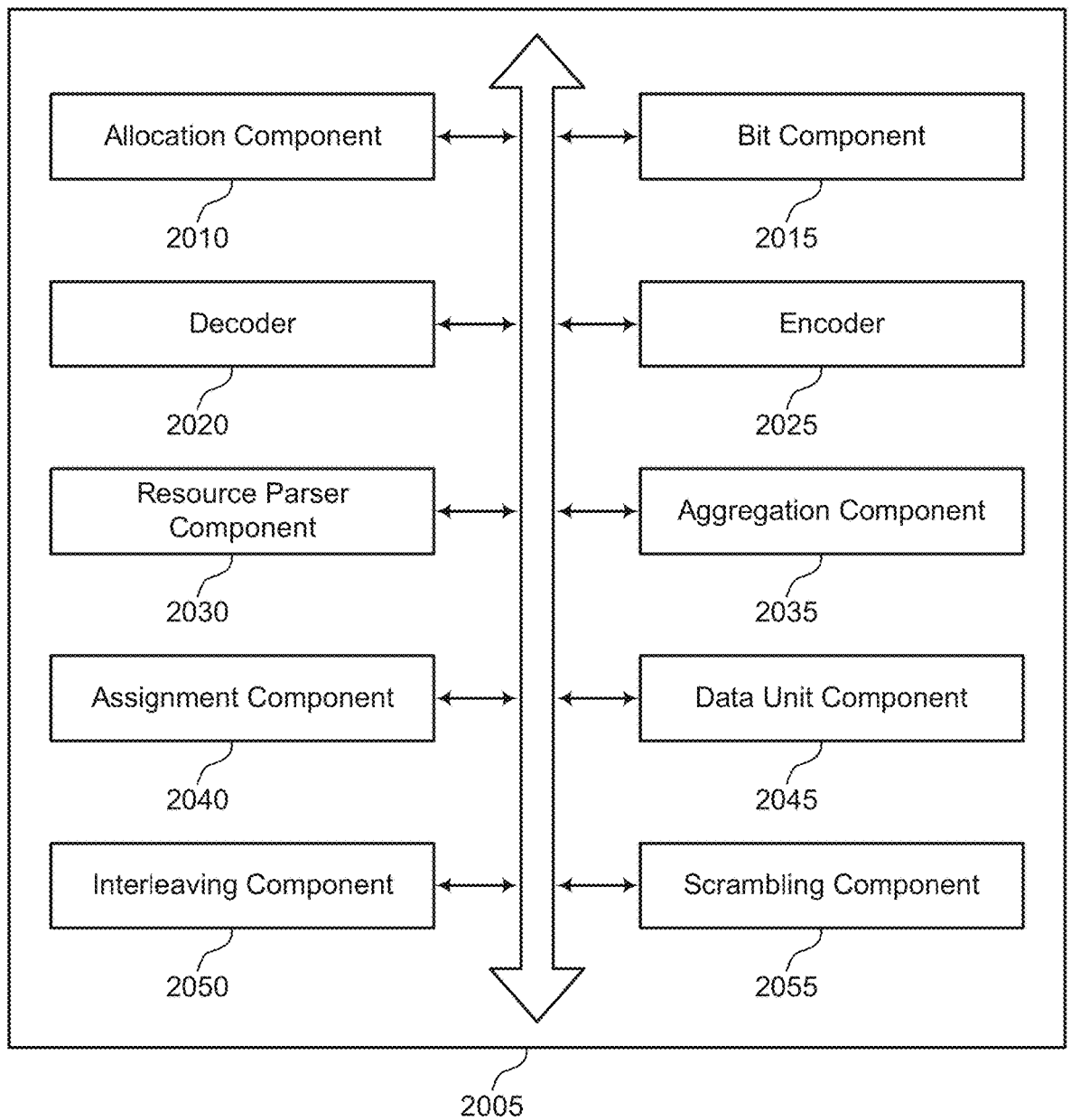
FIG. 20 shows a block diagram of a STA communications manager that supports data parsing to support RU aggregation in accordance with aspects of the present disclosure.

FIG. 20 shows a block diagram of a STA communications manager 2005 that supports data parsing to support RU aggregation in accordance with aspects of the present disclosure. The STA communications manager 2005 may be an example of aspects of a STA communications manager 1815, a STA communications manager 1915, or a STA communications manager 2110 described herein. The STA communications manager 2005 may include an allocation component 2010, a bit component 2015, a decoder 2020, an encoder 2025, a resource parser/segment component 2030, an aggregation component 2035, an assignment component 2040, a data unit component 2045, an interleaving component 2050, and a scrambling component 2055. Each of these components may communicate, directly or indirectly, with one another, for example, via one or more buses.

The allocation component 2010 may determine an allocation of a set of RUs. In some examples, at least one RU of the set of RUs has at least one of a different RU length relative to the other RUs of the set of RUs, a different modulation order relative to the other RUs of the set of RUs, a different modulation coding scheme relative to the other RUs of the set of RUs, a different beam forming configuration, or a different spatial stream relative to the other RUs of the set of RUs.

The bit component 2015 may receive a set of encoded information bits on the set of RUs from an AP, the set of encoded information bits being encoded based on encoding all the information bits associated with the set of data units together or by encoding the information bits of each data unit separately from the encoding of the information bits of the other data units of the set of data units. The decoder 2020 may decode the set of encoded information bits associated with the set of RUs based on the receiving. In some examples, the decoder 2020 may decode all the information bits associated with the set of data units together or by decoding the information bits of each data unit separately from the decoding of the information bits of the other data units of the set of data units. In some examples, the set of data units includes at least one data unit carrying the set of information bits, the at least one data unit including a PSDU.

The encoder 2025 may encode a set of information bits associated with a set of data units by jointly encoding all the information bits associated with the set of data units together or by encoding the information bits of each data unit separately from the encoding of the information bits of the other data units of the set of data units. In some examples, the encoder 2025 may receive the set of data units at a PHY layer of the STA. In some examples, encoding the information bits of each data unit separately includes encoding the assigned information bits of the set of information bits associated with each data unit of the set of data units separately from the encoding of the information bits associated with the other data units of the set of data units based at least in part on the receiving. In some examples, the PHY layer includes a set of encoders for encoding the assigned information bits associated with each data unit of the set of data units separately. The encoder 2025 may encode the set of information bits associated with the set of data units based on an interleaving scheme. In some examples, the interleaving scheme includes an LDPC tone interleaving scheme or a BCC interleaving scheme. In some examples, the encoder 2025 may apply an equivalent code rate to the set of information bits associated with all data units of the set of data units.

The resource parser/segment component 2030 may distribute the set of encoded information bits to a set of RUs, the set of RUs associated with two or more available bandwidth segments of a bandwidth allocation. In some examples, the resource parser/segment component 2030 may transmit the distributed set of encoded information bits on the set of RUs. In some examples, the resource parser/segment component 2030 may distribute the set of encoded information bits to the set of RUs based on the aggregating. In some examples, the resource parser/segment component 2030 may distribute one or more RUs of the set of RUs based on the two or more available bandwidth segments of the bandwidth allocation. In some examples, distributing the set of encoded information bits to the set of RUs is based on the distributing.

In some examples, the resource parser/segment component 2030 may distribute the set of encoded information bits to the set of RUs in a cyclical process. In some examples, the resource parser/segment component 2030 may determine one or more of one or more modulation coding schemes or a ratio corresponding to the one or more modulation coding schemes. In some examples, distributing the set of encoded information bits to the set of RUs in the cyclical process is based on one or more of the one or more modulation coding schemes or the ratio corresponding to the one or more modulation coding schemes. In some examples, the resource parser/segment component 2030 may determine a ratio corresponding to one or more modulation coding schemes and a ratio corresponding to two or more RUs of the set of RUs. In some examples, distributing the set of encoded information bits to the set of RUs in the cyclical process is based on the ratio corresponding to one or more modulation coding schemes and the ratio corresponding to two or more RUs of the set of RUs.

In some examples, the resource parser/segment component 2030 may forward two or more data units of the set of data units using a multi-link aggregation scheme. In some examples, the two or more data units of the set of data units includes PLCP protocol data units. In some examples, the resource parser/segment component 2030 may forward, from a MAC layer of the access point, two or more data units of the set of data units to a PHY layer of the access point. In some examples, the two or more data units of the set of data units includes PSDUs, and each PSDU corresponds to a separate bandwidth segment.

The resource parser/segment component 2030 may distributing the set of encoded information bits to the first RU of the set of RUs and the second RU of the set of RUs in a cyclical process based on the two or more available bandwidth segments of the bandwidth allocation associated with the first RU of the set of RUs and the second RU of the set of RUs. In some examples, the resource parser/segment component 2030 may distribute the set of encoded information bits to the first RU of the set of RUs and the second RU of the set of RUs sequentially.

In some examples, the resource parser/segment component 2030 may distribute the set of encoded information bits to the set of RUs sequentially. In some examples, the resource parser/segment component 2030 may determine a RU of the set of RUs that has a first frequency based on comparing relative frequencies of multiple RUs of the set of RUs. In some examples, the resource parser/segment component 2030 may assign coded bits of the set of encoded information bits to the RU having the first frequency based on the determining. In some examples, the resource parser/segment component 2030 may assign remaining coded bits of the set of encoded information bits to one or more additional RUs of the set of RUs. In some examples, each of the one or more additional RUs has a higher frequency than the first frequency. In some examples, the resource parser/segment component 2030 may fill all bits of an OFDM symbol associated with the RU having the first frequency with the coded bits of the set of encoded information bits before filling any bits of a second OFDM symbol. In some examples, the first frequency may be a lowest frequency in the set of RUs.

In some examples, the resource parser/segment component 2030 may distribute the assigned coded bits of the set of encoded information bits to the set of RUs based on the assigning of the coded bits of the set of encoded information bits to the set of RUs. In some examples, the resource parser/segment component 2030 may distribute the set of assigned coded bits to the set of RUs based on the assigning of the coded bits of the set of encoded information bits to the set of RUs.

In some examples, the resource parser/segment component 2030 may distribute coded bits to the set of RUs sequentially by assigning one or more coded bits of the set of assigned coded bits to two or more RUs of the set of RUs before assigning one or more other coded bits to one or more other RUs of the set of RUs. In some examples, the resource parser/segment component 2030 may distribute coded bits to the set of RUs sequentially by assigning one or more coded bits of the set of assigned coded bits to each RU of the set of RUs before assigning one or more other coded bits to one or more other RUs of the set of RUs. In some examples, the resource parser/segment component 2030 may distribute coded bits to the set of RUs sequentially by assigning coded bits of the set of assigned coded bits to a first RU of the set of RUs and assigning remaining coded bits of the set of assigned coded bits to one or more other RUs of the set of RUs different than the first RU after all the bits of an OFDM symbol of the first RU are filled.

In some examples, the resource parser/segment component 2030 may distribute the set of encoded information bits to the set of RUs based on the performing. In some examples, the resource parser/segment component 2030 may determine a quantity of OFDM symbols associated with a data field of a packet based on one or more of a space-time block coding parameter value, a length parameter value, a coding scheme parameter value, a payload bit parameter value, or an LDPC encoding parameter value. In some examples, the packet carries the set of information bits. In some examples, the resource parser/segment component 2030 may assign an additional OFDM symbol for each RU of the set of RUs based on the LDPC encoding parameter value. In some examples, the resource parser/segment component 2030 may determine a set of distributed information bits for each RU of the set of RUs based on one or more of a symbol duration parameter value, a data rate parameter value, a spatial stream parameter value, or a padding bit parameter value. In some examples, the resource parser/segment component 2030 may distribute the set of encoded information bits to the set of RUs is further based on an SU transmission mode.

In some examples, the PHY layer processes each RU of the set of RUs independently. In some examples, the bandwidth allocation includes a noncontiguous bandwidth allocation. In some examples, the bandwidth allocation includes a contiguous subband having a length equal to a sum of multiple RUs of the set of RUs having preconfigured lengths.

In some examples, the resource parser/segment component 2030 may determine, at the PHY layer of the access point, that a RU size of a RU of the set of RUs satisfies a threshold. In some examples, the threshold includes an available bandwidth segment of the two or more available bandwidth segments of the bandwidth allocation, assign, at the PHY layer of the access point, the RU of the set of RUs to the available bandwidth segment, and distribute, at the PHY layer of the access point, the set of encoded information bits to the RU of the set of RUs based at least in part on assigning the RU of the set of RUs to the available bandwidth segment. In some other examples, the resource parser/segment component 2030 may determine, at the PHY layer of the access point, that each RU size of the set of RUs satisfies a threshold. In some examples, the threshold includes an available bandwidth segment of the two or more available bandwidth segments of the bandwidth allocation, and assign, at the PHY layer of the access point, RUs of the set of RUs to the available bandwidth segment of the two or more available bandwidth segments of the bandwidth allocation. In some examples, distributing the set of encoded information bits to the set of RUs may include distributing the set of encoded information bits to the RUs of the set of RUs based at least in part on assigning the RUs of the set of RUs to the available bandwidth segment.

The resource parser/segment component 2030 may perform a RU interleaving of the set of encoded information bits within each RU of the set of RUs. In some examples, the PHY layer may include a RU parser and a bandwidth segment parser, the RU parser may distribute the set of encoded information bits to the set of RUs, and the bandwidth segment parser may assign coded bits of each RU of the set of RUs to each available bandwidth segment within each RU of the set of RUs. In some examples, the available bandwidth segment includes an 80 MHz segment. In some examples, the bandwidth segment parser may assign coded bits of each RU of the set of RUs to each available bandwidth segment within each RU of the set of RUs prior to the RU parser distributing the coded bits of each RU of the set of RUs within each available bandwidth segment. The resource parser/segment component 2030 may determine an unavailable bandwidth segment of the two or more available bandwidth segments of the bandwidth allocation and puncture the unavailable bandwidth segment of the bandwidth allocation. In some examples, puncturing the unavailable bandwidth segment includes puncturing one or more frequency tones in the unavailable bandwidth segment. The resource parser/segment component 2030 may perform an interleaving of the set of encoded information bits within a transmission bandwidth based at least in part on the puncturing. In some examples, the interleaving includes distributing the set of encoded information bits to the available bandwidth segment and skipping the punctured one or more frequency tones in the unavailable bandwidth segment.

The aggregation component 2035 may aggregate two or more RUs of the set of RUs based on the two or more available bandwidth segments of the bandwidth allocation. In some examples, the two or more RUs are noncontiguous RUs of the set of RUs. In some examples, the aggregation component 2035 may aggregate two or more RUs of the set of RUs based on the two or more available bandwidth segments of the bandwidth allocation. In some examples, the two or more available bandwidth segments of the bandwidth allocation are contiguous and include one or more of the RUs. In some examples, aggregation component 2035 may determine an aggregate RU that includes the set of RUs. In some examples, the aggregation component 2035 may determine an aggregate RU size associated with the set of RUs based on RU sizes of individual RUs of the set of RUs.

The aggregation component 2035 may determine that the aggregate RU size associated with the set of RUs includes a default aggregate RU size, determine that an existing mapping distance parameter is valid or invalid based at least in part on the aggregate RU size including the default aggregate RU size, and preserve pilot tone locations in each RU of the aggregate RU associated with the set of RUs. In some examples, the interleaving scheme includes an LDPC tone interleaving scheme using the preserved pilot tone locations in each RU of the aggregate RU. The aggregation component 2035 may determine that the aggregate RU size associated with the set of RUs includes a default aggregate RU size, determine that an existing mapping distance parameter is valid based at least in part on the aggregate RU size including the default aggregate RU size, preserve the existing mapping distance parameter for the aggregate RU size, and identify pilot tone locations in the aggregate RU. In some examples, the interleaving scheme includes an LDPC tone interleaving scheme using the identified pilot tone locations in the aggregate RU. The aggregation component 2035 may determine that the aggregate RU size associated with the set of RUs includes an aggregate RU size different than a default aggregate RU size, determine a mapping distance parameter based at least in part on the aggregate RU size, and determine one or more pilot tone locations in the aggregate RU. In some examples, the interleaving scheme includes an LDPC tone interleaving scheme using one or more of the mapping distance parameter and pilot tone locations in the aggregate RU. In some examples, determining the one or more pilot tone locations in the aggregate RU includes using one or more neighboring leftover tones or 26 tones RU associated with an unavailable bandwidth segment.

The assignment component 2040 may assign, at a MAC layer of the STA, information bits of the set of information bits to the set of RUs. In some examples, the assignment component 2040 may assign, at the PHY layer of the STA, information bits of the set of information bits to the set of RUs. In some examples, the assignment component 2040 may assign information bits of the set of information bits to the set of RUs occurs before encoding the set of information bits associated with the set of data units separately. The data unit component 2045 may generate, at the MAC layer based on the assigning, the set of data units, each of the data units of the set of data units including a PSDU.

The assignment component 2040 may determine, at the PHY layer of the access point, that a first RU size of a first RU of the set of RUs and a second RU size of a second RU of the set of RUs satisfies a threshold. In some examples, the threshold includes an available bandwidth segment of the two or more available bandwidth segments of the bandwidth allocation. In some examples, the PHY layer includes a set of encoders for separately encoding the assigned information bits of the set of information bits associated with the set of data units, assign, at the PHY layer of the access point, the first RU and the second RU to the two or more available bandwidth segments of the bandwidth allocation, the first RU having the first RU size and the second RU having the second RU size, and determine a ratio corresponding to one or more modulation coding schemes associated with the first RU and the second RU. In some examples, distributing the set of encoded information bits to the set of RUs includes distributing the set of encoded information bits to the first RU of the set of RUs and the second RU of the set of RUs based on the first RU size of the first RU of the set of RUs, the second RU size of the second RU of the set of RUs and the ratio corresponding to one or more modulation coding schemes associated with the first RU and the second RU.

The assignment component 2040 may assign coded bits of the set of encoded information bits to the first RU of the set of RUs, the first RU corresponding to a first bandwidth segment of the bandwidth allocation. In some examples, the first bandwidth segment includes a 160 MHz segment, and assign remaining coded bits of the set of encoded information bits to the second RU of the set of RUs after assigning the coded bits of the set of encoded information bits to the first RU, the second RU corresponding to a second bandwidth segment of the bandwidth allocation. In some examples, the second bandwidth segment includes a 160 MHz segment. The assignment component 2040 may assign coded bits of each RU of the set of RUs to each available bandwidth segment within each RU of the set of RUs in a cyclical process.

In some examples, forwarding the set of data units to a PHY layer of the STA. In some examples, transmitting the distributed set of encoded information bits on the set of RUs includes transmitting the distributed set of encoded information bits on the set of RUs via the PHY layer. In some examples, the data unit component 2045 may forward, from a MAC layer to a PHY layer of the STA, the one or more PSDUs, the one or more PSDUs carrying the set of information bits. In some examples, the data unit component 2045 may receive, at the PHY layer, the one or more PSDUs (or RUs) jointly or independently.

The interleaving component 2050 may perform an LDPC tone interleaving of the set of encoded information bits within each RU of the set of RUs. In some examples, the interleaving component 2050 may apply the interleaving scheme to the aggregate RU.

The scrambling component 2055 may scramble the set of information bits associated with the set of data units by jointly scrambling all of the information bits of the set of information bits associated with the set of data units together or by scrambling the information bits of each data unit separately from the scrambling of the information bits of the other data units of the set of data units. In some examples, jointly scrambling the set of information bits associated with the set of data units includes using a same scrambling sequence for all of the information bits of the set of information bits. In some examples, scrambling the information bits of each data unit associated with the set of data units separately from the scrambling of the information bits of the other data units of the set of data units includes using an equivalent scrambling sequence for information bits of the set of information bits distributed to different RUs of the set of RUs. In some examples, scrambling the information bits of each data unit associated with the set of data units separately from the scrambling of the information bits of the other data units of the set of data units includes using a different scrambling seed for information bits of the set of information bits distributed to different RUs of the set of RUs.

Figure 21:
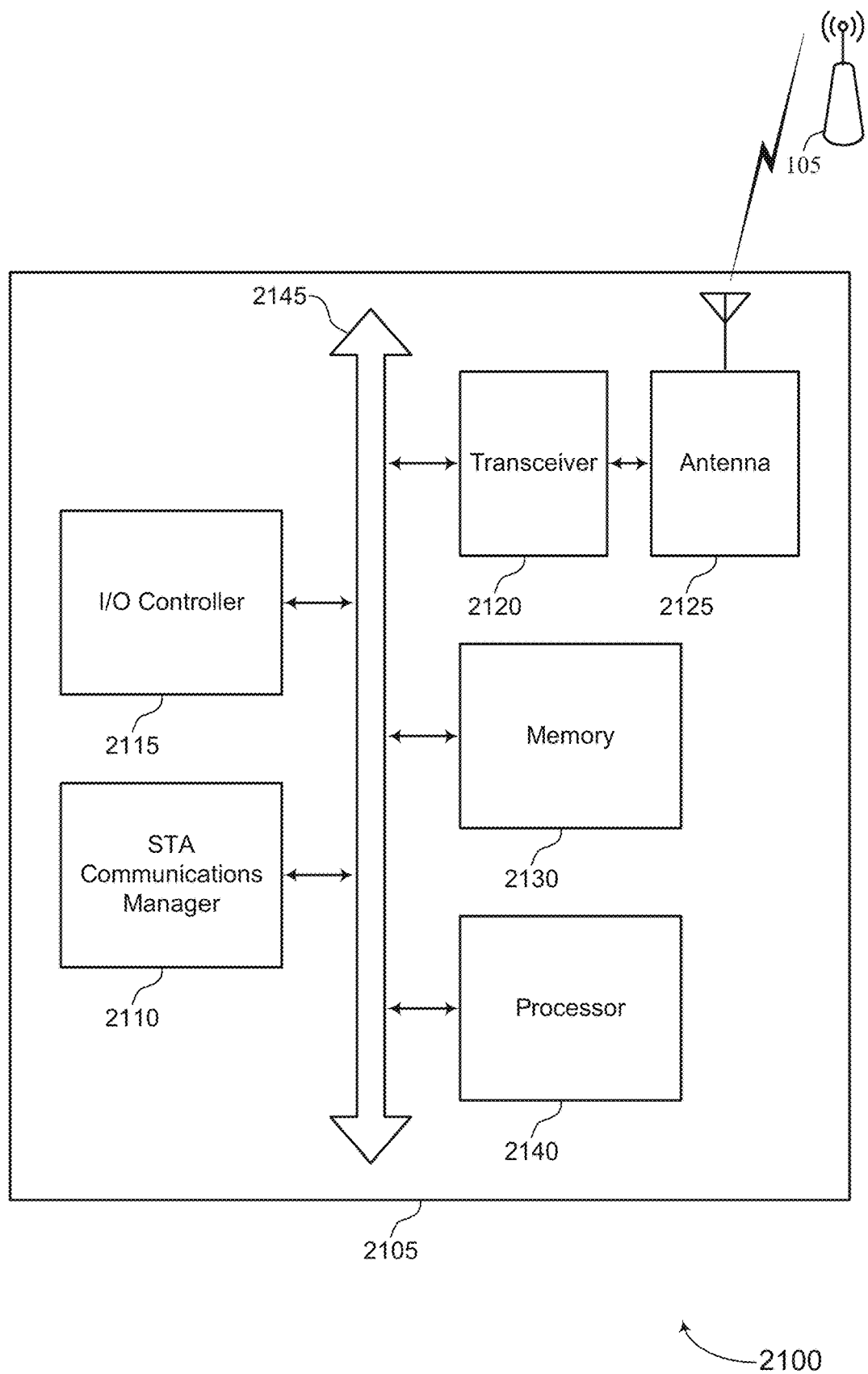
FIG. 21 shows a diagram of a system including a device that supports data parsing to support RU aggregation in accordance with aspects of the present disclosure.

FIG. 21 shows a diagram of a system 2100 including a device 2105 that supports data parsing to support RU aggregation in accordance with aspects of the present disclosure. The device 2105 may be an example of or include the components of device 1805, device 1905, or a STA as described herein. The device 2105 may include components for bi-directional voice and data communications including components for transmitting and receiving communications, including a STA communications manager 2110, an I/O controller 2115, a transceiver 2120, an antenna 2125, memory 2130, and a processor 2140. These components may be in electronic communication via one or more buses, such as bus 2145.

The STA communications manager 2110 may determine an allocation of a set of RUs, receive a set of encoded information bits on the set of RUs from an AP, the set of encoded information bits being encoded based on encoding all the information bits associated with the set of data units together or by encoding the information bits of each data unit separately from the encoding of the information bits of the other data units of the set of data units, and decode the set of encoded information bits associated with the set of RUs based on the receiving. The STA communications manager 2110 may also encode a set of information bits associated with a set of data units by jointly encoding all the information bits associated with the set of data units together or by encoding the information bits of each data unit separately from the encoding of the information bits of the other data units of the set of data units, distribute the set of encoded information bits to a set of RUs, the set of RUs associated with two or more available bandwidth segments of a bandwidth allocation, and transmit the distributed set of encoded information bits on the set of RUs.

I/O controller 2115 may manage input and output signals for device 2105. I/O controller 2115 may also manage peripherals not integrated into device 2105. In some examples, I/O controller 2115 may represent a physical connection or port to an external peripheral. In some examples, I/O controller 2115 may utilize an operating system such as iOS®, ANDROID®, MS-DOS®, MS-WINDOWS®, OS/2®, UNIX®, LINUX®, or another known operating system. In other examples, I/O controller 2115 may represent or interact with a modem, a keyboard, a mouse, a touchscreen, or a similar device. In some examples, I/O controller 2115 may be implemented as part of a processor. In some examples, a user may interact with device 2105 via I/O controller 2115 or via hardware components controlled by I/O controller 2115.

Transceiver 2120 may communicate bi-directionally, via one or more antennas, wired, or wireless links as described above. For example, the transceiver 2120 may represent a wireless transceiver and may communicate bi-directionally with another wireless transceiver. The transceiver 2120 may also include a modem to modulate the packets and provide the modulated packets to the antennas for transmission, and to demodulate packets received from the antennas. In some examples, the device 2105 may include a single antenna 2125. However, in some examples, the device 2105 may have more than one antenna 2125, which may be capable of concurrently transmitting or receiving multiple wireless transmissions.

Memory 2130 may include RAM and ROM. The memory 2130 may store computer-readable, computer-executable software 2135 including instructions that, if executed, cause the processor to perform various functions described herein. In some examples, the memory 2130 may contain, among other things, a BIOS which may control basic hardware or software operation such as the interaction with peripheral components or devices.

Processor 2140 may include an intelligent hardware device, such as a general-purpose processor, a DSP, a CPU, a microcontroller, an ASIC, an FPGA, a programmable logic device, a discrete gate or transistor logic component, a discrete hardware component, or any combination thereof. In some examples, processor 2140 may be configured to operate a memory array using a memory controller. In other examples, a memory controller may be integrated into processor 2140. Processor 2140 may be configured to execute computer-readable instructions stored in a memory to perform various functions, such as functions or tasks supporting data parsing to support RU aggregation.

Figure 22:
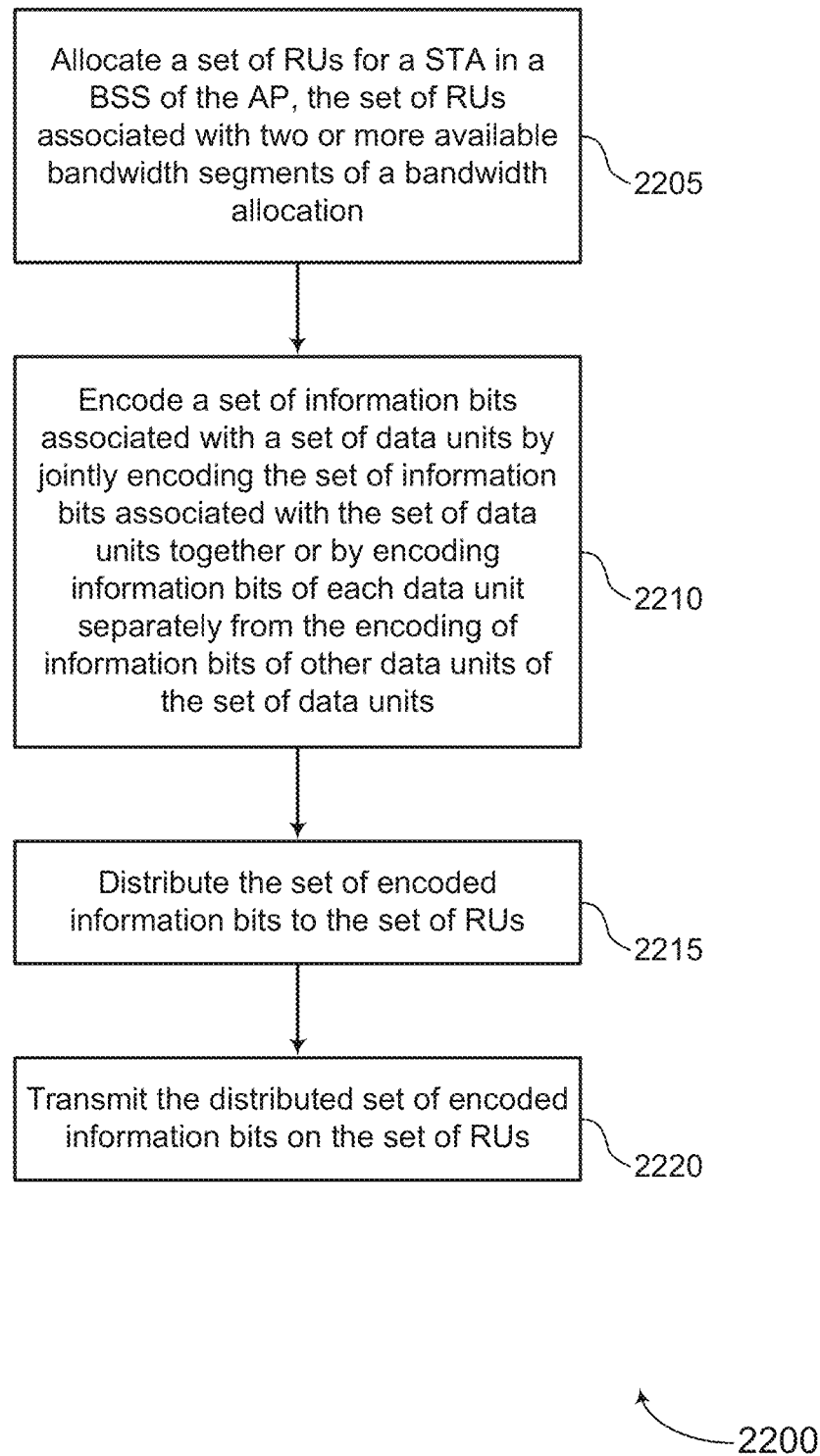
FIGS. 22-30 show flowcharts illustrating methods that support data parsing to support RU aggregation in accordance with aspects of the present disclosure.

FIG. 22 shows a flowchart illustrating a method 2200 that supports data parsing to support RU aggregation in accordance with aspects of the present disclosure. The operations of method 2200 may be implemented by an AP or its components as described herein. For example, the operations of method 2200 may be performed by an AP communications manager as described with reference to FIGS. 14-17. In other examples, the operations of method 2200 may be performed by a wireless communication device 1100 as described with reference to FIG. 11. In some examples, an AP may execute a set of instructions to control the functional elements of the AP to perform the functions described below. Additionally, or alternatively, an AP may perform aspects of the functions described below using special-purpose hardware.

At 2205, the AP may allocate a set of RUs for a STA in a BSS of the AP, the set of RUs associated with two or more available bandwidth segments of a bandwidth allocation. The operations of 2205 may be performed according to the methods described herein. In some examples, aspects of the operations of 2205 may be performed by an allocation component as described with reference to FIGS. 14-17.

At 2210, the AP may encode a set of information bits associated with a set of data units by jointly encoding all the information bits associated with the set of data units together or by encoding the information bits of each data unit separately from the encoding of the information bits of the other data units of the set of data units. The operations of 2210 may be performed according to the methods described herein. In some examples, aspects of the operations of 2210 may be performed by an encoder as described with reference to FIGS. 14-17.

At 2215, the AP may distribute the set of encoded information bits to the set of RUs. The operations of 2215 may be performed according to the methods described herein. In some examples, aspects of the operations of 2215 may be performed by a resource parser component as described with reference to FIGS. 14-17.

At 2220, the AP may transmit the distributed set of encoded information bits on the set of RUs. The operations of 2220 may be performed according to the methods described herein. In some examples, aspects of the operations of 2220 may be performed by a resource parser component as described with reference to FIGS. 14-17.

Figure 23:
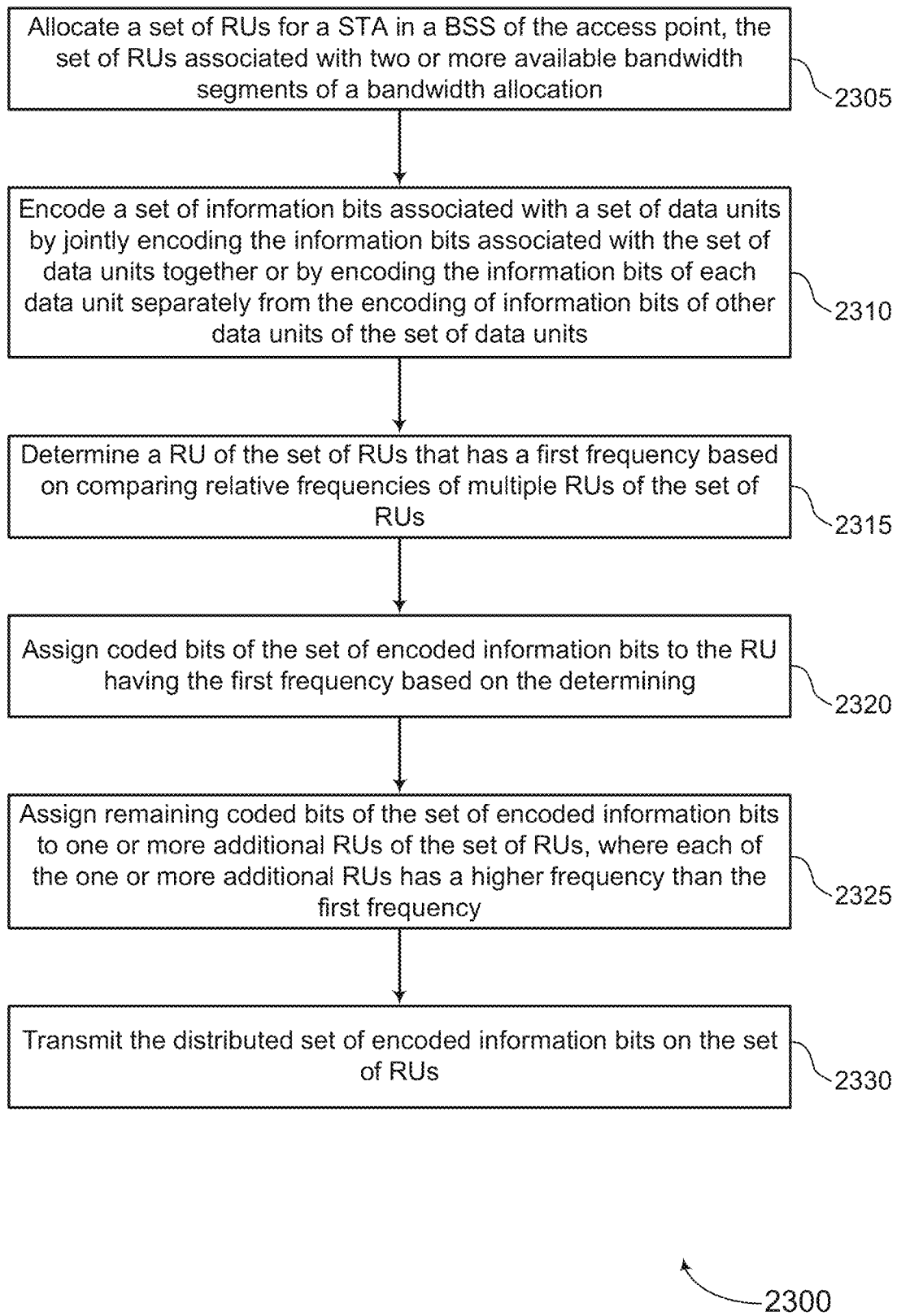

FIG. 23 shows a flowchart illustrating a method 2300 that supports data parsing to support RU aggregation in accordance with aspects of the present disclosure. The operations of method 2300 may be implemented by an AP or its components as described herein. For example, the operations of method 2300 may be performed by an AP communications manager as described with reference to FIGS. 14-17. In other examples, the operations of method 2300 may be performed by a wireless communication device 1100 as described with reference to FIG. 11. In some examples, an AP may execute a set of instructions to control the functional elements of the AP to perform the functions described below. Additionally, or alternatively, an AP may perform aspects of the functions described below using special-purpose hardware.

At 2305, the AP may allocate a set of RUs for a STA in a BSS of the AP, the set of RUs associated with two or more available bandwidth segments of a bandwidth allocation. The operations of 2305 may be performed according to the methods described herein. In some examples, aspects of the operations of 2305 may be performed by an allocation component as described with reference to FIGS. 14-17.

At 2310, the AP may encode a set of information bits associated with a set of data units by jointly encoding all the information bits associated with the set of data units together or by encoding the information bits of each data unit separately from the encoding of the information bits of the other data units of the set of data units. The operations of 2310 may be performed according to the methods described herein. In some examples, aspects of the operations of 2310 may be performed by an encoder as described with reference to FIGS. 14-17.

At 2315, the AP may determine a RU of the set of RUs that has a first frequency based on comparing relative frequencies of multiple RUs of the set of RUs. The operations of 2315 may be performed according to the methods described herein. In some examples, aspects of the operations of 2315 may be performed by a resource parser component as described with reference to FIGS. 14-17.

At 2320, the AP may assign coded bits of the set of encoded information bits to the RU having the first frequency based on the determining. The operations of 2320 may be performed according to the methods described herein. In some examples, aspects of the operations of 2320 may be performed by a resource parser component as described with reference to FIGS. 14-17.

At 2325, the AP may assign remaining coded bits of the set of encoded information bits to one or more additional RUs of the set of RUs. In some examples, each of the one or more additional RUs has a higher frequency than the first frequency. The operations of 2325 may be performed according to the methods described herein. In some examples, aspects of the operations of 2325 may be performed by a resource parser component as described with reference to FIGS. 14-17.

At 2330, the AP may transmit the distributed set of encoded information bits on the set of RUs. The operations of 2330 may be performed according to the methods described herein. In some examples, aspects of the operations of 2330 may be performed by a resource parser component as described with reference to FIGS. 14-17.

Figure 24:
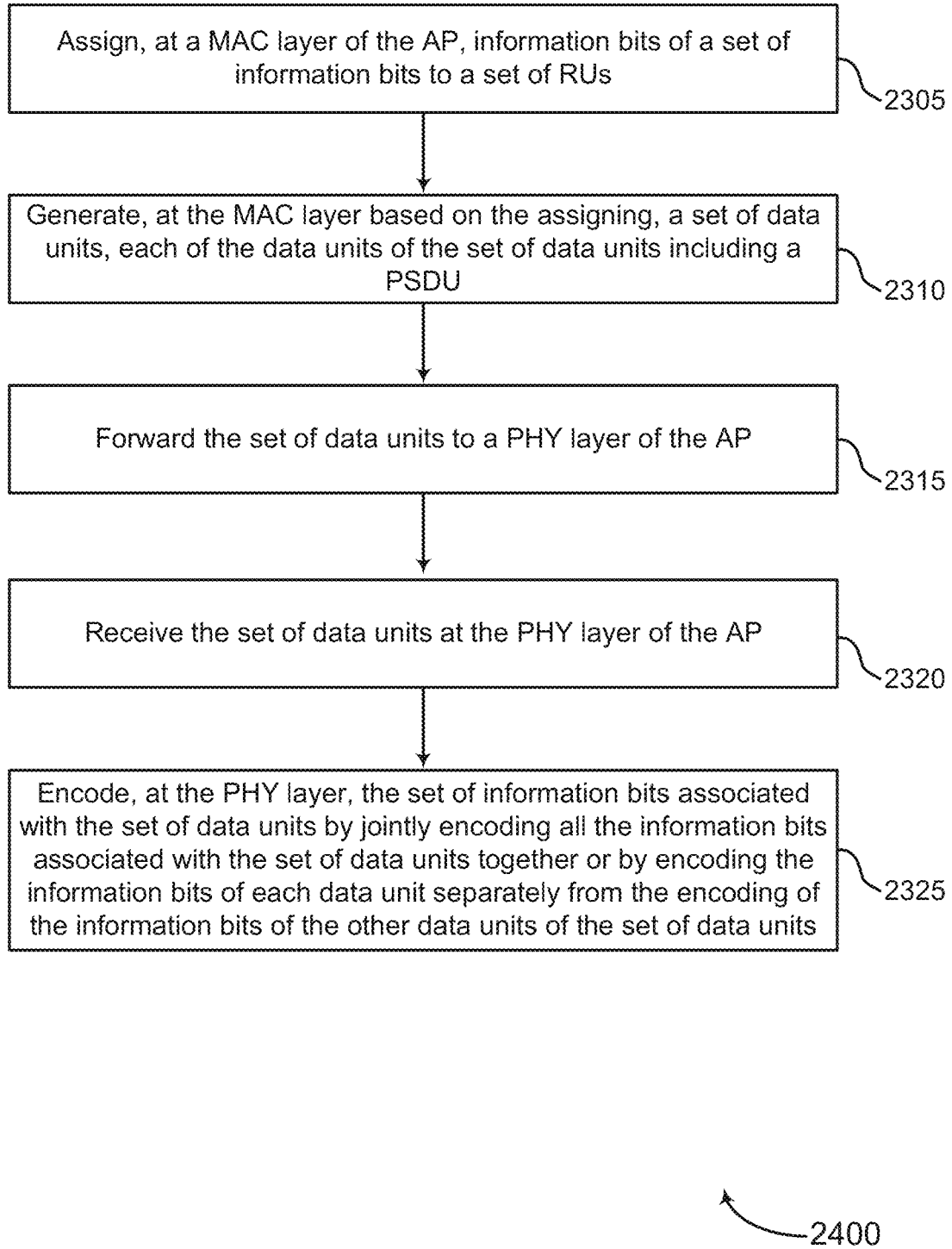

FIG. 24 shows a flowchart illustrating a method 2400 that supports data parsing to support RU aggregation in accordance with aspects of the present disclosure. The operations of method 2400 may be implemented by an AP or its components as described herein. For example, the operations of method 2400 may be performed by an AP communications manager as described with reference to FIGS. 14-17. In other examples, the operations of method 2400 may be performed by a wireless communication device 1100 as described with reference to FIG. 11. In some examples, an AP may execute a set of instructions to control the functional elements of the AP to perform the functions described below. Additionally, or alternatively, an AP may perform aspects of the functions described below using special-purpose hardware.

At 2405, the AP may assign, at a MAC layer of the AP, information bits of a set of information bits to a set of RUs. The operations of 2405 may be performed according to the methods described herein. In some examples, aspects of the operations of 2405 may be performed by an assignment component as described with reference to FIGS. 14-17.

At 2410, the AP may generate, at the MAC layer based on the assigning, a set of data units, each of the data units of the set of data units including a PSDU. The operations of 2410 may be performed according to the methods described herein. In some examples, aspects of the operations of 2410 may be performed by a data unit component as described with reference to FIGS. 14-17.

At 2415, the AP may forward the set of data units to a PHY layer of the AP. The operations of 2415 may be performed according to the methods described herein. In some examples, aspects of the operations of 2415 may be performed by a data unit component as described with reference to FIGS. 14-17.

At 2420, the AP may receive the set of data units at the PHY layer of the AP. The operations of 2420 may be performed according to the methods described herein. In some examples, aspects of the operations of 2420 may be performed by an encoder as described with reference to FIGS. 14-17.

At 2430, the AP may encode, at the PHY layer, the set of information bits associated with the set of data units by jointly encoding all the information bits associated with the set of data units together or by encoding the information bits of each data unit separately from the encoding of the information bits of the other data units of the set of data units. The operations of 2430 may be performed according to the methods described herein. In some examples, aspects of the operations of 2430 may be performed by an encoder as described with reference to FIGS. 14-17.

Figure 25:
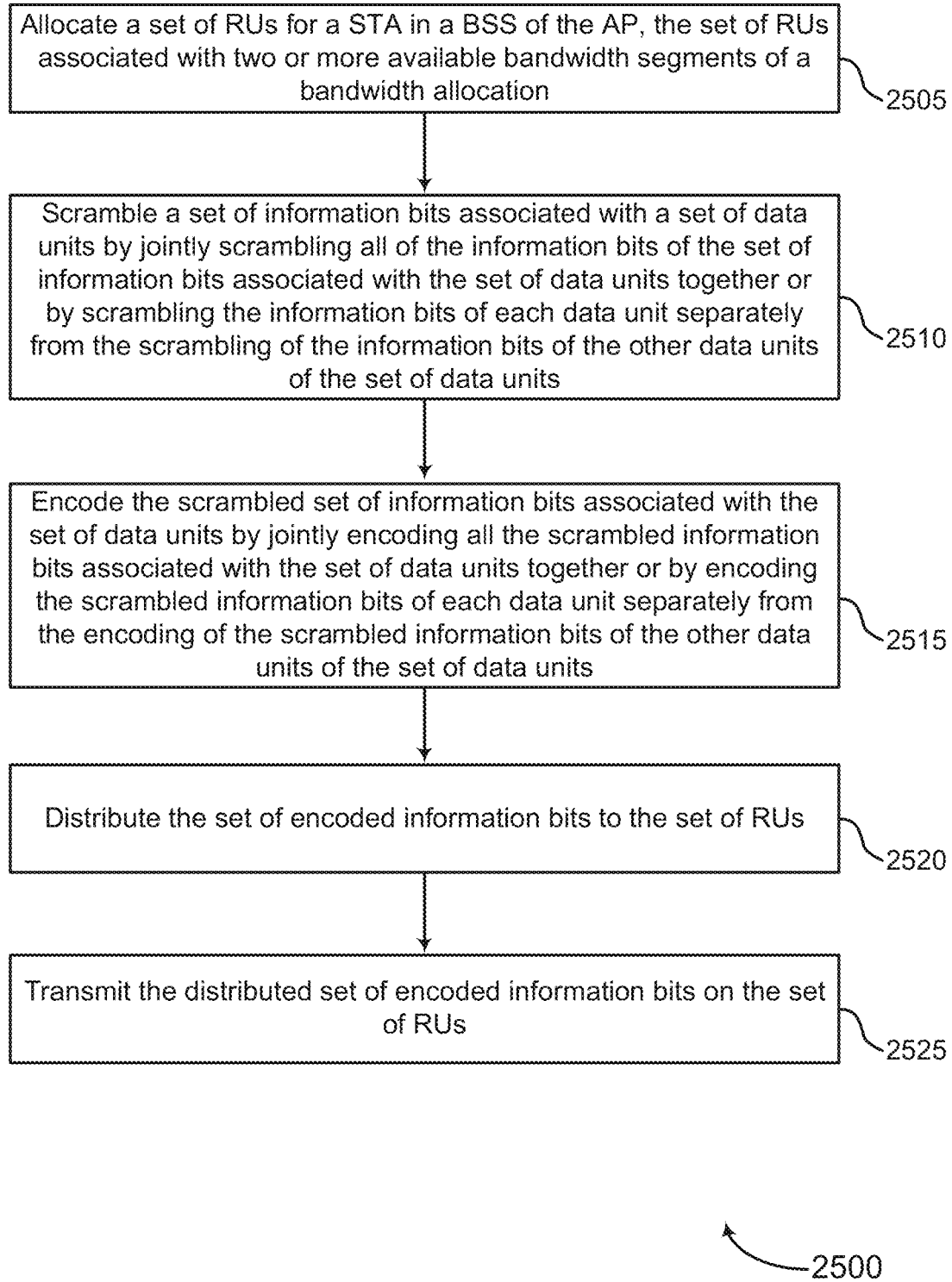

FIG. 25 shows a flowchart illustrating a method 2500 that supports data parsing to support RU aggregation in accordance with aspects of the present disclosure. The operations of method 2500 may be implemented by an AP or its components as described herein. For example, the operations of method 2500 may be performed by an AP communications manager as described with reference to FIGS. 14-17. In other examples, the operations of method 2500 may be performed by a wireless communication device 1100 as described with reference to FIG. 11. In some examples, an AP may execute a set of instructions to control the functional elements of the AP to perform the functions described below. Additionally, or alternatively, an AP may perform aspects of the functions described below using special-purpose hardware.

At 2505, the AP may allocate a set of RUs for a STA in a BSS of the AP, the set of RUs associated with two or more available bandwidth segments of a bandwidth allocation. The operations of 2505 may be performed according to the methods described herein. In some examples, aspects of the operations of 2505 may be performed by an allocation component as described with reference to FIGS. 14-17.

At 2510, the AP may scramble a set of information bits associated with a set of data units by jointly scrambling all of the information bits of the set of information bits associated with the set of data units together or by scrambling the information bits of each data unit separately from the scrambling of the information bits of the other data units of the set of data units. The operations of 2510 may be performed according to the methods described herein. In some examples, aspects of the operations of 2510 may be performed by a scrambling component as described with reference to FIGS. 14-17.

At 2515, the AP may encode the scrambled set of information bits associated with the set of data units by jointly encoding all the scrambled information bits associated with the set of data units together or by encoding the scrambled information bits of each data unit separately from the encoding of the scrambled information bits of the other data units of the set of data units. The operations of 2515 may be performed according to the methods described herein. In some examples, aspects of the operations of 2515 may be performed by an encoder as described with reference to FIGS. 14-17.

At 2520, the AP may distribute the set of encoded information bits to the set of RUs. The operations of 2520 may be performed according to the methods described herein. In some examples, aspects of the operations of 2520 may be performed by a resource parser component as described with reference to FIGS. 14-17.

At 2525, the AP may transmit the distributed set of encoded information bits on the set of RUs. The operations of 2525 may be performed according to the methods described herein. In some examples, aspects of the operations of 2525 may be performed by a resource parser component as described with reference to FIGS. 14-17.

Figure 26:
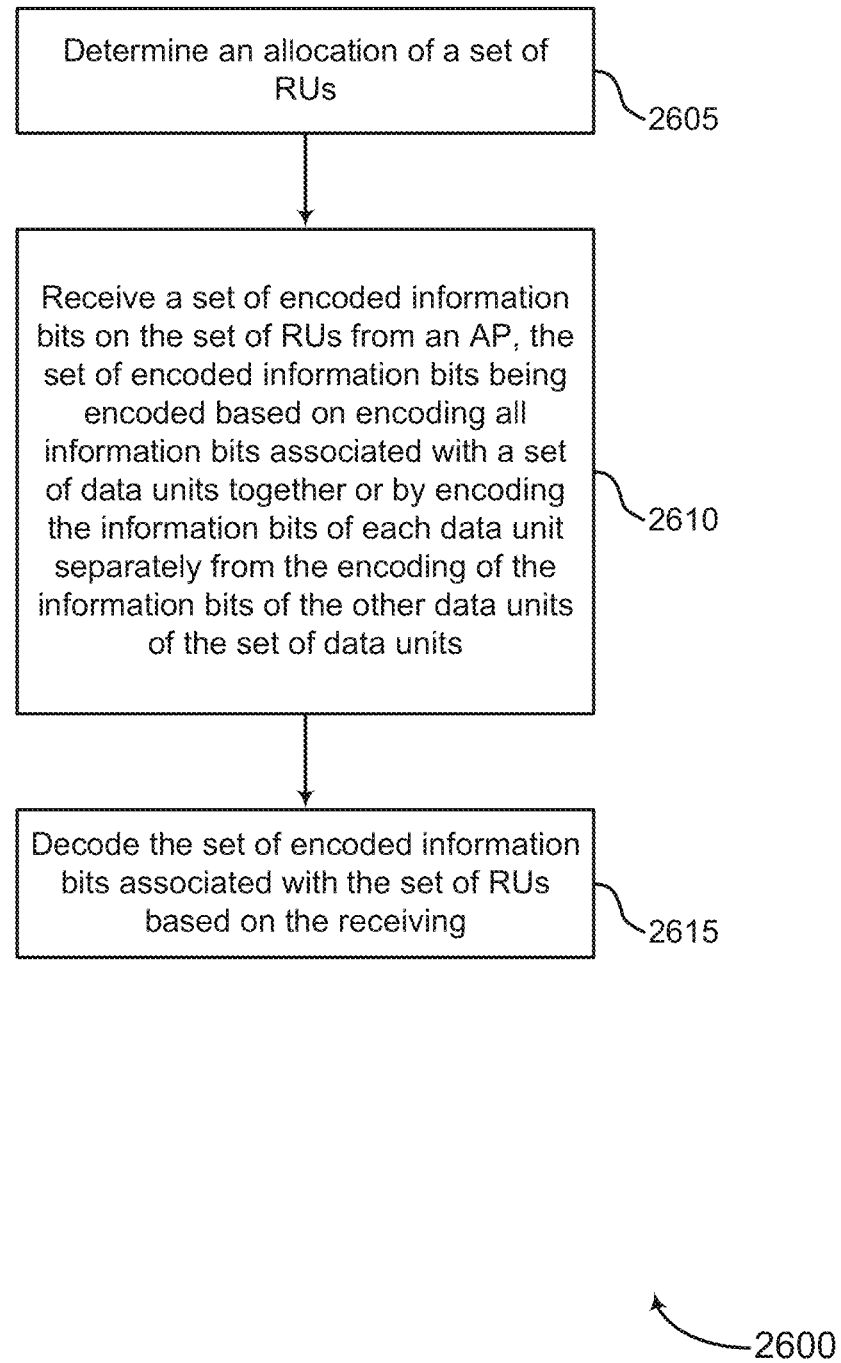

FIG. 26 shows a flowchart illustrating a method 2600 that supports data parsing to support RU aggregation in accordance with aspects of the present disclosure. The operations of method 2600 may be implemented by a STA or its components as described herein. For example, the operations of method 2600 may be performed by a STA communications manager as described with reference to FIGS. 18-21. In other examples, the operations of method 2600 may be performed by a wireless communication device 1100 as described with reference to FIG. 11. In some examples, a STA may execute a set of instructions to control the functional elements of the STA to perform the functions described below. Additionally, or alternatively, a STA may perform aspects of the functions described below using special-purpose hardware.

At 2605, the STA may determine an allocation of a set of RUs. The operations of 2605 may be performed according to the methods described herein. In some examples, aspects of the operations of 2605 may be performed by an allocation component as described with reference to FIGS. 18-21.

At 2610, the STA may receive a set of encoded information bits on the set of RUs from an AP, the set of encoded information bits being encoded based on encoding all the information bits associated with the set of data units together or by encoding the information bits of each data unit separately from the encoding of the information bits of the other data units of the set of data units. The operations of 2610 may be performed according to the methods described herein. In some examples, aspects of the operations of 2610 may be performed by a bit component as described with reference to FIGS. 18-21.

At 2615, the STA may decode the set of encoded information bits associated with the set of RUs based on the receiving. The operations of 2615 may be performed according to the methods described herein. In some examples, aspects of the operations of 2615 may be performed by a decoder as described with reference to FIGS. 18-21.

Figure 27:
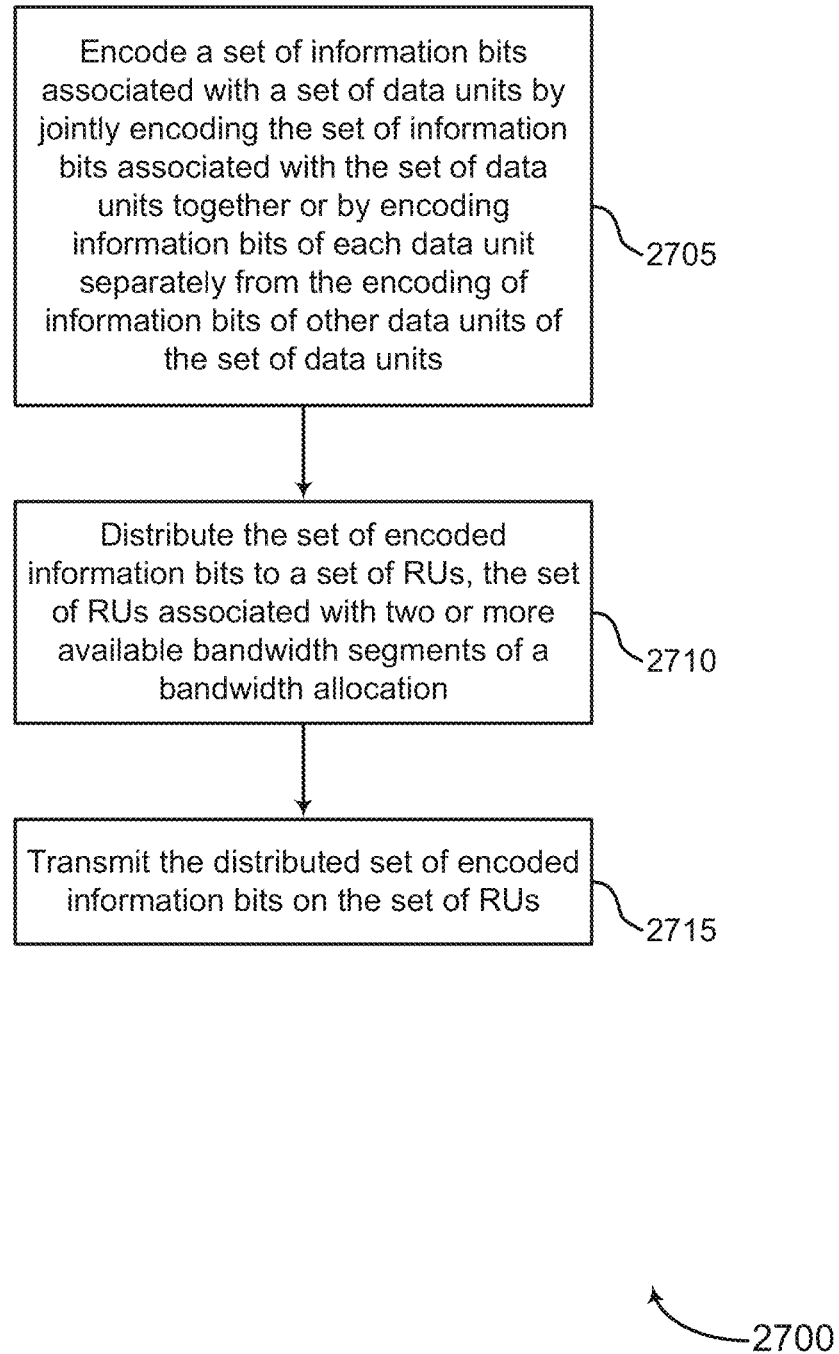

FIG. 27 shows a flowchart illustrating a method 2700 that supports data parsing to support RU aggregation in accordance with aspects of the present disclosure. The operations of method 2700 may be implemented by a STA or its components as described herein. For example, the operations of method 2700 may be performed by a STA communications manager as described with reference to FIGS. 18-21. In other examples, the operations of method 2700 may be performed by a wireless communication device 1100 as described with reference to FIG. 11. In some examples, a STA may execute a set of instructions to control the functional elements of the STA to perform the functions described below. Additionally, or alternatively, a STA may perform aspects of the functions described below using special-purpose hardware.

At 2705, the STA may encode a set of information bits associated with a set of data units by jointly encoding all the information bits associated with the set of data units together or by encoding the information bits of each data unit separately from the encoding of the information bits of the other data units of the set of data units. The operations of 2705 may be performed according to the methods described herein. In some examples, aspects of the operations of 2705 may be performed by an encoder as described with reference to FIGS. 18-21.

At 2710, the STA may distribute the set of encoded information bits to a set of RUs, the set of RUs associated with two or more available bandwidth segments of a bandwidth allocation. The operations of 2710 may be performed according to the methods described herein. In some examples, aspects of the operations of 2710 may be performed by a resource parser component as described with reference to FIGS. 18-21.

At 2715, the STA may transmit the distributed set of encoded information bits on the set of RUs. The operations of 2715 may be performed according to the methods described herein. In some examples, aspects of the operations of 2715 may be performed by a resource parser component as described with reference to FIGS. 18-21.

Figure 28:
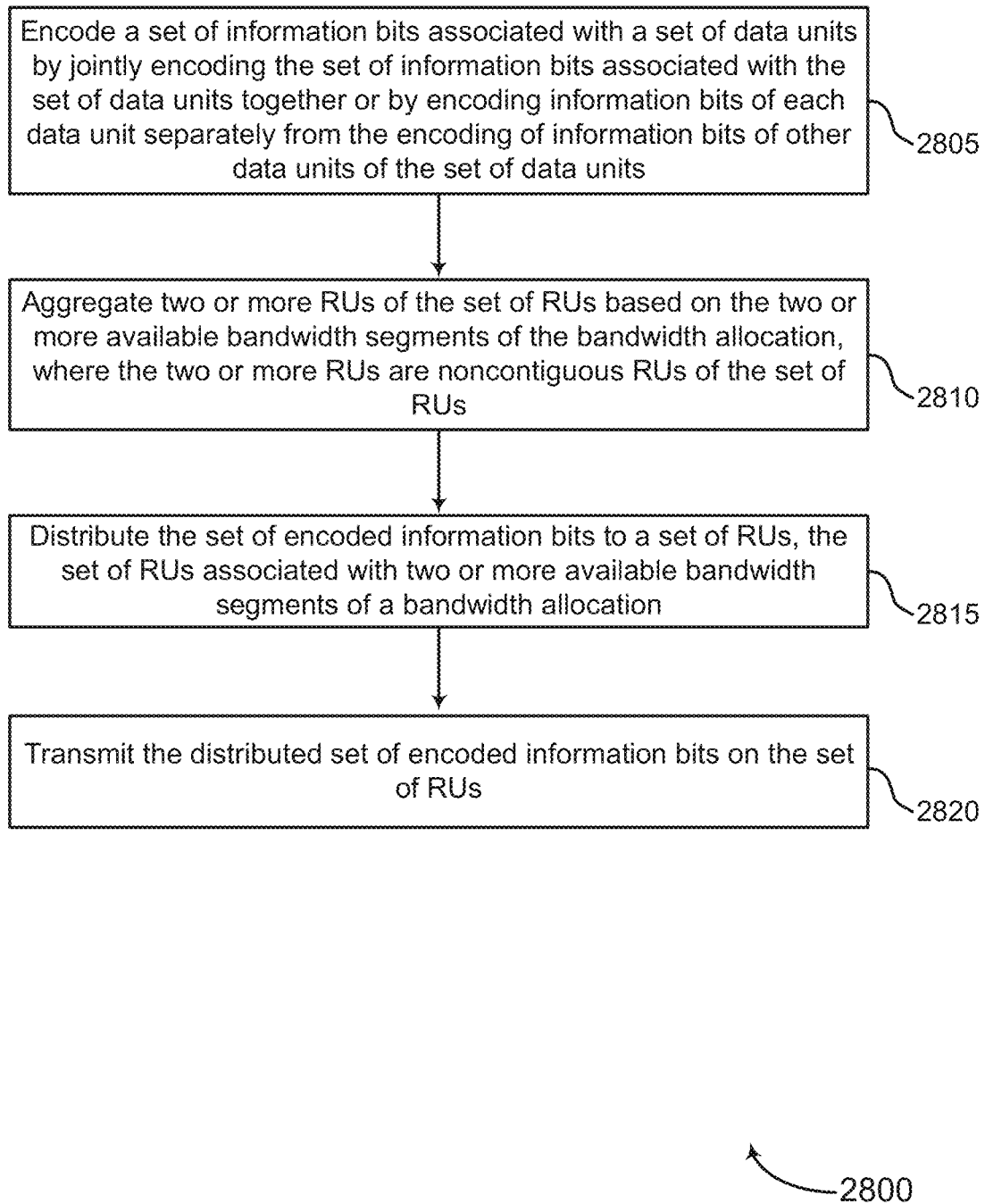

FIG. 28 shows a flowchart illustrating a method 2800 that supports data parsing to support RU aggregation in accordance with aspects of the present disclosure. The operations of method 2800 may be implemented by a STA or its components as described herein. For example, the operations of method 2800 may be performed by a STA communications manager as described with reference to FIGS. 18-21. In other examples, the operations of method 2800 may be performed by a wireless communication device 1100 as described with reference to FIG. 11. In some examples, a STA may execute a set of instructions to control the functional elements of the STA to perform the functions described below. Additionally, or alternatively, a STA may perform aspects of the functions described below using special-purpose hardware.

At 2805, the STA may encode a set of information bits associated with a set of data units by jointly encoding all the information bits associated with the set of data units together or by encoding the information bits of each data unit separately from the encoding of the information bits of the other data units of the set of data units. The operations of 2805 may be performed according to the methods described herein. In some examples, aspects of the operations of 2805 may be performed by an encoder as described with reference to FIGS. 18-21.

At 2810, the STA may aggregate two or more RUs of the set of RUs based on the two or more available bandwidth segments of the bandwidth allocation. In some examples, the two or more RUs are noncontiguous RUs of the set of RUs. The operations of 2810 may be performed according to the methods described herein. In some examples, aspects of the operations of 2810 may be performed by an aggregation component as described with reference to FIGS. 18-21.

At 2815, the STA may distribute the set of encoded information bits to the set of RUs, the set of RUs associated with the two or more available bandwidth segments of the bandwidth allocation. The operations of 2815 may be performed according to the methods described herein. In some examples, aspects of the operations of 2815 may be performed by a resource parser component as described with reference to FIGS. 18-21.

At 2820, the STA may transmit the distributed set of encoded information bits on the set of RUs. The operations of 2820 may be performed according to the methods described herein. In some examples, aspects of the operations of 2820 may be performed by a resource parser component as described with reference to FIGS. 18-21.

Figure 29:
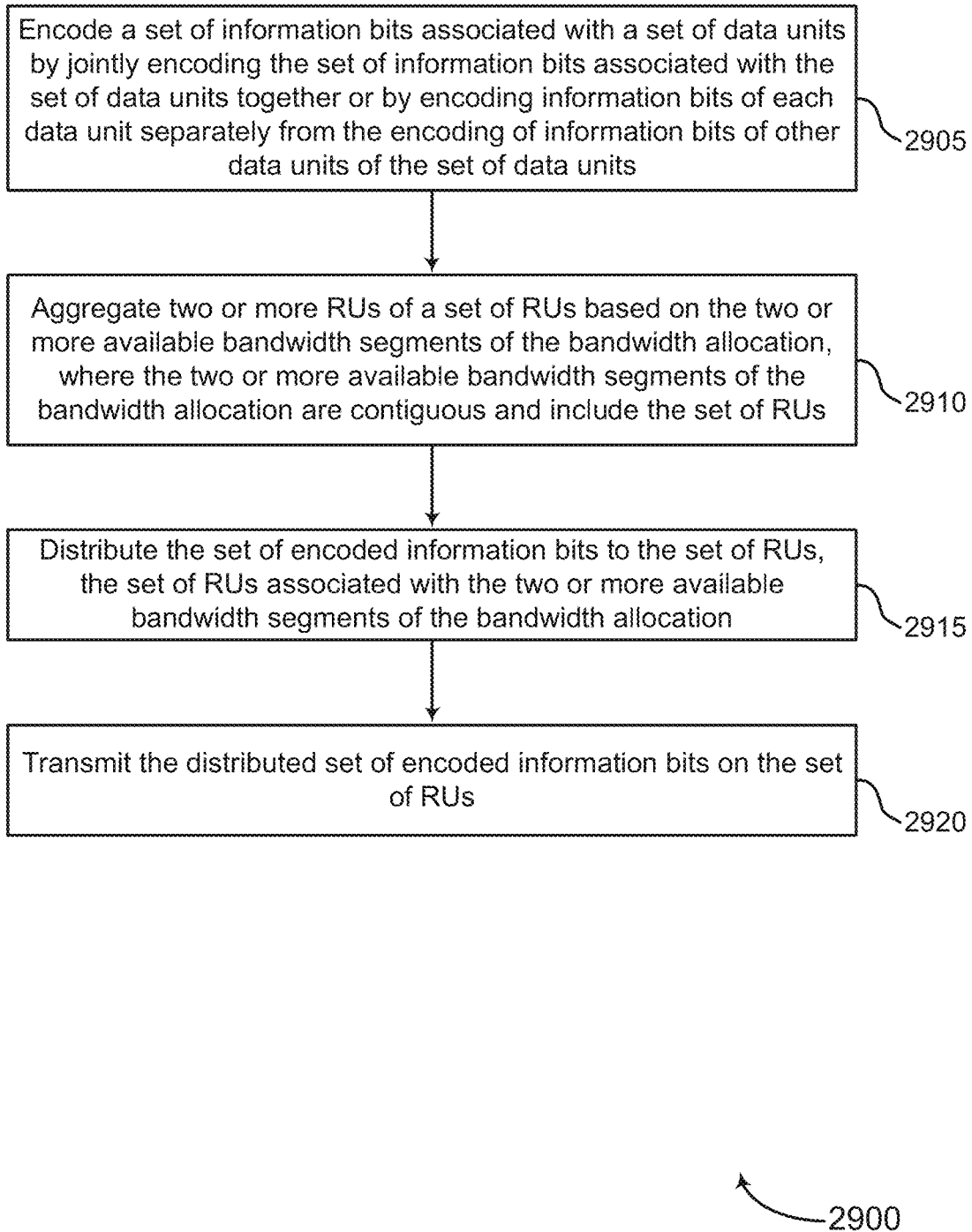

FIG. 29 shows a flowchart illustrating a method 2900 that supports data parsing to support RU aggregation in accordance with aspects of the present disclosure. The operations of method 2900 may be implemented by a STA or its components as described herein. For example, the operations of method 2900 may be performed by a STA communications manager as described with reference to FIGS. 18-21. In other examples, the operations of method 2900 may be performed by a wireless communication device 1100 as described with reference to FIG. 11. In some examples, a STA may execute a set of instructions to control the functional elements of the STA to perform the functions described below. Additionally, or alternatively, a STA may perform aspects of the functions described below using special-purpose hardware.

At 2905, the STA may encode a set of information bits associated with a set of data units by jointly encoding all the information bits associated with the set of data units together or by encoding the information bits of each data unit separately from the encoding of the information bits of the other data units of the set of data units. The operations of 2905 may be performed according to the methods described herein. In some examples, aspects of the operations of 2905 may be performed by an encoder as described with reference to FIGS. 18-21.

At 2910, the STA may aggregate two or more RUs of a set of RUs based on the two or more available bandwidth segments of a bandwidth allocation. In some examples, the two or more available bandwidth segments of the bandwidth allocation are contiguous and include the set of RUs. The operations of 2910 may be performed according to the methods described herein. In some examples, aspects of the operations of 2910 may be performed by an aggregation component as described with reference to FIGS. 18-21.

At 2915, the STA may distribute the set of encoded information bits to the set of RUs, the set of RUs associated with the two or more available bandwidth segments of the bandwidth allocation. The operations of 2915 may be performed according to the methods described herein. In some examples, aspects of the operations of 2915 may be performed by a resource parser component as described with reference to FIGS. 18-21.

At 2920, the STA may transmit the distributed set of encoded information bits on the set of RUs. The operations of 2920 may be performed according to the methods described herein. In some examples, aspects of the operations of 2920 may be performed by a resource parser component as described with reference to FIGS. 18-21.

Figure 30:
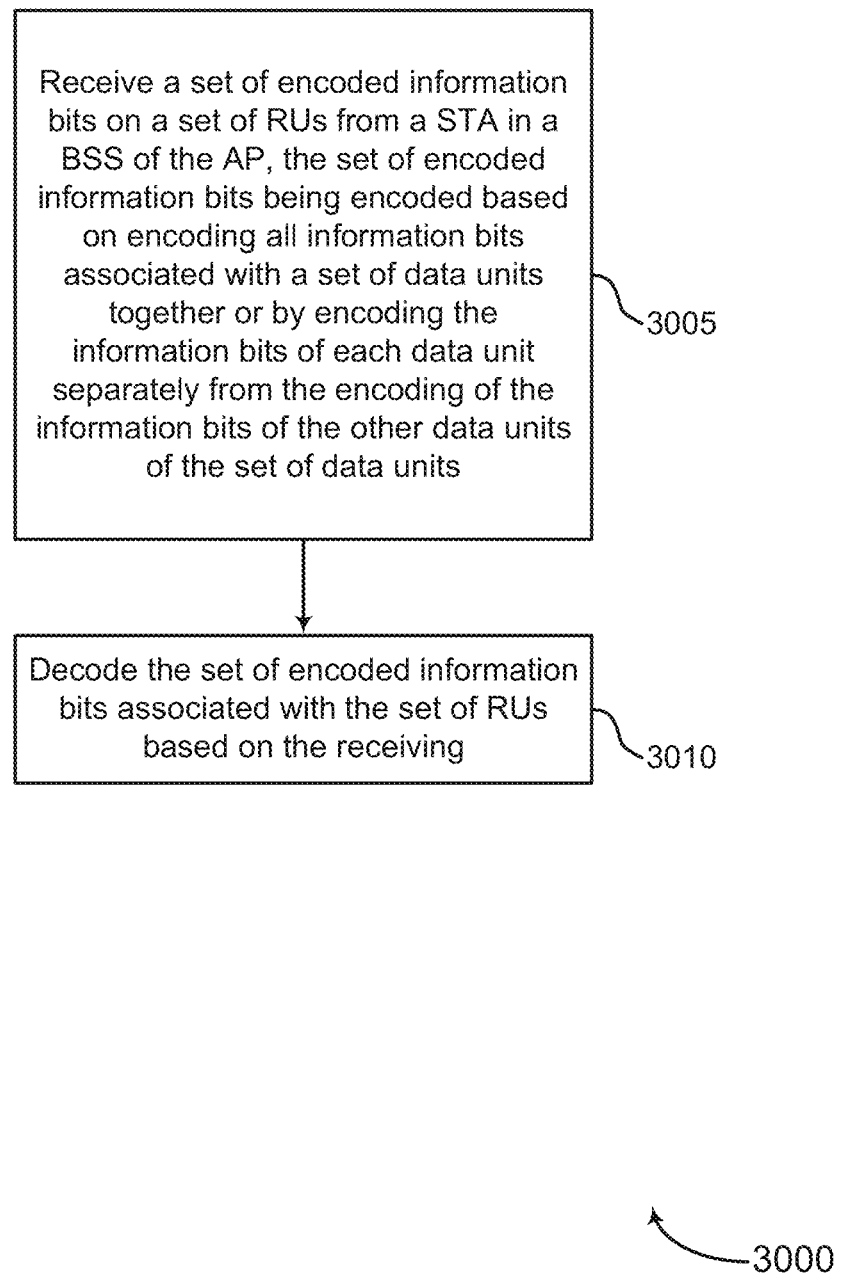

FIG. 30 shows a flowchart illustrating a method 3000 that supports data parsing to support RU aggregation in accordance with aspects of the present disclosure. The operations of method 3000 may be implemented by an AP or its components as described herein. For example, the operations of method 3000 may be performed by a STA communications manager as described with reference to FIGS. 14-17. In other examples, the operations of method 3000 may be performed by a wireless communication device 1100 as described with reference to FIG. 11. In some examples, an AP may execute a set of instructions to control the functional elements of the AP to perform the functions described below. Additionally, or alternatively, an AP may perform aspects of the functions described below using special-purpose hardware.

At 3005, the AP may receive a set of encoded information bits on a set of RUs from a STA in a BSS of the AP, the set of encoded information bits being encoded based on encoding all the information bits associated with the set of data units together or by encoding the information bits of each data unit separately from the encoding of the information bits of the other data units of the set of data units. The operations of 3005 may be performed according to the methods described herein. In some examples, aspects of the operations of 3005 may be performed by a bit component as described with reference to FIGS. 14-17.

At 3010, the AP may decode the set of encoded information bits associated with the set of RUs based on the receiving. The operations of 3010 may be performed according to the methods described herein. In some examples, aspects of the operations of 3010 may be performed by a decoder as described with reference to FIGS. 14-17.

It should be noted that the methods described herein describe possible implementations, and that the operations and the blocks or steps may be rearranged or otherwise modified and that other implementations are possible. Further, aspects from two or more of the methods may be combined.

Figure 31:
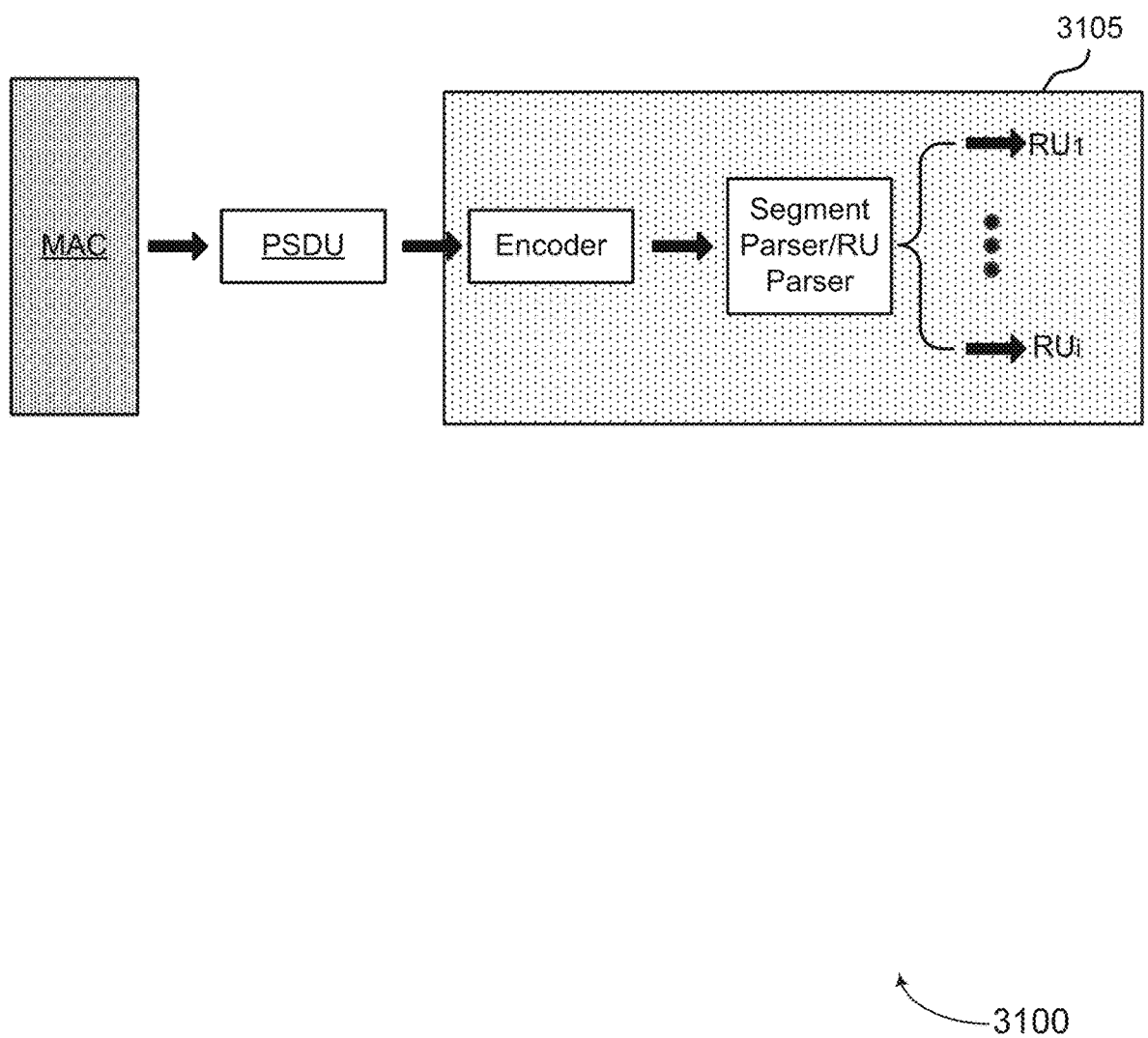
FIGS. 31 and 32 illustrate examples of data parsing and encoding schemes that support data parsing to support RU aggregation in accordance with aspects of the present disclosure.

FIG. 31 illustrates an example of a data parsing and encoding scheme 3100 that supports data parsing to support RU aggregation in accordance with aspects of the present disclosure. In some examples, the data parsing and encoding scheme 3100 may implement aspects of the wireless communication systems 100 and 500, as described with reference to FIGS. 1 and 5. For example, a wireless communication device (such as an AP or an STA) may encode a set of information bits at the PHY layer, and subsequently distribute coded bits based on a data parsing scheme.

As shown in FIG. 31, a MAC layer of the wireless communication device (such as an AP or a STA) may pass a set of information bits to a PHY layer 3105 in a single PSDU. At the PHY layer 3105, the wireless communication device may encode the received information bits. For example, the wireless communication device may encode the information bits according to a single coding rate across all RUs of the aggregation (for example, RUs assigned to the recipient device). The encoding may correspond to a joint encoding in the RU aggregation.

Following the encoding, the wireless communication device may implement an interleaving procedure that includes the data parsing scheme for the RU aggregation. In some examples, the interleaving procedure may include an RU parsing for distributing coded bits among the RUs. The interleaving procedure may also include a per-segment parsing that corresponds to a configured bandwidth allocation (for example, 80 MHz, 160 MHz, or 320 MHz) of a frequency channel. As part of the interleaving procedure, the wireless communication device may additionally implement an LDPC tone mapping within each RU of the aggregation to ensure that points of a constellation mapping (for example, QAM mapping) are separated by a sufficient distance (subcarriers) to capture the full frequency diversity. In other examples, the wireless communication device may implement bit interleaving with BCC within each RU of the aggregation. In some examples, the RU parsing may distribute coded bit to RUs, while the per-segment parsing may assign coded bits to particular bandwidth segments of a bandwidth allocation. In some examples, the interleaving procedure may include performing the RU parsing before the per-segment parsing. Alternatively, the interleaving procedure may include performing the RU parsing after the per-segment parsing.

As part of the interleaving procedure, the wireless communication device may determine that an RU size of an RU satisfies a threshold, such as that the RU size may be greater than an available bandwidth segment of a bandwidth allocation. For example, the wireless communication device may determine that an RU size of an RU exceeds an 80 MHz bandwidth segment. In some examples, the wireless communication device may determine that multiple RUs satisfy a threshold, and for example, exceed an available bandwidth segment of a bandwidth allocation (for example, 80 MHz). As a result, the interleaving procedure may perform RU parsing including distributing information bits of a data payload to an RU or to multiple RUs and may perform separate encoding and interleaving for each RU. The interleaving procedure may perform per-segment parsing, and therefore may assign (for example, distribute) one or more RUs to respective available bandwidth segments of a bandwidth allocation.

The RU parser may distribute coded bits among the RUs included in each configured segment. For example, the RU parser may distribute the set of encoded information bits to the RU based on assigning the RU to the available bandwidth segment. As part of the interleaving procedure, the wireless communication device may evaluate the parsed segments and determine the segment with the smaller number of needed coded bits. For example, starting from an initial RU, the wireless communication device may sequentially fill bits in each RU included in each segment of the aggregation. The wireless communication device may distribute the coded bits by filling the initial RU with the coded bits prior to distributing to one or more additional RUs of the segment. Following distribution to each of the aggregated RUs included in the segment, the wireless communication device may then distribute the remaining coded bits to the RUs included in subsequent segments for the operating bandwidth. As part of a transmission at the PHY layer 3105, the wireless communication device may then signal the coded bits as part of an SU PPDU on the aggregated RUs of the frequency channel. In other examples, the wireless device may distribute the coded bits to the multiple RUs of the aggregation and perform separate segment parsing and interleaving for each RU.

In some examples, for a single RU aggregation (for example, a single RU to single wireless communication device aggregation), per-segment parsing may be an 80 MHz segment parser if an RU size is greater than a bandwidth allocation (for example, if an RU size >80 MHz), and the 80 MHz segment parser may include an even distribution among different 80 MHz segments. Similarly, for multiple RU aggregation (for example, multiple RUs to single wireless communication device aggregation), a per-segment parsing may be an 80 MHz segment parser if the RUs' span exceeds a bandwidth threshold (for example, 80 MHz). In other examples, the wireless device may initially distribute coded bits to multiple RUs and may perform separate segment parsing and interleaving for each RU.

Figure 32:
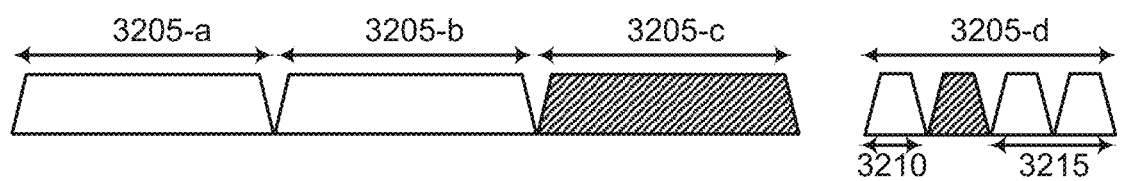

FIG. 32 illustrates an example of a data parsing and encoding scheme 3200 that supports data parsing to support RU aggregation in accordance with aspects of the present disclosure. In some examples, the data parsing and encoding scheme 3200 may implement aspects of the wireless communication systems 100 and 500, as described with reference to FIGS. 1 and 5. For example, a wireless communication device (such as an AP or an STA) may transmit SU PPDUs in an unlicensed spectrum, which may be a portion of the spectrum that includes frequency bands traditionally used by Wi-Fi technology, such as the 2.4 GHz band, the 5 GHz band, the 60 GHz band, the 3.6 GHz band, and the 900 MHz band. Additionally, or alternatively, the wireless communication device may communicate in other frequency bands, such as the 6 GHz band, which may support both licensed and unlicensed communications. Each of the frequency bands may include multiple sub-bands or frequency channels for carrying the SU PPDUs and for spanning a minimum bandwidth of 20 MHz.

In some examples, the wireless communication device may transmit SU PPDUs over an extended BSS bandwidth 3205 that may be formed through channel bonding. Based on the channel bonding, the extended BSS bandwidth 3205 may span a frequency spectrum of 40 MHz, 80 MHz, 160 MHz, or 320 MHz. For example, an extended BSS bandwidth 3205-*a* may span 80 MHz, an extended BSS bandwidth 3205-*b* may span 80 MHz, an extended BSS bandwidth 3205-*c* may span 80 MHz, and an extended BSS bandwidth 3205-*d* may span 80 MHz. In some examples, data traffic associated with the incumbent technologies or with nearby wireless communication device communications within an OBSS may occupy frequency resources of the one or more of the extended BSS bandwidths 3205. As a result, the wireless communication device may have difficulty discovering a contiguous idle channel (for example, a contiguous 80 MHz, 160 MHz, or 320 MHz channel).

As described herein, the wireless communication device may support a puncturing mode in which a non-primary or primary frequency channel of the extended BSS bandwidths 3205 may be zeroed out. In addition, the wireless communication device may support flexible channel aggregation for transmitting SU PPDUs over a non-contiguous frequency channel included within the extended BSS bandwidths 3205. That is, multiple RUs may be assigned to a same user, which may include SU transmission on a punctured bandwidth that includes multiple at least one of contiguous and noncontiguous RUs. In the example of FIG. 32, the available frequency spectrum of the extended BSS bandwidth 3205 may be divided into multiple adjacent or nonadjacent RUs each including a number of different frequency subcarriers ("tones").

By way of example, the extended BSS bandwidth 3205-*a* and the extended BSS bandwidth 3205-*b* may be contiguous, and therefore the wireless communication device may assign RUs jointly to the contiguous bandwidth segments (for example, the extended BSS bandwidth 3205-*a* and the extended BSS bandwidth 3205-*b*). Additionally, the wireless communication device may determine that the extended BSS bandwidth 3205-*c* is unavailable due to, for example, an OBSS puncturing resources of the extended BSS bandwidth 3205-*c* and may refrain from assigning (or distributing) RUs to the extended BSS bandwidth 3205-*c*. In some examples, the wireless communication device may determine that a bandwidth segment of the extended BSS bandwidth 3205-*d* is also unavailable due to, for example, an OBSS puncturing resources of the bandwidth segment of the extended BSS bandwidth 3205-*c*.

For example, an OBSS may puncture a 20 MHz segment of the extended BSS bandwidth 3205-*c* (for example, 80 MHz bandwidth). As a such, the wireless communication device may assign (or distribute) RUs jointly to contiguous bandwidth segments 3215 of the extended BSS bandwidth 3205-*d* (for example, 20 MHz+20 MHz) and separately assign RUs to a noncontiguous bandwidth segment 3210 (for example, 20 MHz) of the extended BSS bandwidth 3205-*d*. Additionally, the wireless communication device may distribute bits to the set of RUs to tones of the contiguous bandwidth segments 3215 of the extended BSS bandwidth 3205-*d* and the noncontiguous bandwidth segment 3210 (for example, 20 MHz) of the extended BSS bandwidth 3205-*d*, while skipping punctured tones in the extended BSS bandwidth 3205-*c* (for example, 80 MHz segment), or the punctured tones (for example, 20 MHz segment) in the extended BSS bandwidth 3205-*d*. In some examples, the wireless communication device may, in order to support the RU aggregation, determine a data parsing and encoding scheme for distributing and encoding information bits of a PSDU data payload with SU puncturing (for example, with 160 MHz and 320 MHz bandwidths). In some examples, the wireless communication device may, in order to support the RU aggregation for SU puncturing, perform joint encoding, as well as still use interleaving parameters for an entire bandwidth allocation (for example, distributing coded bits, symbols to tones on available bandwidth segments while skipping punctured tones), as described in more detail below. In some examples, the wireless communication device and a receiving device (such as an AP or an STA) may identify which tones are punctured, as well as other information such as the number of OFDM symbols affected, the number of data bits for each OFDM symbol, whether to use a per-80 MHz segment parser (for example, round robin parsing method), as well as an LDPC tone mapping method.

The wireless communication device may encode information bits using a single coding rate over all RUs of an aggregation (for example, RUs assigned to a recipient device). In some examples, the encoding may correspond to a joint encoding in the RU aggregation. In response to the encoding, the wireless communication device may implement an interleaving procedure that includes the data parsing scheme for the RU aggregation. The interleaving procedure may include one or more of a per-segment parser (for example, 80 MHz segment parser) and an RU parser. The RU parser may distribute coded bit to RUs, while the per-segment parser may assign coded bits to bandwidth segments of a bandwidth allocation.

In some examples, the interleaving procedure may process coded bits by the RU parser before processing the coded bits by the per-segment parser. Alternatively, the interleaving procedure may process the bits coded by the per-segment parser before processing the coded bits by the RU parser. The per-segment parser may be based on a configured bandwidth allocation (for example, the extended BSS bandwidths 3205). In some examples, as part of the interleaving procedure, the wireless communication device may determine that an RU size of an RU satisfies a threshold, such as that the RU size is greater than an available bandwidth segment of a bandwidth allocation. The wireless communication device may, for example, determine that an RU size of an RU exceeds an 80 MHz bandwidth segment (for example, bandwidth segments in the extended BSS bandwidth 3205-*d*). As such, the wireless communication device may determine to process RUs by the RU parser before processing the coded bits by the per-segment parser. For example, the per-segment parser may assign coded bits to available bandwidth segments (for example, extended BSS bandwidth 3205).

The RU parser may distribute coded bits among the RUs included in each configured segment. For example, the RU parser may distribute the set of encoded information bits to the RU based on assigning the RU to the available bandwidth segment. As part of the interleaving procedure, the wireless communication device may evaluate the parsed segments and determine the segment with the smaller number of needed coded bits. For example, starting from an initial RU, the wireless communication device may sequentially fill bits in each RU included in each segment of the aggregation. The wireless communication device may distribute the coded bits by filling the initial RU with the coded bits prior to distributing to one or more additional RUs of the segment. Following distribution to each of the aggregated RUs included in the segment, the wireless communication device may then distribute the remaining coded bits to the RUs included in the subsequent segments for the operating bandwidth.

In some examples, the wireless communication device may, in order to support the RU aggregation, determine a data parsing and encoding scheme for distributing and encoding information bits of a PSDU data payload with punctured tones. By way of example, the wireless communication device may determine that an aggregate RU size (for example, a combo RU) associated with two or more RUs includes a default RU size (for example, an existing RU size). The wireless communication device may then determine that an existing $D_{tm}$ parameter is valid or invalid based on the aggregate RU size. For example, an aggregate RU size may be an 80 MHz bandwidth segment, and therefore the wireless communication device may use an existing $D_{tm}$ parameter to implement an LDPC tone mapping within a combo RU. In some examples, the wireless communication device may preserve pilot tone locations in each RU of the combo RU. The LDPC tone interleaving scheme may therefore use the preserved pilot tone locations in each RU of the combo RU or may use pilot tone locations corresponding to the combo RU.

In some other examples, the wireless communication device may determine that an aggregate RU size (for example, a combo RU) associated with two or more RUs does not include a default RU size (for example, an existing RU size). The wireless communication device may then determine that an existing $D_{tm}$ parameter is invalid, and therefore the wireless communication device may determine a new $D_{tm}$ parameter with new pilot tone locations to implement an LDPC tone mapping within a combo RU. In some examples, the wireless communication device may use one or more neighboring leftover tones or a 26 tone RU, for example, of unavailable bandwidth segments for the LDPC tone mapping. In some examples, the wireless communication device may determine an effective RU size and may determine one or more pilot tone locations in the aggregate RU using one or more neighboring leftover tones or a 26 tone RU, for example, of unavailable bandwidth segments for the LDPC tone mapping. The wireless communication device may then signal the coded bits as part of an SU PPDU on the aggregated RUs of the frequency channel. In an example combo RU106 (for example, RU52+RU52), the wireless communication device may change four pilot tones to four data tones.

Figure 33:
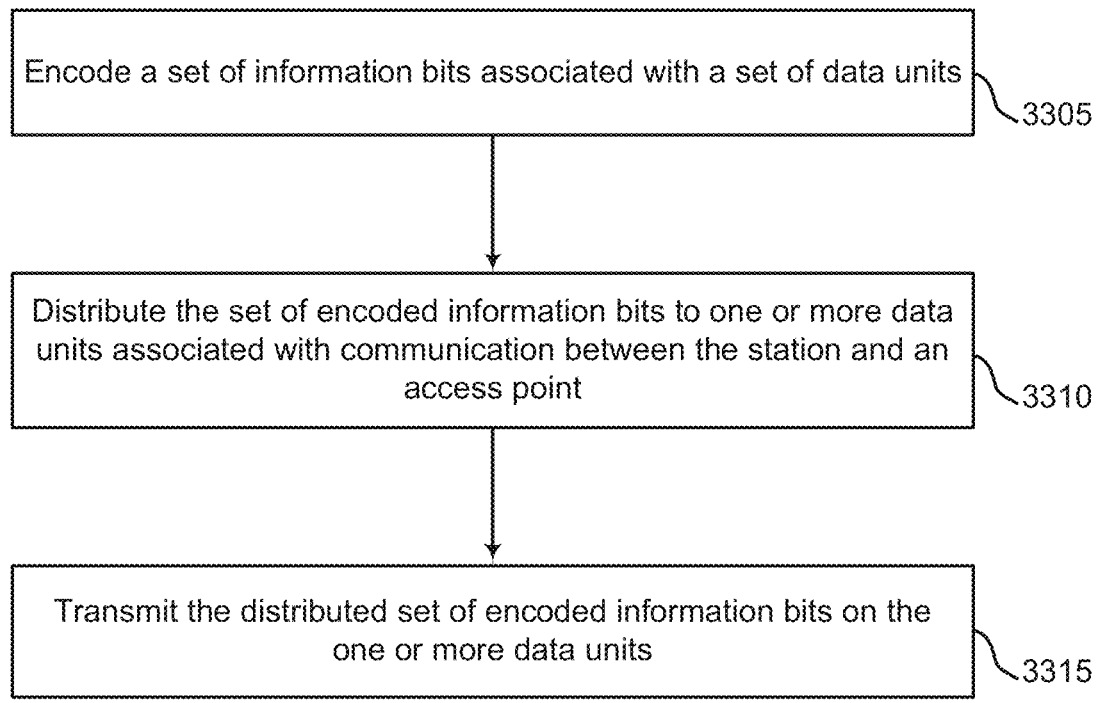
FIG. 33 shows a flowchart illustrating a method that supports data parsing to support RU aggregation in accordance with aspects of the present disclosure.

FIG. 33 shows a flowchart illustrating a method 3300 that supports data parsing to support RU aggregation in accordance with aspects of the present disclosure. The operations of method 3300 may be implemented by a STA or its components as described herein. For example, the operations of method 3300 may be performed by a STA communications manager as described with reference to FIGS. 18-21. In other examples, the operations of method 3300 may be performed by a wireless communication device 1100 as described with reference to FIG. 11. In some examples, a STA may execute a set of instructions to control the functional elements of the STA to perform the functions described below. Additionally, or alternatively, a STA may perform aspects of the functions described below using special-purpose hardware.

At 3305, the STA may encode a set of information bits associated with a set of data units. The operations of 2705 may be performed according to the methods described herein. In some examples, aspects of the operations of 3305 may be performed by an encoder as described with reference to FIGS. 18-21.

At 3310, the STA may distribute the set of encoded information bits to one or more data units associated with communication between the station and an access point. The operations of 3310 may be performed according to the methods described herein. In some examples, aspects of the operations of 3310 may be performed by a resource parser component as described with reference to FIGS. 18-21.

At 3315, the STA may transmit the distributed set of encoded information bits on the one or more data units. The operations of 3315 may be performed according to the methods described herein. In some examples, aspects of the operations of 3315 may be performed by a resource parser component as described with reference to FIGS. 18-21.

In some examples, the operations of 3310 may include at least one of one of: distributing the set of encoded information bits to the one or more data units sequentially, distributing the set of encoded information bits to the one or more data units in a cyclical process, or distributing the set of encoded information bits to the one or more data units in the cyclical process based at least in part on a ratio of the one or more data units to the set of data units.

In some examples, the operations of 3310 may further include at least one of: assigning remaining coded bits of the set of encoded information bits to one or more additional data units of the set of data units sequentially, assigning remaining coded bits of the set of encoded information bits to the one or more additional data units in the cyclical process, or assigning remaining coded bits of the set of encoded information bits to the one or more additional data units of the set of data units in the cyclical process based at least in part on a ratio of the one or more remaining coded bits to the one or more additional data units.

In some example, the operations of 3305 may further include jointly encoding the set of information bits associated with the set of data units together, wherein each data unit comprises one of a resource unit, an aggregated resource unit, or a bandwidth segment.

In some examples, the operations of 3310 may further include distributing the set of encoded information bits to a set of resource units associated with two or more available bandwidth segments of a bandwidth allocation.

In some examples, the operations of 3310 may further include distributing the set of encoded information bits to the set of resource units sequentially.

Techniques described herein may be used for various wireless communication systems such as CDMA, TDMA, FDMA, OFDMA, single carrier frequency division multiple access (SC-FDMA), and other systems. A CDMA system may implement a radio technology such as CDMA2000 or Universal Terrestrial Radio Access (UTRA). CDMA2000 covers IS-2000, IS-95, and IS-856 standards. IS-2000 Releases may be commonly referred to as CDMA2000 1× or 1×. IS-856 (TIA-856) is commonly referred to as CDMA2000 1×EV-DO or High Rate Packet Data (HRPD). UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, or Flash-OFDM. UTRA and E-UTRA are part of Universal Mobile Telecommunications System (UMTS). LTE, LTE-A, and LTE-A Pro are releases of UMTS that use E-UTRA. The techniques described herein may be used for the systems and radio technologies mentioned herein as well as other systems and radio technologies.

A macro cell generally covers a relatively large geographic area (for example, several kilometers in radius) and may allow unrestricted access by STAs with service subscriptions with the network provider. A small cell may be associated with a lower-powered AP or base station, as compared with a macro cell, and a small cell may operate in the same or different (for example, licensed or unlicensed) frequency bands as macro cells. Small cells may include pico cells, femto cells, and micro cells according to various examples. A pico cell, for example, may cover a small geographic area and may allow unrestricted access by STAs with service subscriptions with the network provider. A femto cell may also cover a small geographic area (for example, a home) and may provide restricted access by STAs having an association with the femto cell (for example, STAs in a closed subscriber group, STAs for users in the home, among other examples).

The wireless communication systems described herein may support synchronous or asynchronous operation. For synchronous operation, the APs may have similar frame timing, and transmissions from different APs may be approximately aligned in time. For asynchronous operation, the APs may have different frame timing, and transmissions from different APs may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative components, logic, logical blocks, components, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, components, circuits and processes described above. Whether such functionality is implemented in hardware, firmware or software depends upon the particular application and design constraints imposed on the overall system.

The hardware and data processing apparatus used to implement the various illustrative components, logics, logical blocks, components and circuits described in connection with the aspects disclosed herein may be implemented or performed with a general purpose single- or multi-chip processor, a DSP, an ASIC, an FPGA or other PLD, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects, implementations of the subject matter described in this specification can be implemented as software. For example, various functions of components disclosed herein or various blocks or steps of a method, operation, process or algorithm disclosed herein can be implemented as one or more components of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. Also, as used herein, the phrase "based on" shall not be construed as a reference to a closed set of conditions. For example, a block or step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable sub-combination. As such, although features may be described above as acting in particular combinations, and even initially claimed as such, one or more features from a claimed combination can, in some examples, be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The description herein is provided to enable a person having ordinary skill in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless communication device (WCD), comprising:
    assigning each resource unit of a set of resource units associated with communication between the WCD and another WCD to a respective available bandwidth segment of a plurality of available bandwidth segments of a bandwidth allocation;
    jointly encoding a set of information bits associated with a physical layer data unit together;
    distributing the set of encoded information bits to two or more resource units associated with the set of resource units in a cyclic process based at least in part on a ratio of sizes of the two or more resource units; and
    transmitting, via the available bandwidth segments, the distributed set of encoded information bits on the two or more resource units.

2. The method of claim 1, wherein the distribution comprises:
    assigning remaining encoded information bits of the set of encoded information bits to one or more additional resource units of the set of resource units in the cyclical process based at least in part on a ratio of the remaining encoded information bits to the one or more additional resource units.

3. The method of claim 1, wherein the set of resource units is associated with two or more available bandwidth segments of the bandwidth allocation.

4. The method of claim 1, further comprising:
    assigning encoded information bits of the set of encoded information bits to a first resource unit of the set of resource units having the first frequency, said assignment comprising filling all bits of an orthogonal frequency division multiplexing (OFDM) symbol associated with the first resource unit having the first frequency with the assigned encoded information bits of the set of encoded information bits before filling any bits of a second OFDM symbol.

5. The method of claim 1, further comprising:
    determining one or more of one or more modulation coding schemes or a ratio corresponding to the one or more modulation coding schemes, wherein the distribution is further based on the determined one or more modulation coding schemes or the ratio corresponding to the one or more modulation coding schemes.

6. The method of claim 1, further comprising:
    determining at least one of a first ratio corresponding to one or more modulation coding schemes, wherein the distribution is further based on at least one of the first ratio corresponding to one or more modulation coding schemes.

7. The method of claim 1, further comprising:
assigning, at a MAC layer of the WCD, information bits of the a set of information bits to the set of resource units;
generating, at the MAC layer based at least in part on the assigning, a set of one or more data units, each data unit of the set of data units comprising a physical service data unit (PSDU); and
forwarding one or more PSDUs from the MAC layer to a physical layer of the WCD, wherein the one or more PSDUs include the physical layer data unit and further wherein transmitting the distributed set of encoded information bits comprises transmitting the distributed set of encoded information bits on the set of resource units via the physical layer.

8. The method of claim 3, further comprising:
determining, at a physical layer of the WCD, that a resource unit size of a resource unit of the set of resource units satisfies a threshold, wherein the threshold comprises the available bandwidth segment, wherein the two or more available bandwidth segments of the bandwidth allocation comprises the available bandwidth segment;
assigning, at the physical layer of the WCD, the resource unit of the set of resource units to the available bandwidth segment, wherein:
the distribution comprises distributing, at the physical layer of the WCD, based at least in part on assigning the resource unit of the set of resource units to the available bandwidth segment.

9. The method of claim 3, further comprising:
determining, at a physical layer of the WCD, that a first resource unit size of a first resource unit of the set of resource units and a second resource unit size of a second resource unit of the set of resource units satisfy a threshold, wherein the threshold comprises the available bandwidth segment, wherein the two or more available bandwidth segments of the bandwidth allocation comprises the available bandwidth segment, and wherein the physical layer comprises a set of encoders for separately encoding information bits associated with a set of data units that includes the physical layer data unit;
assigning, at the physical layer of the WCD, the first resource unit and the second resource unit to the two or more available bandwidth segments of the bandwidth allocation, the first resource unit having the first resource unit size and the second resource unit having the second resource unit size; and
determining a ratio corresponding to one or more modulation coding schemes associated with the first resource unit and the second resource unit, wherein the distribution comprises distributing based at least in part on the first resource unit size of the first resource unit of the set of resource units, the second resource unit size of the second resource unit of the set of resource units and a ratio corresponding to the one or more modulation coding schemes associated with the first resource unit and the second resource unit.

10. The method of claim 1, wherein the distribution comprises distributing based at least in part on the two or more available bandwidth segments of the bandwidth allocation associated with a first resource unit of the set of resource units and a second resource unit of the set of resource units.

11. The method of claim 1, wherein the distribution comprises:
assigning encoded information bits of the set of encoded information bits to a first resource unit of the set of resource units, the first resource unit corresponding to a first bandwidth segment of the bandwidth allocation, wherein the first bandwidth segment comprises a 160 megahertz (MHz) segment; and
assigning remaining encoded information bits of the set of encoded information bits to a second resource unit of the set of resource units after assigning the encoded information bits of the set of encoded information bits to the first resource unit, the second resource unit corresponding to a second bandwidth segment of the bandwidth allocation, wherein the second bandwidth segment comprises a 160 MHz segment.

12. The method of claim 3, further comprising: determining, at a layer of the WCD, that each resource unit size of the set of resource units satisfies a threshold, wherein the threshold comprises the available bandwidth segment, and wherein the two or more available bandwidth segments of the bandwidth allocation comprises the available bandwidth segment,
wherein distributing the set of encoded information bits to the set of resource units comprises distributing the set of encoded information bits to resource units of the set of resource units based at least in part on assigning the resource units of the set of resource units to the available bandwidth segment.

13. The method of claim 12, further comprising:
performing a resource unit interleaving of the distributed encoded information bits within each resource unit of the set of resource units.

14. The method of claim 12, wherein:
the layer comprises a resource unit parser and a bandwidth segment parser,
the resource unit parser distributes the set of encoded information bits to the set of resource units,
the bandwidth segment parser assigns encoded information bits of each resource unit of the set of resource units to each available bandwidth segment within each resource unit of the set of resource units, and
the available bandwidth segment comprises an 80 megahertz (MHz) segment.

15. The method of claim 14, wherein the bandwidth segment parser assigns encoded information bits of each resource unit of the set of resource units to each available bandwidth segment within each resource unit of the set of resource units prior to the resource unit parser distributing the encoded information bits of each resource unit of the set of resource units within each available bandwidth segment.

16. A wireless communication device (WCD), comprising:
at least one processor,
memory in electronic communication with the at least one processor;
instructions stored in the memory and executable by the at least one processor to cause the WCD to:
assign each resource unit of a set of resource units associated with communication between the WCD and another WCD to a respective available bandwidth segment of a plurality of available bandwidth segments of a bandwidth allocation;

jointly encode a set of information bits associated with a physical layer data unit;

distribute the set of encoded information bits to two or more resource units associated with the set of resources in a cyclic process based at least in part on a ratio of sizes of the two or more resource units; and output the distributed set of encoded information bits; and a transmitter and configured to transmit, via the available bandwidth segments, the distributed set of encoded information bits on the two or more resource units.

17. An apparatus for wireless communication, comprising:

memory comprising instructions;

at least one processor configured to execute the instructions and cause the apparatus to:

assign each resource unit of a set of resource units associated with communication between a first WCD and a second WCD to a respective available bandwidth segment of a plurality of available bandwidth segments of a bandwidth allocation;

jointly encode a set of information bits associated with a physical layer data unit;

distribute the set of encoded information bits to two or more resource units associated with the set of resources in a cyclic process based at least in part on a ratio of sizes of the two or more resource units; and output, for transmission via the available bandwidth segment, the distributed set of encoded information bits on the one or more resource units.

* * * * *